United States Patent
Nabeto et al.

(10) Patent No.: US 12,422,319 B2
(45) Date of Patent: Sep. 23, 2025

(54) TACTILE SENSING SYSTEM

(71) Applicant: OMRON Corporation, Kyoto (JP)

(72) Inventors: Misato Nabeto, Kyoto (JP); Hiroshi Kitajima, Kyoto (JP); Hiroki Koga, Kyoto (JP); Sayaka Doi, Kyoto (JP)

(73) Assignee: OMRON Corporation, Kyoto (JP)

( * ) Notice: Subject to any disclaimer, the term of this patent is extended or adjusted under 35 U.S.C. 154(b) by 235 days.

(21) Appl. No.: 18/020,716

(22) PCT Filed: Jul. 15, 2021

(86) PCT No.: PCT/JP2021/026661
§ 371 (c)(1),
(2) Date: Feb. 10, 2023

(87) PCT Pub. No.: WO2022/038938
PCT Pub. Date: Feb. 24, 2022

(65) Prior Publication Data
US 2023/0349782 A1    Nov. 2, 2023

(30) Foreign Application Priority Data
Aug. 21, 2020 (JP) ................ 2020-140394

(51) Int. Cl.
*G01L 5/00* (2006.01)
*B25J 13/08* (2006.01)
*G01L 1/14* (2006.01)

(52) U.S. Cl.
CPC ........... *G01L 5/0061* (2013.01); *B25J 13/084* (2013.01); *G01L 1/142* (2013.01)

(58) Field of Classification Search
CPC ....... G01L 5/0061; G01L 1/142; G01L 1/146; G01L 5/226; G01L 5/165; B25J 13/084; B25J 13/083; G05B 2219/40625
See application file for complete search history.

(56) References Cited

U.S. PATENT DOCUMENTS 8,904,885 B2 * 12/2014 Ikebe .................... G06F 3/0338
                                                        73/862.626
9,222,846 B2 * 12/2015 Lim ........................ G01L 1/142
(Continued)

FOREIGN PATENT DOCUMENTS

| CN | 106289334 A | 1/2017 |
| CN | 108885146 A * 11/2018 | ............ B25J 13/082 |

(Continued)

OTHER PUBLICATIONS

Extended European Search Report dated Aug. 2, 2024, issued in corresponding European Patent Application No. 21858087.6.
(Continued)

*Primary Examiner* — Octavia Hollington
(74) *Attorney, Agent, or Firm* — Morgan, Lewis & Bockius LLP

(57) ABSTRACT

In a tactile sensing system, a sensor portion of a tactile sensor is provided at a grasping portion of a robot, and outputs plural signals respectively corresponding to plural first electrodes that face a second electrode. On the basis of all or some of the plural signals, an output section calculates respective pressure values of plural pressure detecting positions within a contacting surface of the sensor portion which contacting surface contacts a workpiece, and outputs data of a pressure distribution. Further, on the basis of all or some of the plural signals, the output section calculates one aggregate shearing force value for the entire contacting surface, and outputs data of the aggregate shearing force value.

18 Claims, 42 Drawing Sheets

(56) References Cited

U.S. PATENT DOCUMENTS

| | | | |
|---|---|---|---|
| 9,347,838 B2* | 5/2016 | Chen | G01L 1/142 |
| 10,365,172 B2* | 7/2019 | Tomita | B25J 13/084 |
| 10,760,982 B2 | 9/2020 | Watazu et al. | |
| 2014/0150572 A1 | 6/2014 | Lim et al. | |
| 2014/0174204 A1 | 6/2014 | Chen et al. | |
| 2017/0016783 A1* | 1/2017 | Hall | G01L 1/148 |
| 2018/0356299 A1 | 12/2018 | Watazu et al. | |
| 2018/0356301 A1* | 12/2018 | Tomita | G01L 1/04 |
| 2020/0030981 A1 | 1/2020 | Kamiya et al. | |
| 2020/0070354 A1 | 3/2020 | Nakayama et al. | |
| 2020/0072691 A1* | 3/2020 | Nakayama | G01L 5/165 |
| 2020/0141818 A1* | 5/2020 | Bao | G01L 1/144 |
| 2020/0306986 A1* | 10/2020 | Keraly | B25J 13/085 |
| 2022/0034728 A1 | 2/2022 | Katsuhara et al. | |
| 2022/0214233 A1 | 7/2022 | Dai et al. | |
| 2023/0324242 A1* | 10/2023 | Nabeto | G01L 1/146 |
| | | | 73/862.626 |

FOREIGN PATENT DOCUMENTS

| | | |
|---|---|---|
| CN | 110774314 A | 2/2020 |
| CN | 110871460 A | 3/2020 |
| CN | 110900662 A | 3/2020 |
| CN | 111504521 A | 8/2020 |
| EP | 2741064 B1 | 6/2020 |
| JP | 2013-117458 A | 6/2013 |
| JP | 2013142613 * | 7/2013 ............ G01L 1/14 |
| JP | 2014-055985 A | 3/2014 |
| JP | 2014-115282 A | 6/2014 |
| JP | 2015-159840 A | 9/2015 |
| JP | 6280579 B2 | 2/2018 |
| JP | 6488414 B2 | 3/2019 |
| JP | 2019-152599 A | 9/2019 |
| WO | 2020/080127 A1 | 4/2020 |

OTHER PUBLICATIONS

Office Action dated Jul. 30, 2024, issued in corresponding Japanese Patent Application No. 2020-140394.

International Search Report issued in corresponding International Patent Application No. PCT/JP2021/026661 dated Aug. 24, 2021.

Written Opinion issued in corresponding International Patent Application No. PCT/JP2021/026661 dated Aug. 24, 2021.

Rongguang et al., "Finite element method calculation of internal force and deformation longitudinal influence line of curved girder bridge", East China Highway, No. 4, Dec. 31, 1978, pp. 47-72.

Office Action issued in corresponding Chinese Patent Application No. 202180058044.8, dated Dec. 24, 2024.

* cited by examiner

FIG. 5
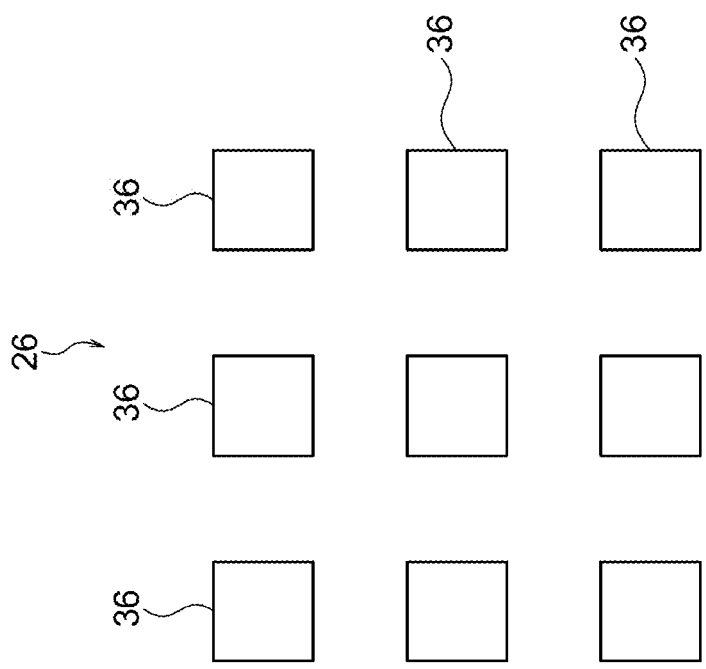
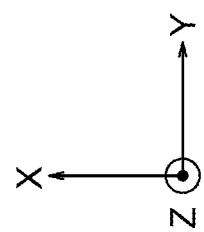

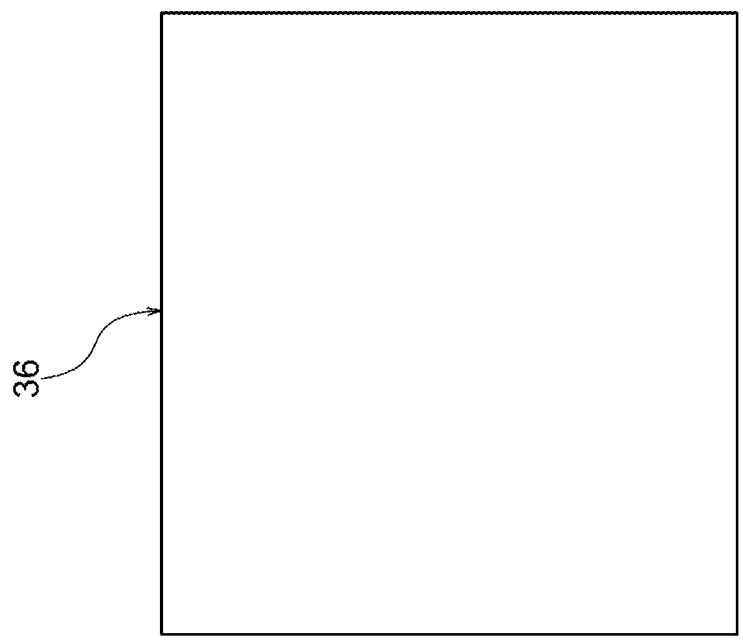
FIG. 33
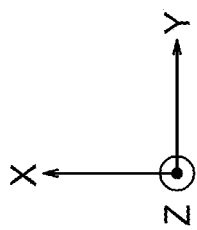

TACTILE SENSING SYSTEM

TECHNICAL FIELD

The technique disclosed in the present application relates to a tactile sensing system.

BACKGROUND ART

The following techniques, for example, are known as tactile sensing systems having tactile sensors that contact an object.

Namely, Patent Document 1 discloses a touchpad device having a tactile sensor that can output signals corresponding to the pressure distribution and shearing force distribution of a contacting surface that contacts an object, and a microcontroller to which the signals outputted from the tactile sensor are inputted.

Further, Patent Document 2 discloses a tactile detection technique having a tactile sensor that can output signals corresponding to the pressure distribution and shearing force distribution of a contacting surface that contacts an object, and an external power source connected to this tactile sensor.

PRIOR ART DOCUMENTS

Patent Documents

Patent Document 1: Japanese Patent No. 6280579
Patent Document 2: Japanese Patent No. 6488414

SUMMARY OF INVENTION

Technical Problem

Patent Document 1 does not disclose specific use of the pressure distribution and the shearing force distribution that are detected at the tactile sensor.

Patent Document 2 discloses that the above-described tactile detection technique can be applied to a robot that is convenient for personal use and can provide assistance in daily human life, but does not disclose matters relating to a robot having a pair of grasping portions that grasp a workpiece.

In order to highly accurately control a robot having a pair of grasping portions that grasp a workpiece, there is the need for tactile information, which is useful for control of the robot, to be efficiently provided to the controller that controls the robot.

An object of one aspect of the technique disclosed in the present application is to provide a tactile sensing system that can efficiently provide tactile information that is useful for control of a robot having a pair of grasping portions, to a controller that controls the robot.

Solution to Problem

In order to achieve the above-described object, in accordance with one aspect of the technique disclosed in the present application, there is provided a tactile sensing system comprising: a pair of tactile sensors respectively provided at mutually facing surfaces of a pair of grasping portions provided at a robot, the pair of tactile sensors configured to contact a workpiece grasped by the pair of grasping portions; and an output section electrically connected to the pair of tactile sensors, wherein each tactile sensor has an electrostatic capacitance-type sensor portion having a contacting surface configured to contact the workpiece, and having a layered structure in which an elastic layer, and a first electrode layer and a second electrode layer positioned at respective sides of the elastic layer with the elastic layer sandwiched therebetween, are layered in a normal direction of the contacting surface, the first electrode layer has a plurality of first electrodes, the second electrode layer has one or a plurality of second electrodes, two or more of the plurality of first electrodes are partially-overlapping electrodes that partially overlap with the second electrode as viewed in the normal direction, the sensor portion outputs a plurality of signals that respectively correspond to the plurality of first electrodes, and, based on all or some of the plurality of signals, the output section calculates respective pressure values of a plurality of pressure detecting positions within the contacting surface, and, based on all or some of a plurality of partially-overlapping electrode signals, which respectively correspond to the plurality of partially-overlapping electrodes, among the plurality of signals, the output section calculates one aggregate shearing force value for the entire contacting surface, and the output section outputs data of the aggregate shearing force value and data of a pressure distribution expressing the respective pressure values of the plurality of pressure detecting positions.

Advantageous Effects of Invention

In accordance with the tactile sensing system relating to one aspect of the technique disclosed in the present application, tactile information that is useful for control of a robot having a pair of grasping portions can efficiently be provided to a controller that controls the robot.

BRIEF DESCRIPTION OF DRAWINGS

FIG. 5 is a plan view of a second electrode layer of FIG. 3.

FIG. 33 is a plan view of a second electrode layer of FIG. 32.

DESCRIPTION OF EMBODIMENTS

An embodiment of the technique disclosed in the present application is described in detail hereinafter with reference to the appended drawings.

(Example of Robot System 100)

First, an overview of an example of a robot system 100 is described.

Figure 1:
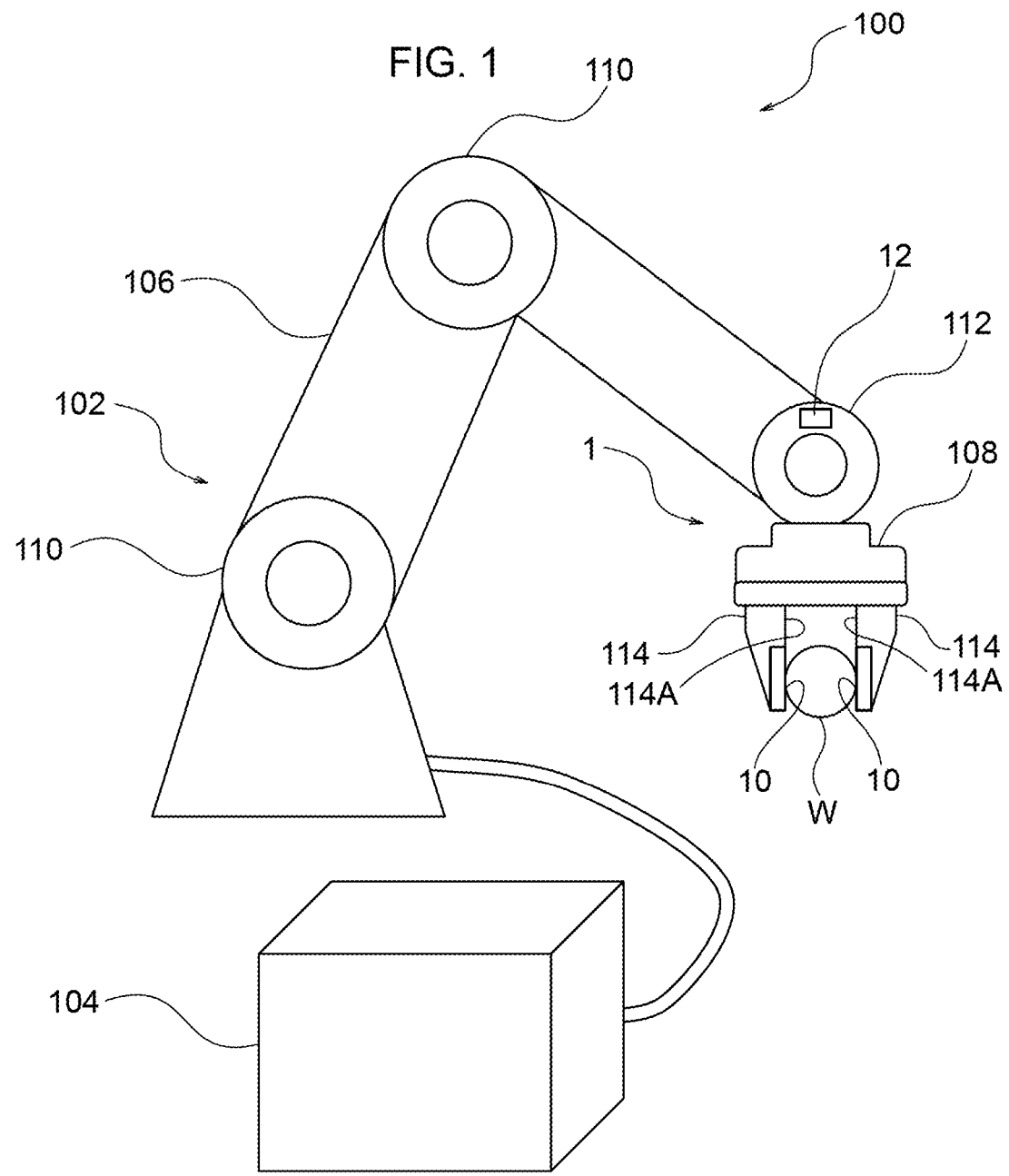
FIG. 1 is a perspective view illustrating an example of a robot system.

FIG. 1 is a perspective view illustrating an example of the robot system 100. The robot system 100 has a robot 102 and a controller 104. The robot 102 is an articulated robot for example, and has a robot arm 106 and a robot hand 108. The robot arm 106 has plural joint portions 110. The robot hand 108 is provided at the distal end portion of the robot arm 106. The robot hand 108 is connected to the distal end portion of the robot arm 106 via a wrist joint portion 112.

A pair of grasping portions 114 are provided at the robot hand 108. The pair of grasping portions 114 are disposed so as to face one another. The pair of grasping portions 114 approach and move away from one another in the direction in which they face one another, due to the driving of an unillustrated driving section. When the pair of grasping portions 114 move in directions of approaching one another in a state in which a workpiece W is disposed therebetween, the workpiece W is grasped by the pair of grasping portions 114.

The controller 104 controls the robot 102, and is electrically connected to the robot 102. In FIG. 1, as an example, the controller 104 is connected to the robot 102 by a wire, but the controller 104 may be wirelessly connected to the robot 102.

(Example of Tactile Sensing System 1)

An overview of an example of a tactile sensing system 1 is described next.

The tactile sensing system 1 is installed in the robot system 100. The tactile sensing system 1 has a pair of tactile sensors 10 and an output section 12. The pair of tactile sensors 10 are provided respectively at mutually facing surfaces 114A of the pair of grasping portions 114. The pair of tactile sensors 10 are provided at positions that contact the workpiece W in the state in which the workpiece W is grasped by the pair of grasping portions 114, i.e., as an example, are provided at the portions, which face one another, of the distal end portions of the pair of grasping portions 114.

The output section 12 is electrically connected to the pair of tactile sensors 10. The output section 12 may be connected to the pair of tactile sensors 10 by wires, or may be wirelessly connected to the pair of tactile sensors 10. As described in detail later, the output section 12 has the functions of carrying out various types of processings on the basis of data outputted from the pair of tactile sensors 10, and outputting data that is based on the results of these processings to the controller 104. The output section 12 is provided at the wrist joint portion 112 as an example.

Figure 2:
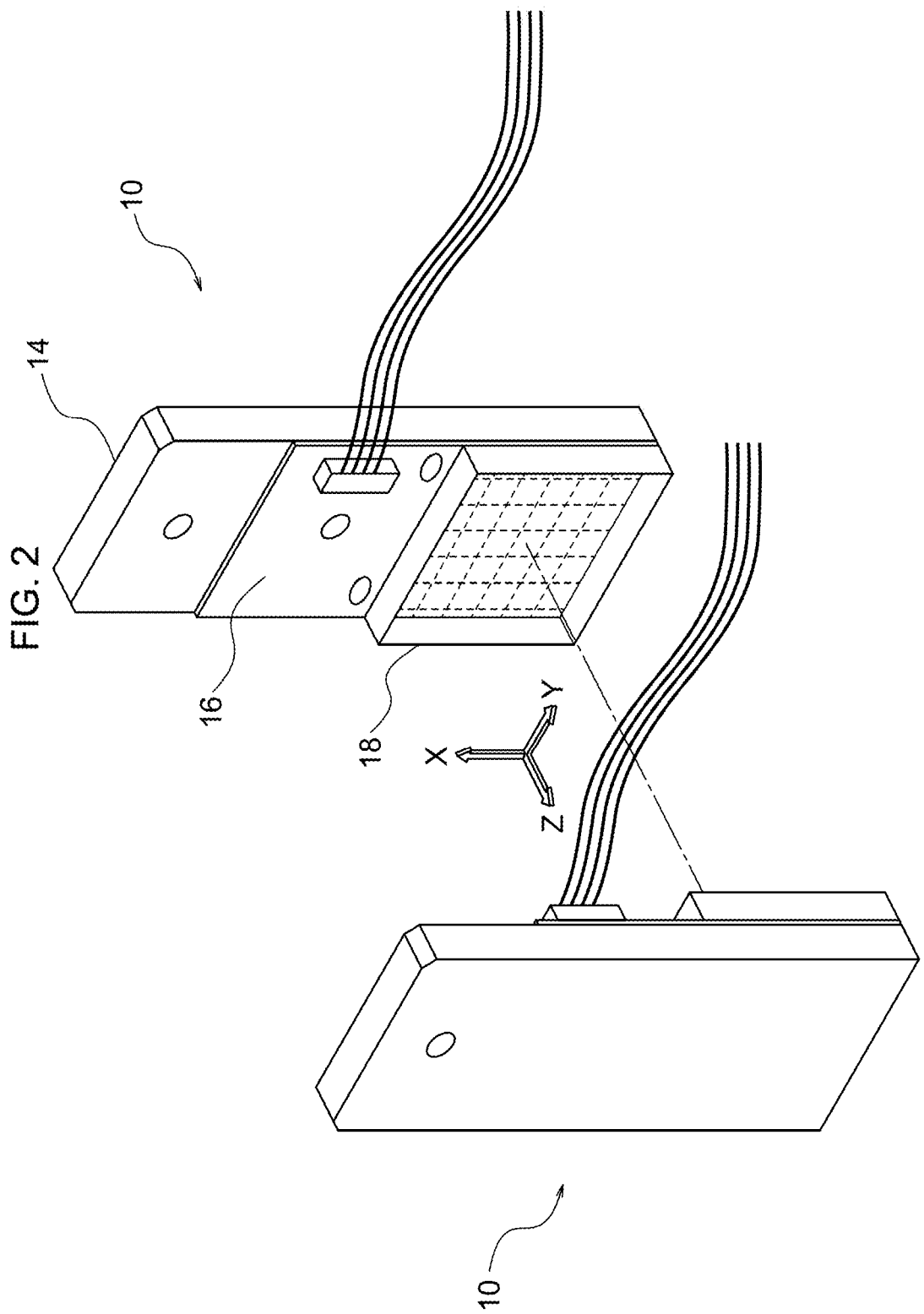
FIG. 2 is a perspective view illustrating an example of a pair of tactile sensors of FIG. 1.

FIG. 2 is a perspective view illustrating an example of the pair of tactile sensors 10 of FIG. 1. As an example, the pair of tactile sensors 10 have plane symmetry in the direction of facing one another. The X-axis direction corresponds to a first direction that is orthogonal to the direction in which the pair of tactile sensors 10 face one another. The Y-axis direction corresponds to a second direction that is orthogonal to the direction in which the pair of tactile sensors 10 face one another. The Z-axis direction corresponds to the direction in which the pair of tactile sensors 10 face one another. The X-axis direction is orthogonal to the Y-axis direction. As an example, the X-axis direction corresponds to the length direction of the tactile sensors 10, and the Y-axis direction corresponds to the width direction of the tactile sensors 10.

The tactile sensor 10 has a supporting plate 14, a substrate 16, and a sensor portion 18. The supporting plate 14 is configured by a body that is separate from the above-described grasping portion 114 (see FIG. 1), and is fixed to the grasping portion 114. The supporting plate 14 may be structured integrally with the grasping portion 114. The substrate 16 is fixed to the supporting plate 14, and the sensor portion 18 is provided on the substrate 16. Details of the sensor portion 18 are described later.

First through fourth embodiments of the tactile sensing system 1 are described next.

First Embodiment

Figure 3:
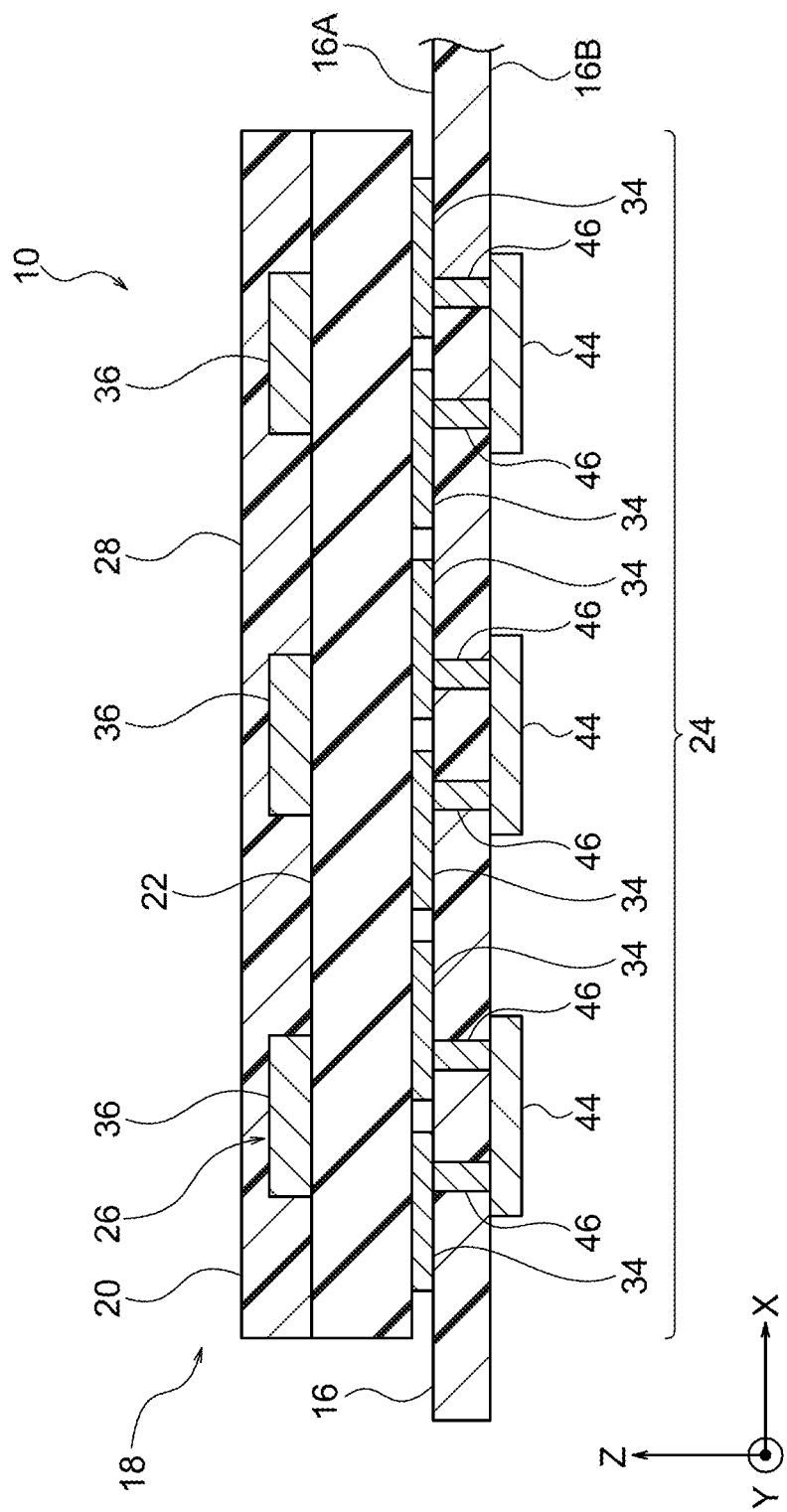
FIG. 3 is a vertical sectional view of the tactile sensor relating to a first embodiment.

A first embodiment is described first.
(Structure of Tactile Sensor 10)
FIG. 3 is a vertical sectional view of the tactile sensor 10 relating to the first embodiment. The tactile sensor 10 relating to the first embodiment has the sensor portion 18 and the substrate 16.

The sensor portion 18 is an electrostatic capacitance-type sensor. More specifically, this sensor portion 18 is a self-capacitance-type sensor, and has a layered structure in which plural layers are layered. Namely, the sensor portion 18 has, as the plural layers, an insulating layer 20, an elastic layer 22, a first electrode layer 24 and a second electrode layer 26. The first electrode layer 24 and the second electrode layer 26 are positioned at the respective sides of the elastic layer 22 so as to sandwich the elastic layer 22 therebetween.

The insulating layer 20 is positioned at the side of the second electrode layer 26, which side is opposite the elastic layer 22. The insulating layer 20 forms the surface layer portion of the sensor portion 18. The obverse of the insulating layer 20 is formed as a contacting surface 28 that contacts the workpiece W (see FIG. 1). Note that the insulating layer 20 may be omitted. In a case in which the insulating layer 20 is omitted, the obverse of the second electrode layer 26, or of a surface layer formed on the second electrode layer 26, is the contacting surface 28.

The elastic layer 22 is a dielectric. The elastic layer 22 is flexible and elastic. The elastic layer 22 is formed by a gel for example. The insulating layer 20, the elastic layer 22, the first electrode layer 24 and the second electrode layer 26 are layered in the Z-axis direction. The Z-axis direction corresponds to the normal direction of the contacting surface 28. The insulating layer 20, the elastic layer 22, the first electrode layer 24 and the second electrode layer 26 are adhered to one another by an adhesive or the like for example. In order to increase the adhesive strength of the sensor portion 18 overall, it is preferable that the insulating layer 20 be a size that covers the entire surface of the second electrode layer 26.

The first electrode layer 24 has plural first electrodes 34. The plural first electrodes 34 are formed on a first surface 16A that is at the sensor portion 18 side of the substrate 16. Plural electrostatic capacitance detecting ICs (Integrated Circuits) 44 are packaged on a second surface 16B, which is at the side opposite the sensor portion 18, of the substrate 16. The plural first electrodes 34 and the plural electrostatic capacitance detecting ICs 44 are connected by through-hole vias 46 that extend in the plate thickness direction of the substrate 16.

Figure 4:
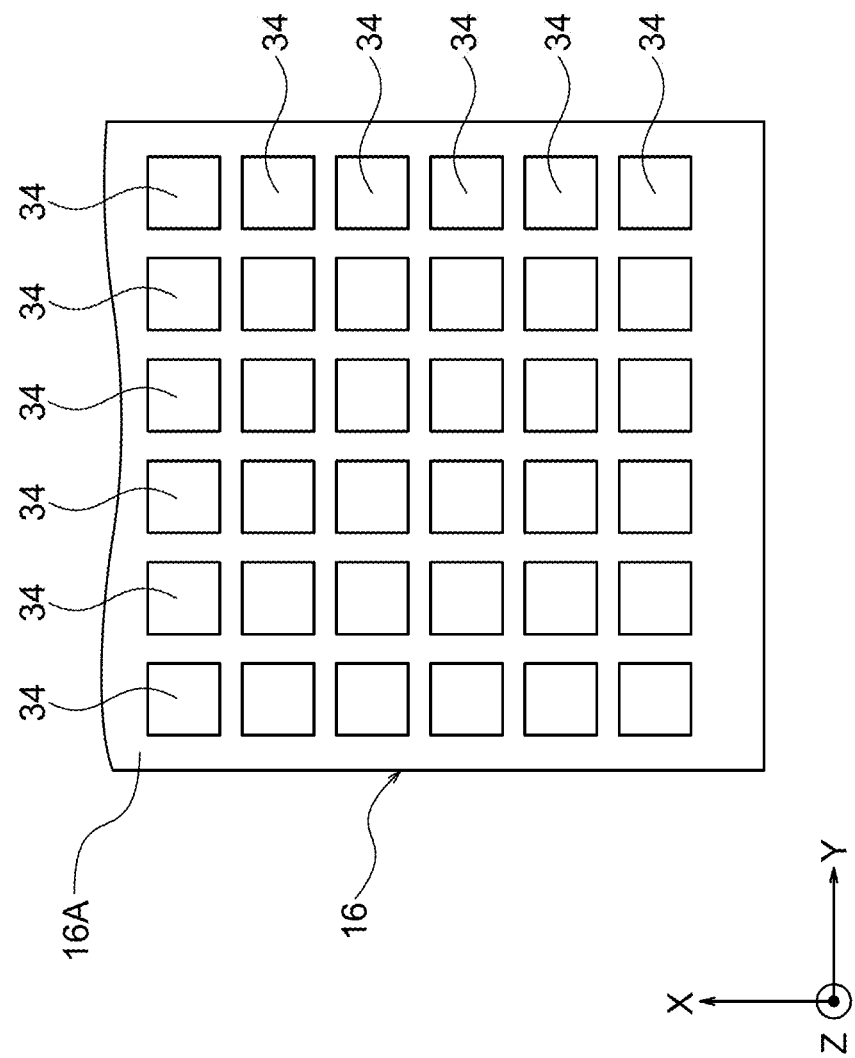
FIG. 4 is a plan view of a substrate of FIG. 3.

FIG. 4 is a plan view of the substrate 16 of FIG. 3. The plural first electrodes 34 that are formed on the first surface 16A of the substrate 16 are arrayed in the form of a matrix along the X-Y plane. Namely, the plural first electrodes 34 are arrayed with the X-axis direction being the length direction and the Y-axis direction being the width direction. The X-Y plane is the plane that is parallel to the aforementioned contacting surface 28 (see FIG. 2)

The plural first electrodes 34 are independent of one another. The plural first electrodes 34 have the same shape. As an example, the plural first electrodes 34 are formed in square shapes as viewed in plan view. Viewing in plan view corresponds to viewing in the Z-axis direction. As an example, the plural first electrodes 34 are arrayed such that there are six thereof in the X-axis direction and six thereof in the Y-axis direction. Namely, the number of the plural first electrodes 34 is 36. These plural first electrodes 34 are arrayed at uniform intervals in the X-axis direction and the Y-axis direction, respectively.

FIG. 5 is a plan view of the second electrode layer 26 of FIG. 3. The second electrode layer 26 is configured by plural second electrodes 36 that are a single layer. The plural second electrodes 36 are formed of a conductive rubber for example. The plural second electrodes 36 are respectively formed in the shapes of flat plates. The plural second electrodes 36 may be connected to the ground of the substrate 16, or may be floating with respect to ground.

The plural second electrodes 36 form plural islands that are independent of one another. The plural second electrodes 36 are arrayed in the form of a matrix along the X-Y plane. Namely, the plural second electrodes 36 are arrayed with the X-axis direction being the length direction and the Y-axis direction being the width direction.

The plural second electrodes 36 are the same shape. As an example, the plural second electrodes 36 are respectively formed in square shapes as viewed in plan view. The number of the plural second electrodes 36 is less than the number of the above-described, plural first electrodes 34 (see FIG. 4). As an example, the plural second electrodes 36 are arrayed such that there are three thereof in the X-axis direction and three thereof in the Y-axis direction. Namely, the number of the plural second electrodes 36 is nine. These plural second electrodes 36 are arrayed at uniform intervals in the X-axis direction and the Y-axis direction, respectively.

Figure 6:
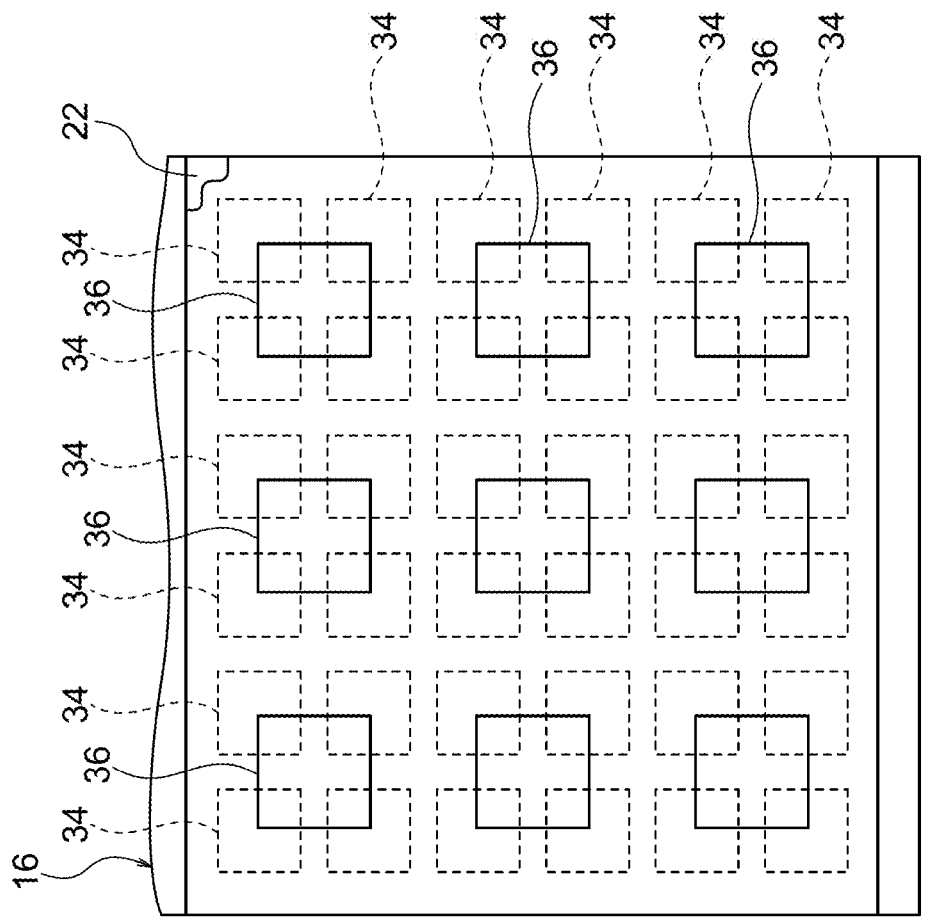
FIG. 6 is a plan view illustrating a state in which plural second electrodes and an elastic layer and the substrate of FIG. 3 are superposed.

FIG. 6 is a plan view illustrating a state in which the plural second electrodes 36 and the elastic layer 22 and the substrate 16 of FIG. 3 are superposed. The plural second electrodes 36 are disposed so as to be superposed with all of the plural first electrodes 34 as viewed in plan view. As viewed in plan view, the plural second electrodes 36 are respectively formed so as to partially overlap with the respective, four first electrodes 34 that are adjacent in the X-axis direction and the Y-axis direction, among the plural first electrodes 34. As viewed in plan view, the respective second electrodes 36 are positioned at the central portions of the four first electrodes 34, and partially overlap with these four first electrodes 34.

In this way, in the first embodiment, all of the plural first electrodes 34 partially overlap with the plural second electrodes 36. In this first embodiment, all of the plural first electrodes 34 correspond to an example of the "plurality of partially-overlapping electrodes that partially overlap with the plurality of second electrodes", and the plural signals that are outputted from the plural first electrodes 34 correspond to an example of the "plurality of partially-overlapping electrode signals".

Electrostatic capacitance C[F] between the first electrode 34 and the second electrode 36 is determined by the following formula.

$$C = \varepsilon \times A/d$$

$\varepsilon$ is the dielectric constant [Fm$^{-1}$] of the elastic layer 22, A is the surface area [m$^2$] over which the first electrode 34 and the second electrode 36 overlap one another as viewed in plan view, and d is the distance [m] between the first electrode 34 and the second electrode 36 along the Z-axis direction.

At this sensor portion 18, when pressure is applied to the contacting surface 28, and the distance d between each first electrode 34 and the second electrode 36 changes, the electrostatic capacitance C changes in accordance with this change in the distance d. Further, at the sensor portion 18, when shearing force is applied to the contacting surface 28, and the surface area A over which each first electrode 34 and the second electrode 36 overlap one another changes, the electrostatic capacitance C changes in accordance with this change in the surface area A.

Note that, although described in detail hereinafter, the pressure that is applied to the contacting surface 28 corresponds to the force that is applied to the contacting surface 28 along the Z-axis direction. Further, the shearing force that is applied to the contacting surface 28 corresponds to the force that is applied to the contacting surface 28 along a direction orthogonal to the Z-axis direction. Directions orthogonal to the Z-axis direction include the X-axis direction, the Y-axis direction, and directions that combine the X-axis direction and the Y-axis direction.

The plural first electrodes 34 are driven by the electrostatic capacitance detecting ICs 44 (see FIG. 3 and FIG. 7) that are described later, and respectively output signals corresponding to the electrostatic capacitances C between the first electrodes 34 and the second electrodes 36. Namely, the sensor portion 18 outputs plural signals that respectively correspond to the plural first electrodes 34. These plural signals are analog signals.

Figure 7:
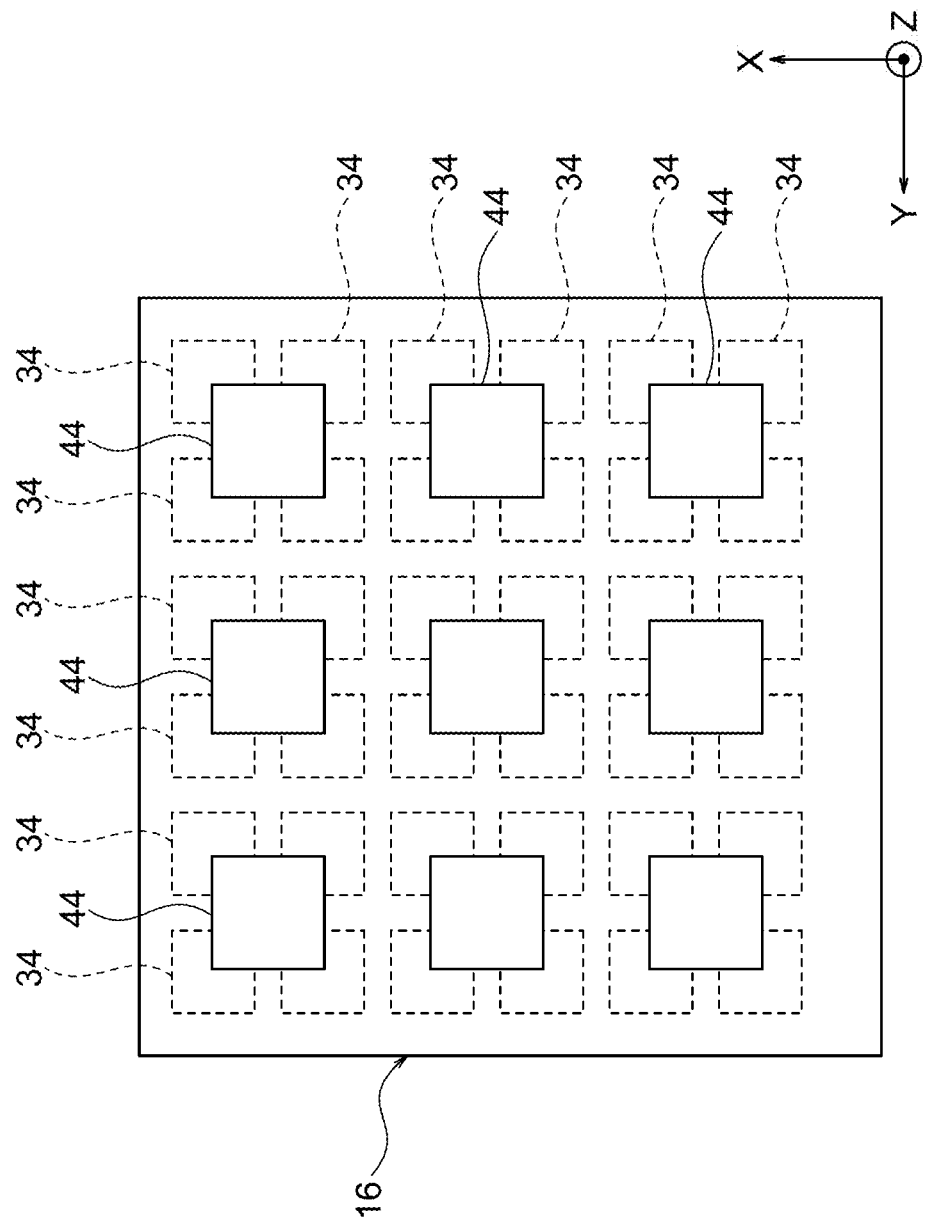
FIG. 7 is a bottom view of the substrate of FIG. 3.

FIG. 7 is a bottom view of the substrate 16 of FIG. 3. The plural electrostatic capacitance detecting ICs 44 are arrayed in the form of a matrix along the X-Y plane. Namely, the plural electrostatic capacitance detecting ICs 44 are arrayed with the X-axis direction being the length direction and the Y-axis direction being the width direction. The plural electrostatic capacitance detecting ICs 44 have the same structure. As an example, the plural electrostatic capacitance detecting ICs 44 are arrayed such that there are three thereof in the X-axis direction and three thereof in the Y-axis direction. Namely, the number of the plural electrostatic capacitance detecting ICs 44 is nine.

To each of the electrostatic capacitance detecting ICs 44 is connected the four first electrodes 34 that overlap that electrostatic capacitance detecting IC as viewed in plan view. Each of the electrostatic capacitance detecting ICs 44 drives the four first electrodes 34, and is a structure that can output data corresponding to the signals outputted from those four first electrodes 34.

(Method of Manufacturing Tactile Sensor 10)

Figure 8:
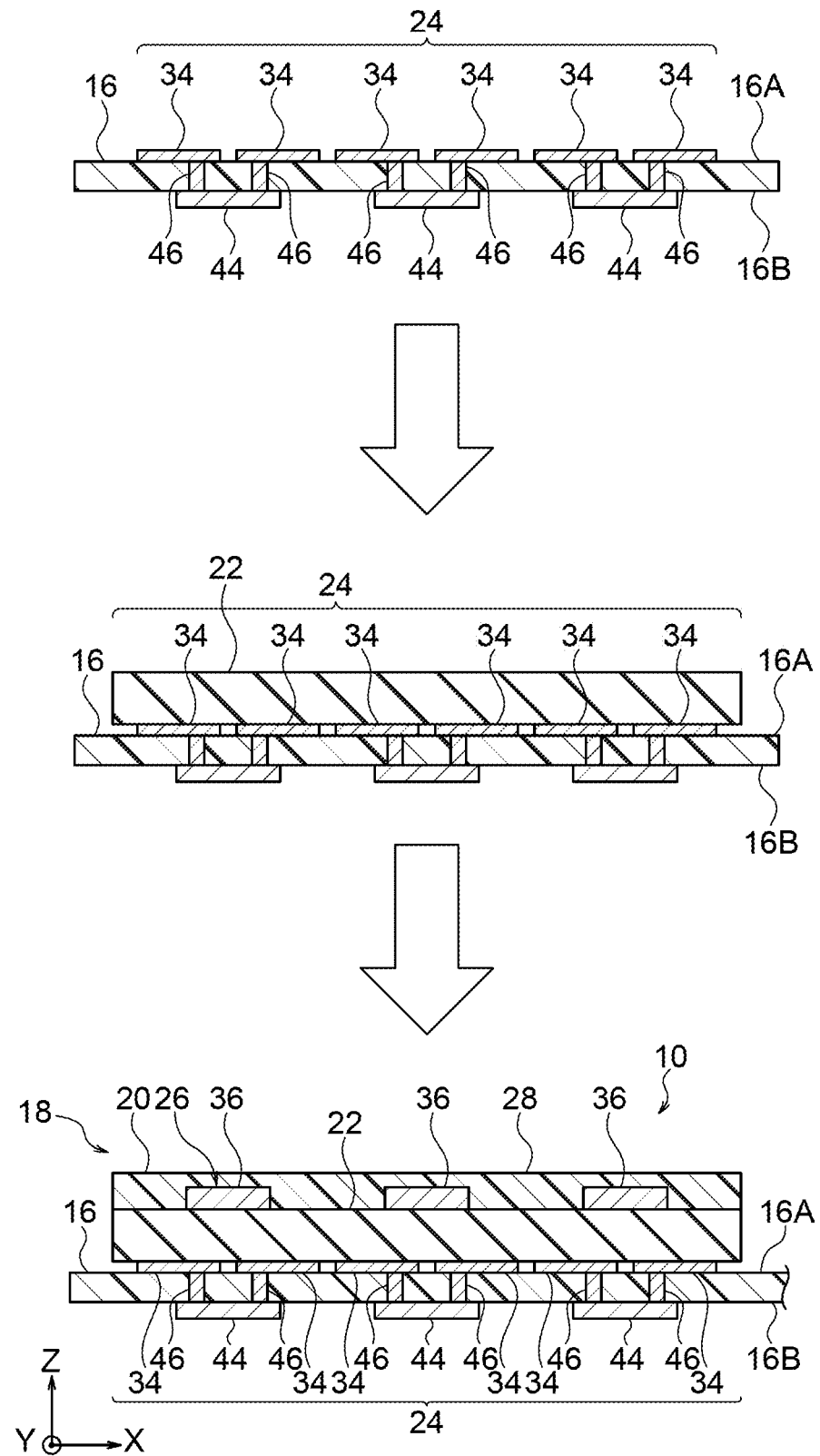
FIG. 8 is a drawing explaining an example of a method of manufacturing the tactile sensor of FIG. 3.

FIG. 8 is a drawing explaining an example of a method of manufacturing the tactile sensor 10 of FIG. 3. The tactile sensor 10 is manufactured by the following procedures for example. Namely, the plural electrostatic capacitance detecting ICs 44 are packaged on the second surface 16B of the substrate 16 at which the plural first electrodes 34 are formed on the first surface 16A by a pattern. The plural through-hole vias 46 are formed in the substrate 16, and the plural electrostatic capacitance detecting ICs 44 are connected to the plural first electrodes 34 via the plural through-hole vias 46.

Next, the elastic layer 22 is layered on the first electrode layer 24 that has the plural first electrodes 34. Further, the second electrode layer 26 that is configured by the plural second electrodes 36 (see FIG. 5) is layered on the elastic layer 22, and moreover, the insulating layer 20 is layered on this second electrode layer 26. The insulating layer 20, the elastic layer 22, the first electrode layer 24 and the second electrode layer 26 are adhered to one another by an adhesive or the like for example. The tactile sensor 10 is manufactured by the above-described procedures.

(Pressure Distribution)

Figure 9:
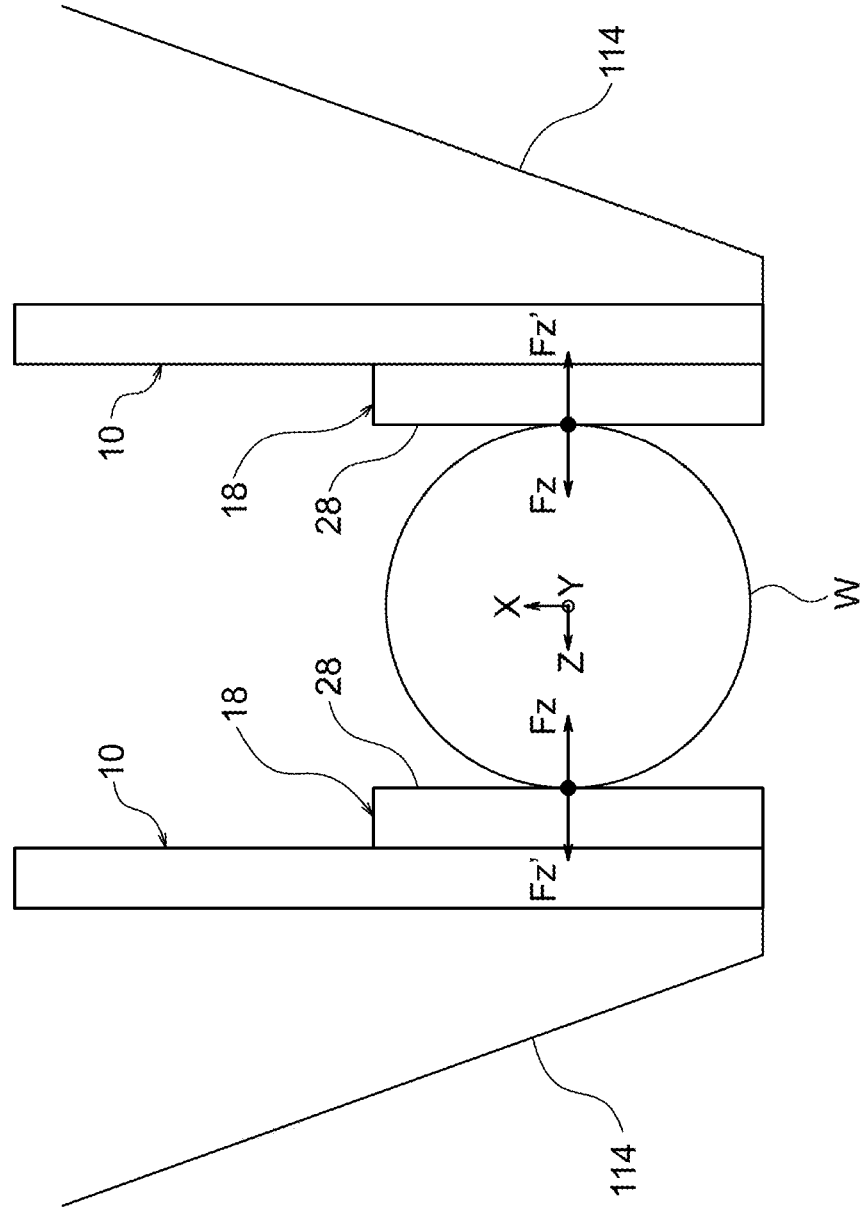
FIG. 9 is a drawing illustrating a first example of a state in which a workpiece is grasped by a pair of grasping portions of FIG. 1.

FIG. 9 is a drawing illustrating a first example of a state in which the workpiece W is grasped by the pair of grasping portions 114 of FIG. 1. As an example, the workpiece W is a cylinder or a sphere. In a case in which the workpiece W that is a cylinder or a sphere is grasped by the pair of grasping portions 114, positions that contact the workpiece W and where the pressure is high, and positions that do not contact the workpiece W and to which pressure is not applied, arise within the contacting surfaces 28. Namely, the pressure distributions of the contacting surfaces 28 are non-uniform.

Figure 10:
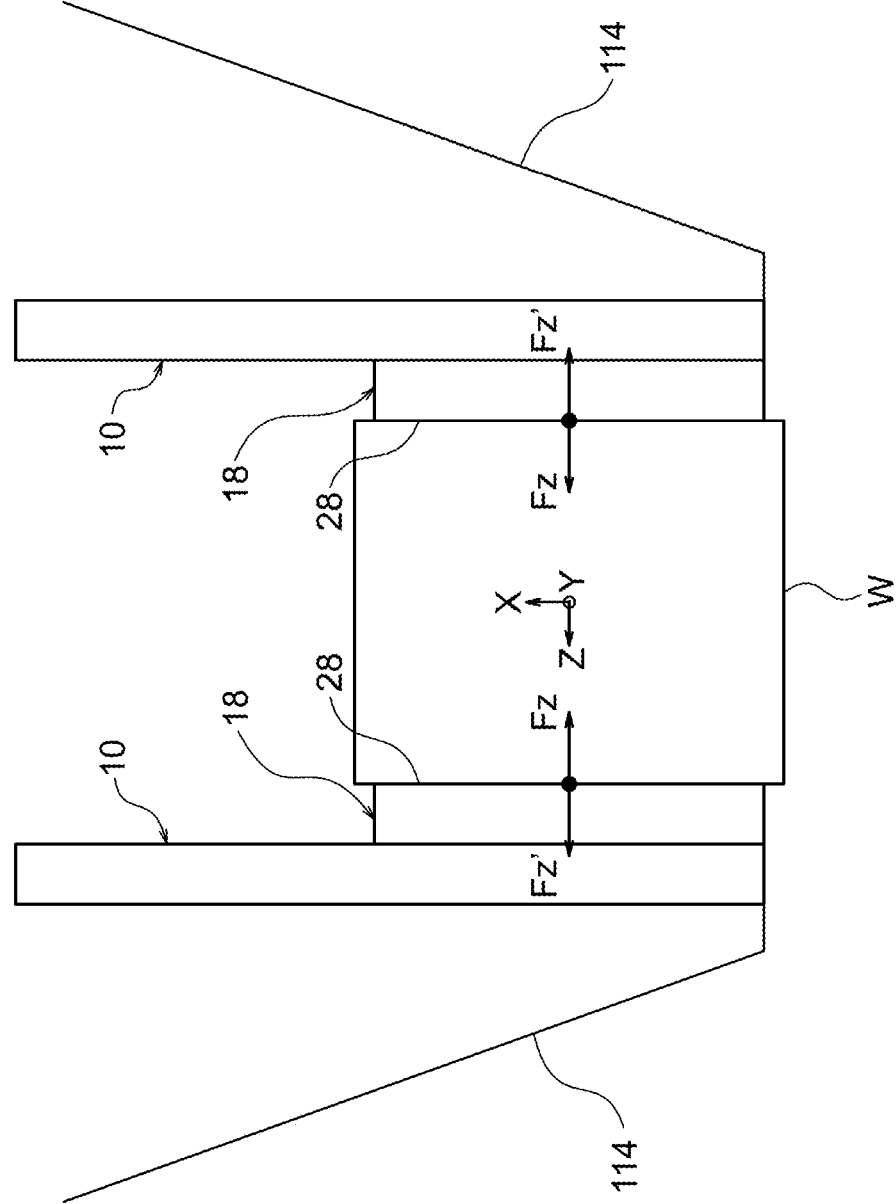
FIG. 10 is a drawing illustrating a second example of a state in which the workpiece is grasped by the pair of grasping portions of FIG. 1.

FIG. 10 is a drawing illustrating a second example of a state in which the workpiece W is grasped by the pair of grasping portions 114 of FIG. 1. As an example, the workpiece W is a quadrangular pillar or a rectangular parallelepiped. The surfaces of the workpiece W are larger than the contacting surfaces 28. In a case in which the workpiece W that is such a quadrangular pillar or rectangular parallelepiped is grasped by the pair of grasping portions 114, pressure is applied uniformly to the contacting surfaces 28. Namely, the pressure distributions of the contacting surfaces 28 are uniform.

(Grasping Force Fz and Normal Load Fz')

As illustrated in FIG. 9 and FIG. 10, in a case in which the workpiece W is grasped by the pair of grasping portions 114, normal loads Fz', which are the reaction forces of grasping forces Fz of the pair of grasping portions 114 in the directions opposite the grasping forces Fz, are applied to the contacting surfaces 28. The grasping forces Fz and the normal loads Fz' are forces along the Z-axis direction.

(Shearing Forces Fx, Fy and Moments Mx, My, Mz)

Figure 11:
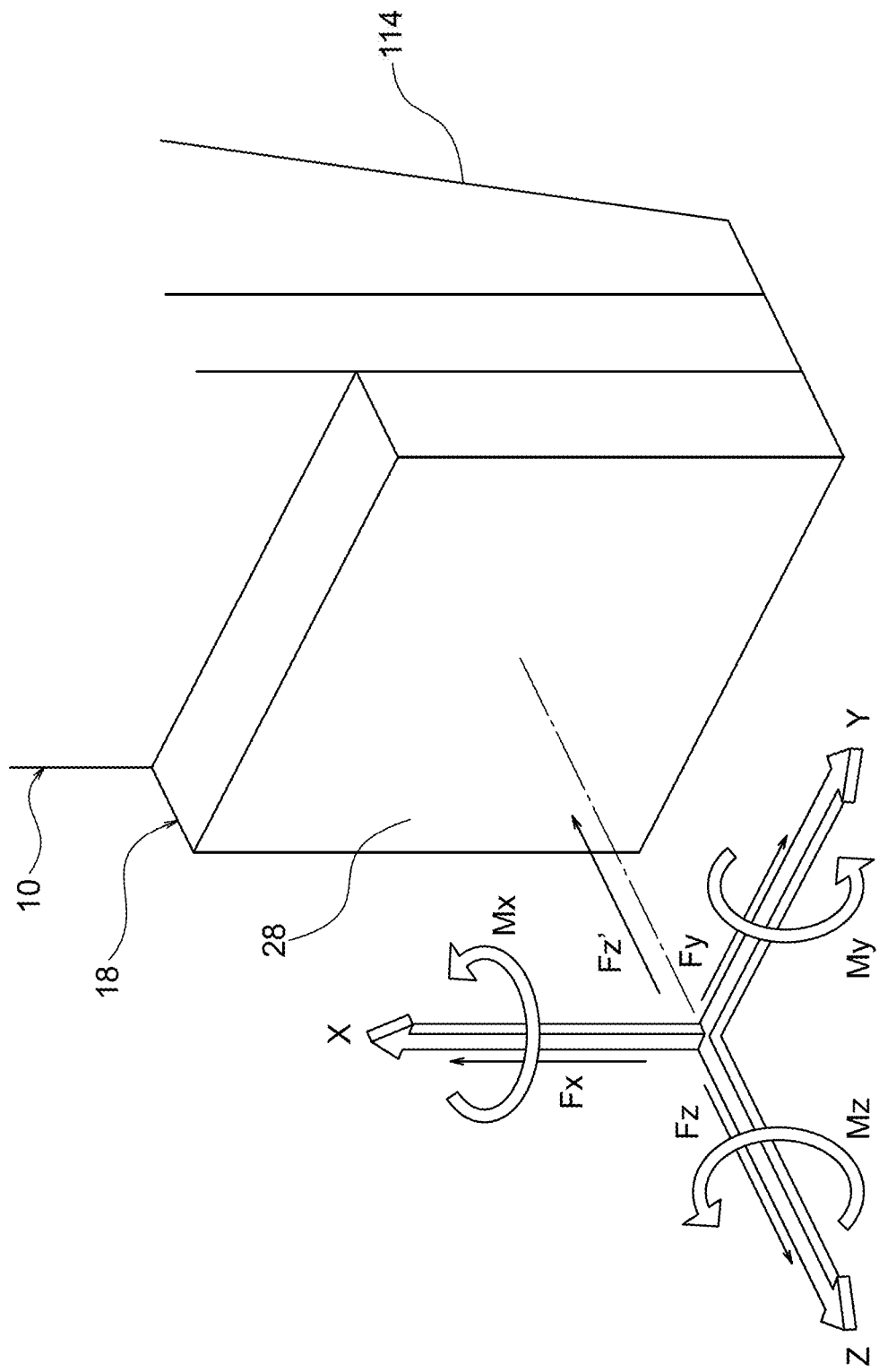
FIG. 11 is a drawing illustrating an example of shearing forces and moments applied to a contacting surface of the tactile sensor of FIG. 3.

FIG. 11 is a drawing illustrating an example of shearing forces Fx, Fy and moments Mx, My, Mz applied to the contacting surface 28 of the tactile sensor 10 of FIG. 3. Accompanying the application of force to an unillustrated workpiece, there are cases in which the shearing forces Fx, Fy and the moments Mx, My, Mz are applied to the contacting surface 28 of the tactile sensor 10. The shearing force Fx is a force along the X-axis direction, and the shearing force Fy is a force along the Y-axis direction.

Further, the moment Mx is the moment around the X-axis direction, the moment My is the moment around the Y-axis direction, and the moment Mz is the moment around the Z-axis direction.

Figure 12:
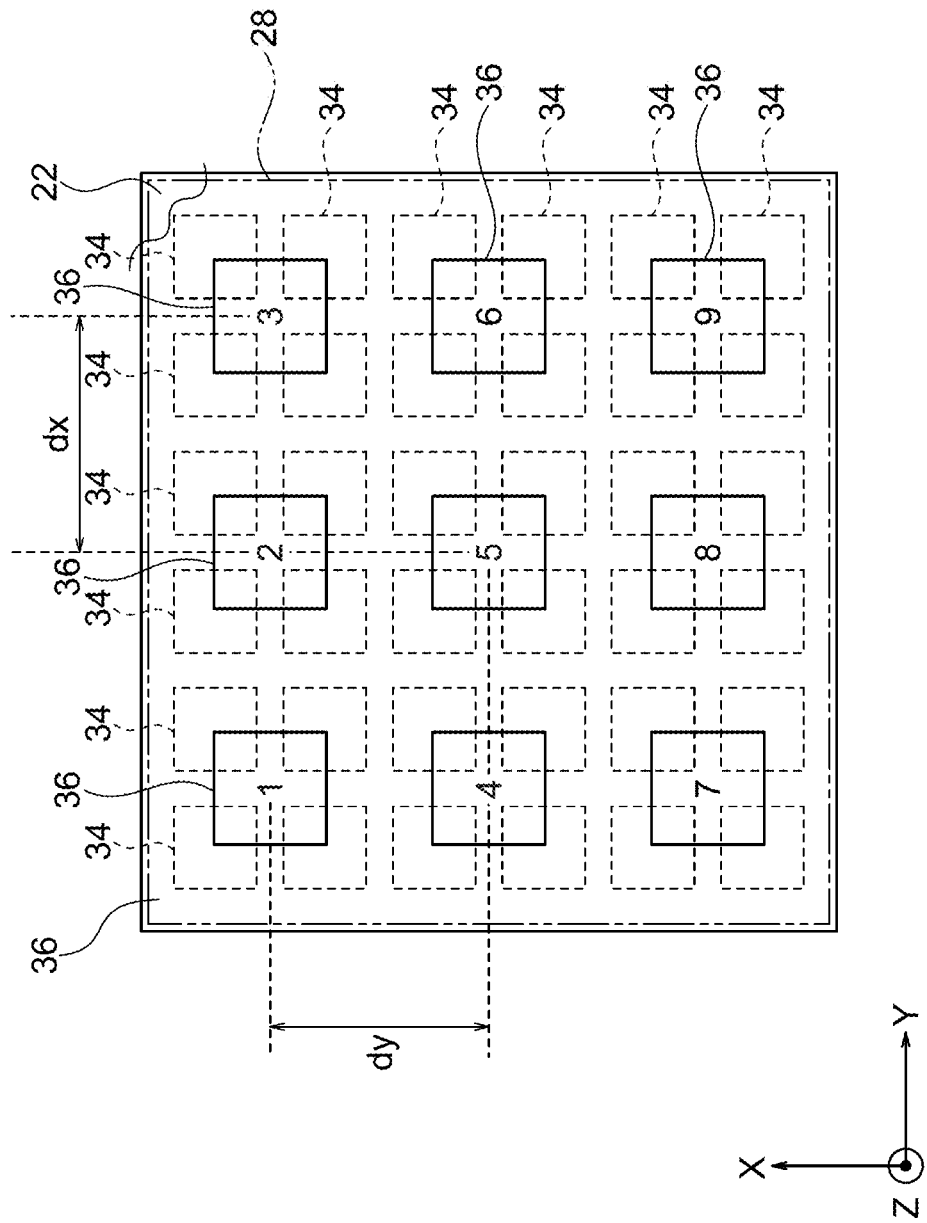
FIG. 12 is a drawing illustrating an example of moment lengths at the tactile sensor of FIG. 3.

FIG. 12 is a drawing illustrating an example of moment lengths dx, dy at the tactile sensor 10 of FIG. 3. Note that, in FIG. 12, identification numbers 1~9 are illustrated for the plural second electrodes 36. When identifying the plural second electrodes 36, the plural second electrodes 36 are called the second electrodes 36-1~9, respectively.

The moment length dx illustrated in FIG. 12 is the length used at the time of calculating the moment Mx around the X-axis direction (see FIG. 11). As an example, the moment length dx corresponds to the distance along the Y-axis direction between the center of the contacting surface 28 and the center of the second electrode 36-3 that is at a position that is apart in the Y-axis direction from the center of the contacting surface 28.

The moment length dy illustrated in FIG. 12 is the length used at the time of calculating the moment My around the Y-axis direction (see FIG. 11). As an example, the moment length dy corresponds to the distance along the X-axis direction between the center of the contacting surface 28 and the center of the second electrode 36-1 that is at a position that is apart in the X-axis direction from the center of the contacting surface 28.

(Explanation of Displacements $\Delta x$, $\Delta y$, $\Delta z$)

Figure 13:
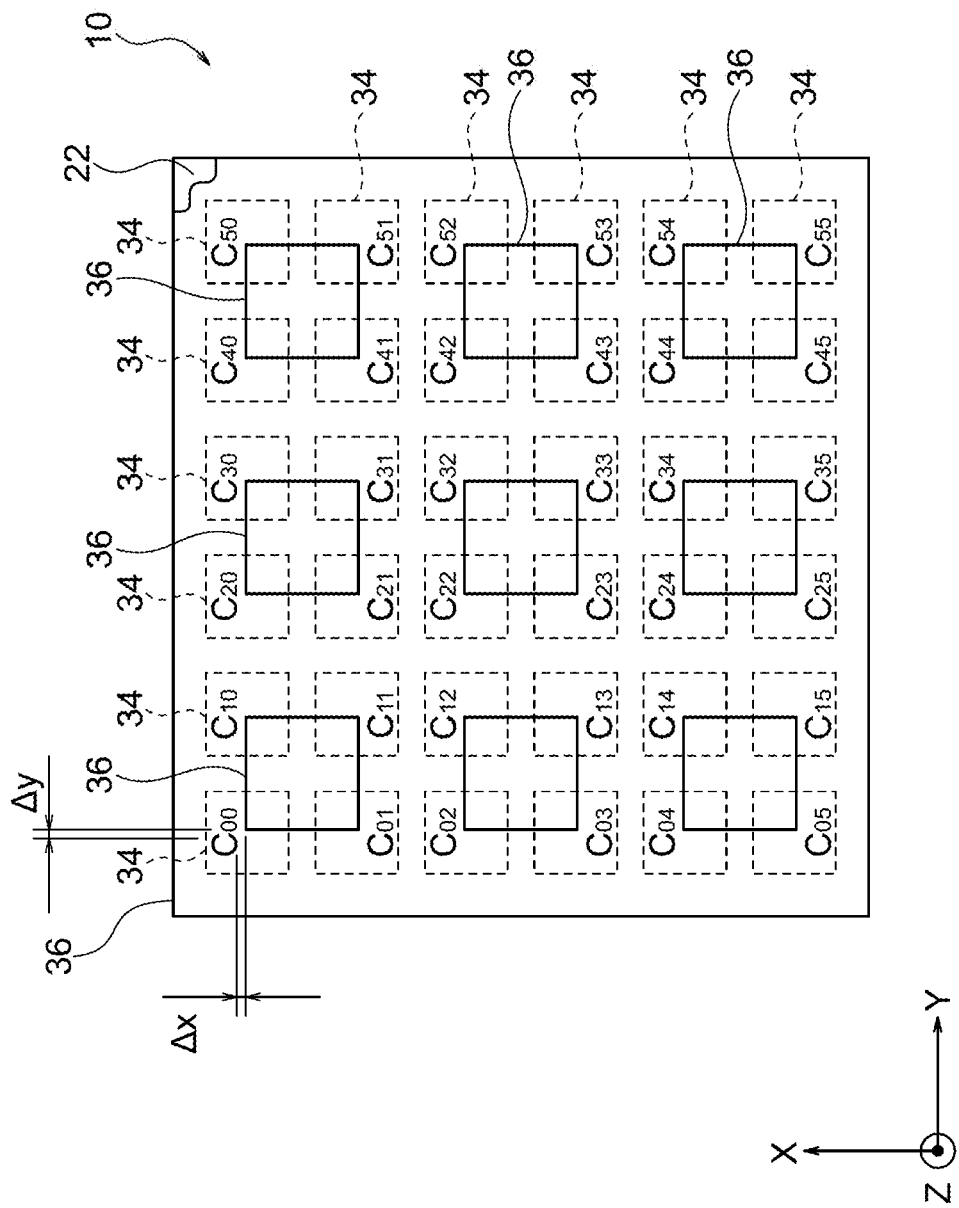
FIG. 13 is a plan view explaining an example of displacement $\Delta x$ and displacement $\Delta y$ at the tactile sensor of FIG. 3.

FIG. 13 is a plan view explaining an example of displacement $\Delta x$ and displacement $\Delta y$ at the tactile sensor 10 of FIG. 3. Note that, in FIG. 13, electrostatic capacitances $C_{00}$~$C_{55}$ between the respective, plural first electrodes 34 and the second electrodes 36 are illustrated so as to correspond to the plural first electrodes 34, respectively.

Figure 14:
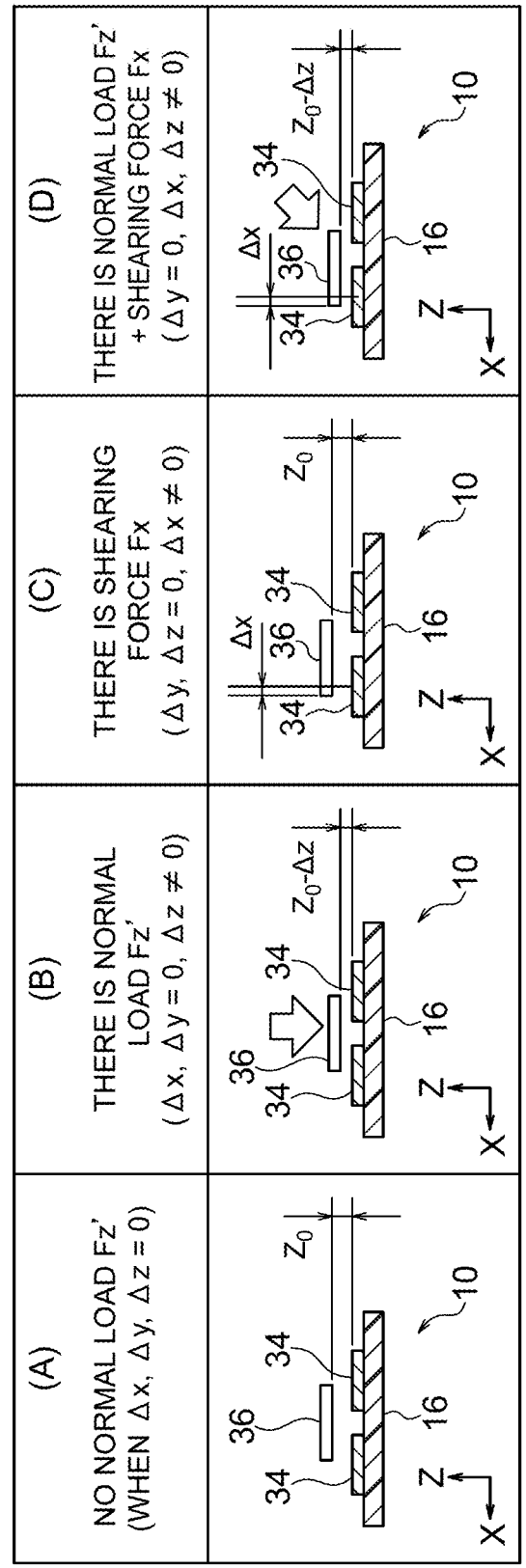
FIG. 14 is a drawing explaining examples of displacement $\Delta x$ and displacement $\Delta z$ at the tactile sensor of FIG. 3.

FIG. 14 is a drawing explaining examples of displacement $\Delta x$ and displacement $\Delta z$ at the tactile sensor 10 of FIG. 3. In FIG. 14, (A) illustrates a case in which there is no normal load Fz', (B) illustrates a case in which there is the normal load Fz', (C) illustrates a case in which there is the shearing force Fx, and (D) illustrates a case in which there is the normal load Fz' and there is the shearing force Fx, respectively.

Figure 15:
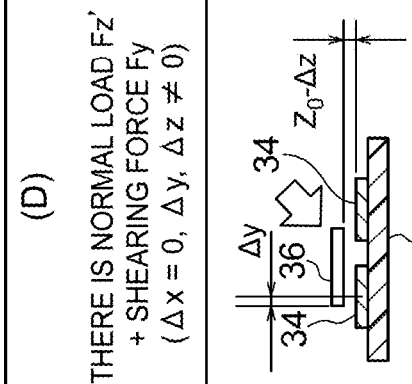
FIG. 15 is a drawing explaining examples of displacement $\Delta y$ and displacement $\Delta z$ at the tactile sensor of FIG. 3.

FIG. 15 is a drawing explaining examples of displacement $\Delta y$ and displacement $\Delta z$ at the tactile sensor 10 of FIG. 3. In FIG. 15, (A) illustrates a case in which there is no normal load Fz', (B) illustrates a case in which there is the normal load Fz', (C) illustrates a case in which there is the shearing force Fy, and (D) illustrates a case in which there is the normal load Fz' and there is the shearing force Fy, respectively.

As illustrated in FIG. 13 and FIG. 14, displacement $\Delta x$ corresponds to the distance that the second electrode 36 moves along the X-axis direction accompanying application of the shearing force Fx. Similarly, as illustrated in FIG. 13 and FIG. 15, displacement $\Delta y$ corresponds to the distance that the second electrode 36 moves along the Y-axis direction accompanying application of the shearing force Fy.

As illustrated in FIG. 14 and FIG. 15, distance $Z_0$ corresponds to the distance along the Z-axis direction between the first electrode 34 and the second electrode 36 at the time when the normal load Fz' is not applied. Displacement $\Delta z$ corresponds to the distance that the second electrode 36 moves along the Z-axis direction toward the first electrode 34 side accompanying application of the normal load Fz'.

Examples of calculating the displacements $\Delta x$, $\Delta y$, $\Delta z$ are described hereinafter by using the first electrodes 34, which are adjacent to one another and partially overlap with one of the second electrodes 36, as an example.

(When Normal Load Fz' is not Applied: $\Delta x$, $\Delta y$, $\Delta z=0$)

As illustrated in FIG. 14(A) and FIG. 15(A), when the normal load Fz' is not applied, $\Delta x$, $\Delta y$, $\Delta z=0$, and Formula 1 is established for the first electrodes 34 that are adjacent to one another and partially overlap with the second electrode 36.

$$C_{00\_0}=K1/Z_0$$

$$C_{01\_0}=K2/Z_0 \qquad \text{[Formula 1]}$$

$C_{00\_0}$, $C_{01\_0}$ are the electrostatic capacitances between the adjacent first electrodes 34 and the second electrode 36 when normal load Fz' is not applied, and K1, K2 are constants.

A formula similar to Formula 1 is established also for the electrostatic capacitances between the other adjacent first electrodes 34 and the second electrode 36.

(When Only Normal Load Fz' is Applied: $\Delta x$, $\Delta y=0$, $\Delta z \neq 0$)

As illustrated in FIG. 14(B) and FIG. 15(B), when only the normal load Fz' is applied, $\Delta x$, $\Delta y=0$, and $\Delta z \neq 0$, and Formula 2 is established for the first electrodes 34 that are adjacent to one another and partially overlap with the second electrode 36.

$$C_{00\_z}=K1/(Z_0-\Delta z)$$

$$C_{01\_z}=K2/(Z_0-\Delta z) \qquad \text{[Formula 2]}$$

$C_{00\_z}$, $C_{01\_z}$ are the electrostatic capacitances between the adjacent first electrodes 34 and the second electrode 36 when only the normal load Fz' is applied.

The following are determined from Formula 2.

$$C_{00\_z}/K1=1/(Z_0-\Delta z)$$

$$Z_0-\Delta z=K1/C_{00\_z}$$

$$\Delta z=Z_0-K1/C_{00\_z}$$

From Formula 1, the displacement $\Delta z$ of the second electrode 36 with respect to one first electrode 34 is determined as follows.

$$Z_0=K1/C_{00\_0}$$

$$\therefore \Delta z=K1(1/C_{00\_0}-1/C_{00\_z})$$

Similarly, the displacement $\Delta z$ of the second electrode 36 with respect to the other first electrode 34 is determined as follows.

$$\Delta z=K2(1/C_{01\_0}-1/C_{01\_z})$$

The displacement $\Delta z$ of the second electrode 36 with respect to the other first electrodes 34 is determined in the same way as described above.

(When Only Shearing Force Fx is Applied: $\Delta y$, $\Delta z=0$, $\Delta x \neq 0$)

As illustrated in FIG. 14(C), when only the shearing force Fx is applied, $\Delta y$, $\Delta z=0$, and $\Delta x \neq 0$, and Formula 3 is established for the first electrodes 34 that are adjacent to one another and partially overlap with the second electrode 36.

$$C_{00\_x}=K1/Z_0+\Delta x \cdot Kp/Z_0$$

$$C_{01\_x}=K2/Z_0-\Delta x \cdot Kp/Z_0 \qquad \text{[Formula 3]}$$

$C_{00\_x}$, $C_{01\_x}$ are the electrostatic capacitances between the first electrodes 34 that are adjacent to one another in the x direction and the second electrode 36 when only the shearing force Fx is applied, and Kp is a constant.

The following are determined from Formula 3.

$$\Delta x \cdot Kp/Z_0 = C_{00\_x} - K1/Z_0$$

$$\Delta x \cdot Kp = Z_0 \cdot C_{00\_x} - K1$$

$$\Delta x = (Z_0 \cdot C_{00\_x} - K1)/Kp$$

From Formula 1, because $K1 = Z_0 \times C_{00\_0}$, the displacement $\Delta x$ of the second electrode 36 with respect to one first electrode 34 is determined as follows.

$$\Delta x = (Z_0 \cdot C_{00\_x} - Z_0 \times C_{00\_0})/Kp$$

$$\Delta x = Z_0/Kp \times (C_{00\_x} - C_{00\_0})$$

Similarly, the displacement $\Delta x$ of the second electrode 36 with respect to the other first electrode 34 is determined as follows.

$$\Delta x = Z_0/Kp \times (C_{01\_0} - C_{01\_x})$$

The displacement $\Delta x$ of the second electrode 36 with respect to the other first electrodes 34 is determined in the same way as described above.

(When Only Shearing Force Fy is Applied: $\Delta x$, $\Delta z = 0$, $\Delta y \ne 0$)
As shown in FIG. 15(C), when only the shearing force Fy is applied, the displacement $\Delta y$ of the second electrode 36 with respect to the first electrode 34 is determined by calculation that is similar to when only the shearing force Fx is applied.
(When Normal Load Fz' and Only Shearing Force Fx are Applied: $\Delta y = 0$, $\Delta x$, $\Delta z \ne 0$)
As illustrated in FIG. 14(D), when the normal load Fz' and only the shearing force Fx are applied, $\Delta y = 0$, and $\Delta x$, $\Delta z \ne 0$, and Formula 4 is established for the first electrodes 34 that are adjacent to one another in the x direction and partially overlap with the second electrode 36.

$$C_{00\_zx} = K1/(Z_0 - \Delta z) + \Delta x \cdot Kp/(Z_0 - \Delta z)$$

$$C_{01\_zx} = K2/(Z_0 - \Delta z) - \Delta x \cdot Kp/(Z_0 - \Delta z) \quad \text{[Formula 4]}$$

$C_{00\_zx}$, $C_{01\_zx}$ are the electrostatic capacitances between the first electrodes 34 and the second electrode 36 when the normal load Fz' and only the shearing force Fx are applied.

From Formula 4, the displacements $\Delta z$, $\Delta x$ of the second electrode 36 with respect to the first electrode 34 are determined as follows.

$$\Delta z = (K1 + K2)\{1/(C_{00\_0} + C_{01\_0}) - 1/(C_{00\_zx} + C_{01\_zx})\}$$

$$\Delta x = (K1 + K2)/2Kp \cdot (C_{00\_zx} - C_{01\_zx})/(C_{00\_zx} + C_{01\_zx})$$

The displacements $\Delta z$, $\Delta x$ of the second electrode 36 with respect to the other first electrode 34 are determined in the same way as described above.
(When Normal Load Fz' and Only Shearing Force Fy are Applied: $\Delta x = 0$, $\Delta y$, $\Delta z \ne 0$)
As illustrated in FIG. 15(D), when the normal load Fz' and only the shearing force Fy are applied, the displacements $\Delta z$, $\Delta y$ of the second electrode 36 with respect to the first electrodes 34 that are adjacent to one another are determined by calculation that is similar to when the normal load Fz' and only the shearing force Fx are applied.
(When Normal Load Fz' and Shearing Forces Fx, Fy are Applied: $\Delta x$, $\Delta y$, $\Delta z \ne 0$)
When the normal load Fz' and the shearing forces Fx, Fy are applied, the displacements $\Delta x$, $\Delta y$, $\Delta z$ of the second electrode 36 with respect to the first electrode 34 can be determined as follows. In the range of the four first electrodes 34 that partially overlap with the one second electrode 36, it is often the case that the values of the displacement $\Delta z$ at the respective first electrodes 34 approximate one another, and therefore, it is assumed that the value of the displacement $\Delta z$ can be used in common therefor. In this case, the magnitude of the signal (the electrostatic capacitance value) corresponding to each first electrode 34 is proportional to the surface area of overlapping of the first electrode 34 with the second electrode 36. Accordingly, the ratio of electrostatic capacitance values $C_{00}$, $C_{01}$, $C_{10}$, $C_{11}$ is equal to the ratio of overlapping surface areas $S_{00}$, $S_{01}$, $S_{10}$, $S_{11}$. Namely, Formula 5 is established.

$$C_{00} : C_{01} : C_{10} : C_{11} = S_{00} : S_{01} : S_{10} : S_{11} \quad \text{[Formula 5]}$$

Given that the square root of the overlapping surface area in the unloaded state is a, the overlapping surface areas $S_{00}$, $S_{01}$, $S_{10}$, $S_{11}$ are expressed by Formula 6.

$$S_{00} = (a - \Delta x) \times (a - \Delta y), S_{01} = (a - \Delta x) \times (a + \Delta y), S_{10} = (a + \Delta x) \times (a - \Delta y), S_{11} = (a + \Delta x) \times (a + \Delta y) \quad \text{[Formula 6]}$$

From Formula 6, the sum of the four overlapping surface areas is $4a^2$ and is a constant. Accordingly, the overlapping surface areas $S_{00}$, $S_{01}$, $S_{10}$, $S_{11}$ become known values from Formula 5 and the sum $4a^2$ of the four overlapping surface areas. Due to the above, the unknown displacements $\Delta x$, $\Delta y$ can be calculated from the simultaneous equations of Formula 6.

If the displacements $\Delta x$, $\Delta y$ are calculated, by using these as known values, the displacement $\Delta z$ that is assumed to be a common value may be corrected to the individual displacements $\Delta z$ at the respective first electrodes 34. This correction can be carried out by, for example, acquiring in advance and utilizing correlations between the displacements $\Delta x$, $\Delta y$ and the four displacements $\Delta z$ in an environment in which true values of the four displacements $\Delta z$ can be measured by another means. The acquisition of the correlations may be carried out by machine learning.

In a case in which it is known that the four electrostatic capacitance values corresponding to the respective first electrodes 34 are approximately equal, i.e., that the displacements $\Delta x$ and the displacements $\Delta y$ are near zero, the displacements $\Delta z$ at the four first electrodes 34 may be calculated individually by the above method that was described for the case in which $\Delta x$, $\Delta y = 0$ and $\Delta z \ne 0$. The case in which $\Delta x$, $\Delta y = 0$ and $\Delta z \ne 0$ is a case in which, for example, the workpiece W that is in a state of being placed on a stand is grasped, and the weight of the workpiece W is not being applied to the contacting surface 28. When, from this state, the workpiece W is lifted-up from the stand, mainly the displacements $\Delta x$, $\Delta y$ change while the displacement $\Delta z$ hardly changes at all. Therefore, the displacement $\Delta z$ is treated as a known value, and the displacements $\Delta x$, $\Delta y$ can be determined more accurately.

In the present specification, "calculating the respective pressure values of the plurality of pressure detecting positions" includes, in a case of assuming that the displacement $\Delta z$ is common at plural pressure detecting positions such as the four first electrodes 34, treating the pressure value, which is based on the common displacement $\Delta z$ that is calculated, as the pressure value at the respective pressure detecting positions. Further, "calculating an aggregate pressure value by carrying out calculation of a representative value of the respective pressure values of the plurality of pressure detecting positions" includes, in a case of assuming that the displacement $\Delta z$ is common at plural pressure detecting positions such as the four first electrodes 34, calculating the aggregate pressure value by using the pressure value, which is based on the common displacement Δz that is calculated, as a representative value.

As described above, on the basis of the plural signals that respectively correspond to the plural first electrodes 34 that include at least one partially-overlapping electrode that is the first electrode 34 that partially overlaps the second electrode 36, the output section 12 calculates the respective shearing force Fx, Fy values so as to eliminate the effects of pressure on the plural signals.

(Hardware Structures of Tactile Sensor 10, Output section 12 and Controller 104)

Figure 16:
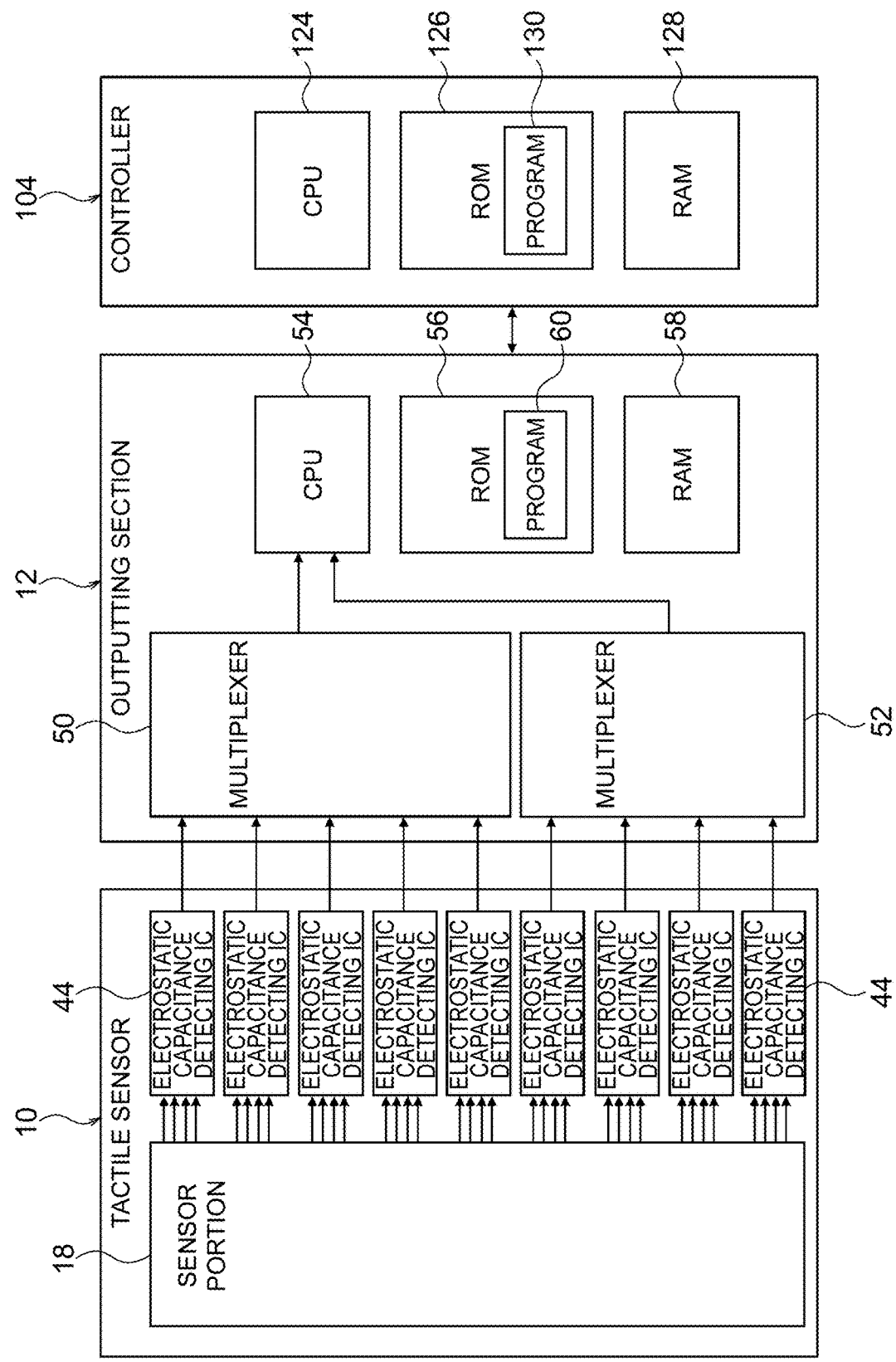
FIG. 16 is a block drawing illustrating an example of hardware structures of the tactile sensor, an output section and a controller of FIG. 1.

FIG. 16 is a block drawing illustrating an example of hardware structures of the tactile sensor 10, the output section 12 and the controller 104 of FIG. 1. The output section 12 has a first multiplexer 50, a second multiplexer 52, a CPU (Central Processing Unit) 54, a ROM (Read Only Memory) 56, and a RAM (Random Access Memory) 58.

The plural electrostatic capacitance detecting ICs 44 are connected to the first multiplexer 50 and the second multiplexer 52. The data that is outputted from the plural electrostatic capacitance detecting ICs 44 is inputted to the first multiplexer 50 and the second multiplexer 52.

The first multiplexer 50 and the second multiplexer 52 are connected to the CPU 54. The data outputted from the first multiplexer 50 and the second multiplexer 52 are inputted to the CPU 54. Data outputted from the controller 104 that is described later is inputted to the CPU 54.

The CPU 54 uses the RAM 58 as a primary storage region, and executes a program 60 that is stored in the ROM 56. As will be described later, various processes for the CPU 54 to carry out computation on the basis of data outputted from the tactile sensors 10 and data outputted from the controller 104, and for the CPU 54 to output data to the controller 104, are recorded in the program 60.

The output section 12 is connected by a wire or wirelessly to the controller 104 such that communication therebetween is possible. The controller 104 has a CPU 124, a ROM 126 and a RAM 128. Data outputted from the output section 12 is inputted to the CPU 124.

The CPU 124 utilizes the RAM 128 as a primary storage region, and executes a program 130 that is stored in the ROM 126. As will be described later, various processes for outputting data by which the controller 104 causes the robot 102 to move and requests data from the output section 12, are recorded in the program 130.

(Plural Modes at Output Section 12)

Figure 17:
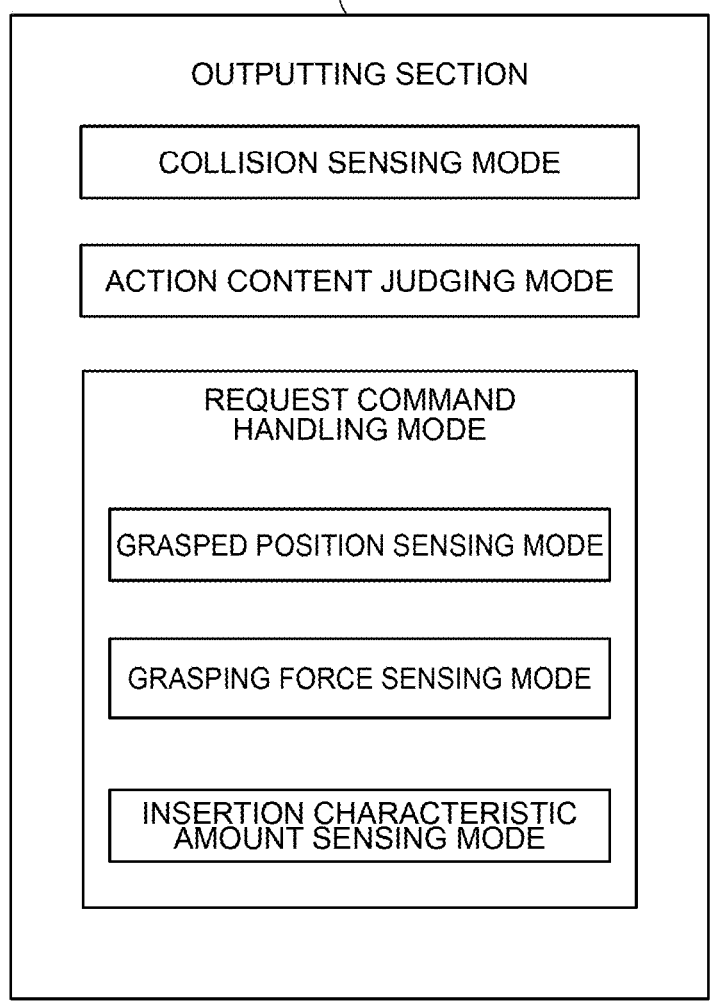
FIG. 17 is a drawing illustrating an example of plural modes at the output section of FIG. 16.

FIG. 17 is a drawing illustrating an example of plural modes at the output section 12 of FIG. 16. The output section 12 has a collision sensing mode, an action content judging mode, and a request command handling mode.

The collision sensing mode is a mode that, in a case in which a collision of the workpiece is sensed on the basis of data outputted from the tactile sensors 10, outputs collision sensing data to the controller 104. A collision of the workpiece is an unforeseen object colliding with the workpiece.

For example, in addition to data expressing that a collision is sensed, the collision sensing data may selectively include at least any of data of the grasping force (aggregate pressure) Fz value, data of the aggregate shearing force Fx value, and data of the aggregate shearing force Fy value, which are described later. The output section 12 outputs the collision sensing data to the controller 104 regardless of the absence/presence of an instruction from the controller 104, and the controller 104 processes the collision sensing data in an interruption processing.

In the processing that senses a collision of the workpiece, for example, as will be described later, the respective pressure values of plural pressure detecting positions within the contacting surface 28 are calculated, and a collision of the workpiece is sensed in a case in which at least a predetermined number of pressure values among the respective pressure values of the plural pressure detecting positions exceeds a threshold value, or a case in which an aggregate pressure value that is described later exceeds a threshold value, or a case in which the aggregate shearing force Fx value that is described later exceeds a threshold value, or a case in which the aggregate shearing force Fy value that is described later exceeds a threshold value.

The action content judging mode is a mode in which the content of an action of the robot 102 is judged on the basis of data outputted from the controller 104, and, in accordance with the content of the action, at least any of data of the pressure distribution, data of the grasping force Fz value, data of the aggregate shearing force Fx value, data of the aggregate shearing force Fy value, data of the moment Mx value, data of the moment My value, and data of the moment Mz value is selectively outputted. Which data is to be outputted is judged and decided upon by the output section 12 in accordance with the content of the action of the robot 102.

Contents of actions of the robot 102 are, for example, actions such as grasping the workpiece W by the robot hand 108 illustrated in FIG. 1, the robot arm 106 moving so as to move the workpiece W while grasping the workpiece W by the robot hand 108, the robot arm 106 moving so as to search for the destination of movement while the workpiece contacts an object, the robot arm 106 moving such that the workpiece W is inserted in the destination of movement, the robot hand 108 releasing the workpiece W, and the like.

The request command handling mode illustrated in FIG. 17 is a mode that, in accordance with a request command included in data outputted from the controller 104, selectively outputs at least any of data of the pressure distribution, data of the grasping force Fz value, data of the grasped position, data of the aggregate shearing force Fx value, data of the aggregate shearing force Fy value, data of the moment Mx value, data of the moment My value, and data of the moment Mz value, which are described later.

As an example, the request command handling mode includes a grasped position sensing mode, a grasping force sensing mode, and an insertion characteristic amount sensing mode.

The grasped position sensing mode is a mode that is designated by the controller 104 when the pair of grasping portions 114 illustrated in FIG. 1 grasp the workpiece W. This grasped position sensing mode is a mode that outputs data of the pressure distribution or data of the grasped position.

The grasping force sensing mode is a mode that is designated by the controller 104, for example, in the process in which the pair of grasping portions 114 illustrated in FIG. 1 transition from the open state to the closed state. This grasping force sensing mode is a mode that outputs data of the grasping force Fz value.

The insertion characteristic amount sensing mode is a mode that is designated by the controller 104, for example, at the time of carrying out detection of contact of the robot hand 108 illustrated in FIG. 1 with the workpiece W, detection of the maintaining of contact of the robot hand 108 with the workpiece W, detection of the position of fitting the workpiece W into the destination of movement, detection of offset of the position of fitting the workpiece W into the destination of movement, detection of offset of the posture of inserting the workpiece W into the destination of movement, detection of completion of insertion of the workpiece W into the destination of movement, detection of completion of pulling the workpiece W out of the destination of movement, and the like.

The insertion characteristic amount sensing mode is a mode that outputs data of the grasping force Fz value, data of the aggregate shearing force Fx value, data of the aggregate shearing force Fy value, data of the moment Mx value, data of the moment My value and data of the moment Mz value, as 6-axis information.

Note that, in the action content judging mode and the request command handling mode, as needed, the output section 12 outputs data of the translational force $\Delta x$ value, data of the translational force $\Delta y$ value, or a rotational moment Mr value, which are described later.

(Pressure Distribution Data Outputting Processing)

The output section 12 outputs data of the pressure distribution that expresses the respective pressure values of the plural pressure detecting positions within the contacting surface 28. In the first embodiment, the pressure detecting positions are the positions of the respective first electrodes 34. The position of the first electrode 34 is expressed by the position of a specific region of the first electrode 34, such as the center of or any corner of or the like of the first electrode 34. This processing of outputting the data of the pressure distribution is executed at the CPU 54 of the output section 12 by the following procedures for example.

Figure 18:
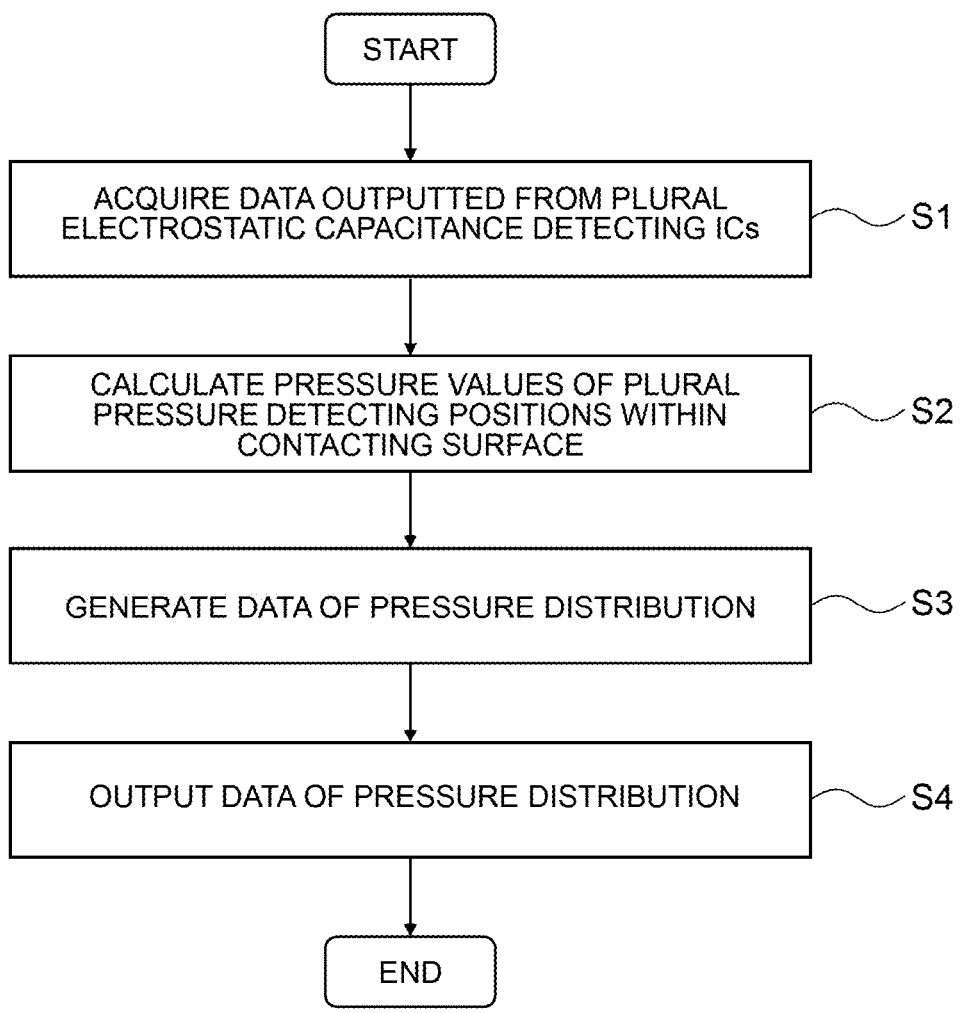
FIG. 18 is a flowchart illustrating an example of the flow of the processing of outputting data of a pressure distribution at the output section of FIG. 16.

FIG. 18 is a flowchart illustrating an example of the flow of the processing of outputting data of the pressure distribution at the output section 12 of FIG. 16. In step S1, the CPU 54 acquires the data outputted from the plural electrostatic capacitance detecting ICs 44. This data acquired in step S1 is data of the signals outputted from the sensor portion 18 in correspondence with the first electrodes 34 that are the objects of calculation of displacement $\Delta z$ in step S2 described hereinafter.

In step S2, on the basis of the data acquired in step S1, the CPU 54 calculates the respective displacements $\Delta z$ of the plural pressure detecting positions within the contacting surface 28. At this time, the respective displacements $\Delta z$ of the plural pressure detecting positions corresponding to all of the plural first electrodes 34 may be calculated on the basis of the data of all of the plural signals outputted from the sensor portion 18, or the respective displacements $\Delta z$ of the plural pressure detecting positions corresponding to some of the plural first electrodes 34 may be calculated on the basis of the data of some of the plural signals outputted from the sensor portion 18. In the first embodiment, for each of the second electrodes 36, calculating of the four $\Delta z$ at the positions of the four first electrodes 34 that are the pressure detecting positions, from the signals corresponding to the four first electrodes 34 that partially overlap with the one second electrode 36, is carried out in accordance with the description of the above-described case in which $\Delta x$, $\Delta y$, $\Delta z \neq 0$.

The respective displacements $\Delta z$ of the plural pressure detecting positions calculated in this way are proportional to the respective pressure values of the plural pressure detecting positions. Accordingly, by calculating the respective displacements $\Delta z$ of the plural pressure detecting positions, the respective pressure values of the plural pressure detecting positions are calculated.

In step S3, the CPU 54 generates data of the pressure distribution on the basis of the respective pressure values of the plural pressure detecting positions within the contacting surface 28 that were calculated in step S2.

In step S4, the CPU 54 outputs the data of the pressure distribution that was generated in step S3 to the controller 104. This data of the pressure distribution is used, for example, at the controller 104 in understanding the grasped position and grasped posture of the workpiece W whose shape is already known, and in carrying out identification of the workpiece W based on the shape.

(Grasped Position Data Outputting Processing)

On the basis of the respective pressure values of the plural pressure detecting positions within the contacting surface 28, the output section 12 specifies the grasped position of the workpiece W within the contacting surface 28, and outputs data of the grasped position. This processing of outputting data of the grasped position is executed at the CPU 54 of the output section 12 by the following procedures for example.

Figure 19:
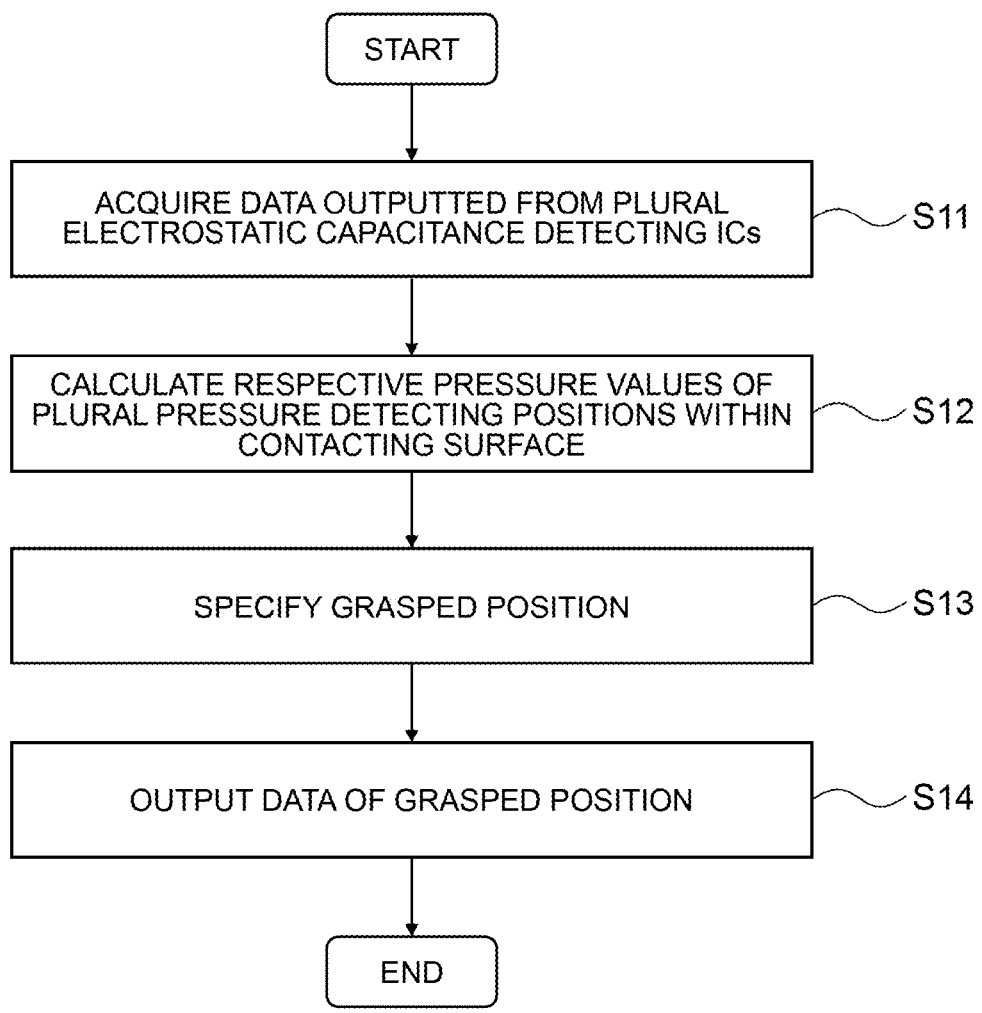
FIG. 19 is a flowchart illustrating an example of the flow of the processing of outputting data of a grasped position at the output section of FIG. 16.

FIG. 19 is a flowchart illustrating an example of the flow of the processing of outputting data of the grasped position at the output section 12 of FIG. 16. In step S11, the CPU 54 acquires the data outputted from the plural electrostatic capacitance detecting ICs 44. This data acquired in step S11 is data of the signals outputted from the sensor portion 18 in correspondence with the first electrodes 34 that are the objects of calculation of displacement $\Delta z$ in step S12 described hereinafter.

In step S12, on the basis of the data acquired in step S11, the CPU 54 calculates the respective displacements $\Delta z$ of the plural pressure detecting positions within the contacting surface 28. At this time, the respective displacements $\Delta z$ of the plural pressure detecting positions corresponding to all of the plural first electrodes 34 may be calculated on the basis of the data of all of the plural signals outputted from the sensor portion 18, or the respective displacements $\Delta z$ of the plural pressure detecting positions corresponding to some of the plural first electrodes 34 may be calculated on the basis of the data of some of the plural signals outputted from the sensor portion 18. In the first embodiment, for each of the second electrodes 36, calculating of the four $\Delta z$ at the positions of the four first electrodes 34 that are the pressure detecting positions, from the signals corresponding to the four first electrodes 34 that partially overlap with the one second electrode 36, is carried out in accordance with the description of the above-described case in which $\Delta x$, $\Delta y$, $\Delta z \neq 0$.

The respective displacements $\Delta z$ of the plural pressure detecting positions calculated in this way are proportional to the respective pressure values of the plural pressure detecting positions. Accordingly, by calculating the respective displacements $\Delta z$ of the plural pressure detecting positions, the respective pressure values of the plural pressure detecting positions are calculated.

In step S13, the CPU 54 specifies positions at which the respective pressure values of the plural pressure detecting positions within the contacting surface 28 that were calculated in step S12, become predetermined interrelationships. For example, the center of gravity position of the region where pressure is being applied may be specified as the grasped position. The shape of the region where pressure is being applied may be a planar shape, a strip shape, a dot shape (a planar shape of a small surface area), a linear shape (a strip shape of a small width), or the like. The position of a borderline between a region where pressure is not being applied and a region where pressure is being applied may be specified as the grasped position. Due thereto, the grasped position of the workpiece W within the contacting surface 28 is specified on the basis of the respective pressure values of the plural pressure detecting positions within the contacting surface 28.

In step S14, the CPU 54 outputs the data (data of the X-Y coordinate) of the grasped position that was specified in step S13 to the controller 104. This data of the grasped position is used, for example, at the controller 104 in specifying the grasped position of the workpiece W.

(Grasping Force Fz Value Data Outputting Processing)

The output section 12 calculates one aggregate pressure value for the entire contacting surface 28, and outputs the data of the aggregate pressure value as data of the grasping force Fz value. This processing of outputting the data of the grasping force Fz value is executed at the CPU 54 of the output section 12 by the following procedures for example.

Figure 20:
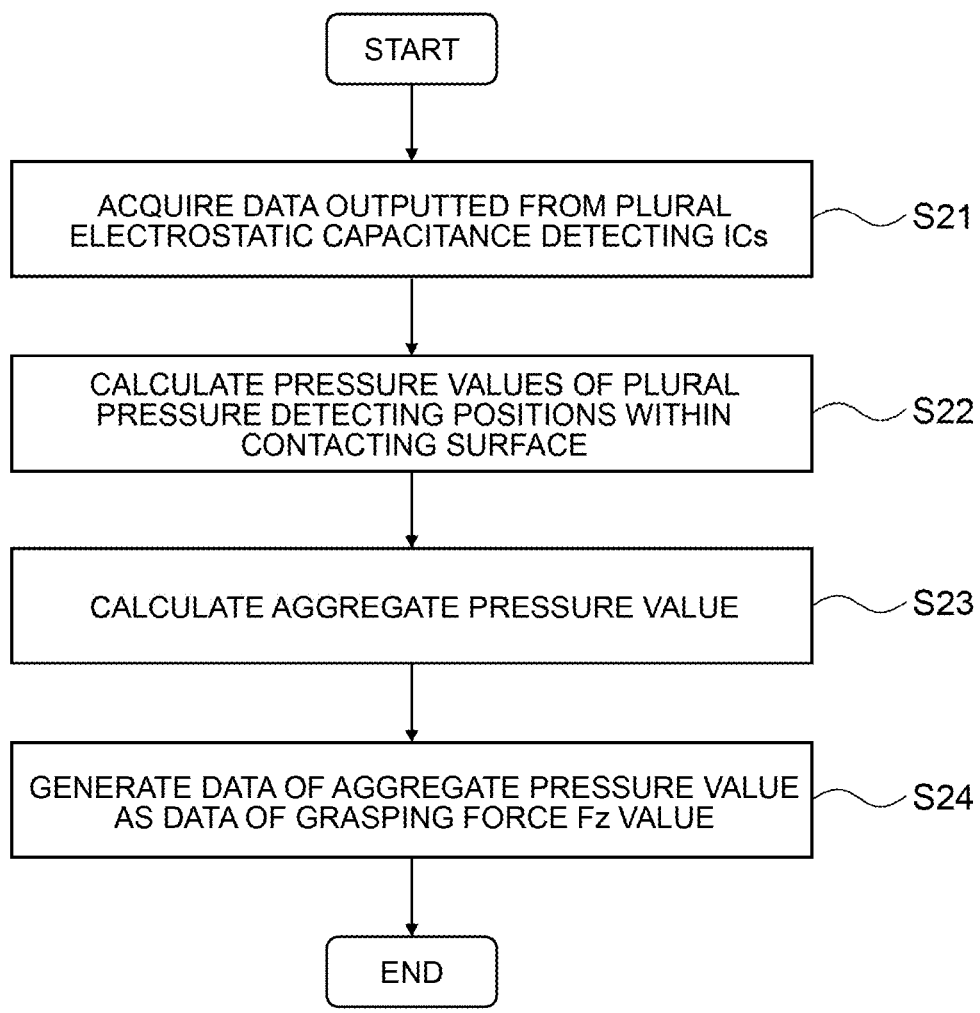
FIG. 20 is a flowchart illustrating an example of the flow of the processing of outputting data of a grasping force Fz value at the output section of FIG. 16.

FIG. 20 is a flowchart illustrating an example of the flow of the processing of outputting data of the grasping force Fz value at the output section 12 of FIG. 16. In step S21, the CPU 54 acquires the data outputted from the plural electrostatic capacitance detecting ICs 44. This data acquired in step S21 is data of the signals outputted from the sensor portion 18 in correspondence with the first electrodes 34 that are the objects of calculation of displacement $\Delta z$ in step S22 described hereinafter.

In step S22, on the basis of the data acquired in step S21, the CPU 54 calculates the respective displacements $\Delta z$ of the plural pressure detecting positions within the contacting surface 28. At this time, the respective displacements $\Delta z$ of the plural pressure detecting positions corresponding to all of the plural first electrodes 34 may be calculated on the basis of the data of all of the plural signals outputted from the sensor portion 18, or the respective displacements $\Delta z$ of the plural pressure detecting positions corresponding to some of the plural first electrodes 34 may be calculated on the basis of the data of some of the plural signals outputted from the sensor portion 18. In the first embodiment, for each of the second electrodes 36, calculating of the four $\Delta z$ at the positions of the four first electrodes 34 that are the pressure detecting positions, from the signals corresponding to the four first electrodes 34 that partially overlap with the one second electrode 36, is carried out in accordance with the description of the above-described case in which $\Delta x$, $\Delta y$, $\Delta z \neq 0$.

The respective displacements $\Delta z$ of the plural pressure detecting positions calculated in this way are proportional to the respective pressure values of the plural pressure detecting positions. Accordingly, by calculating the respective displacements $\Delta z$ of the plural pressure detecting positions, the respective pressure values of the plural pressure detecting positions are calculated.

In step S23, the CPU 54 calculates an aggregate pressure value by carrying out at least any of calculating a representative value, calculating the total value and calculating the average value for the respective pressure values of the plural pressure detecting positions within the contacting surface 28 that were calculated in step S22.

In step S24, the CPU 54 outputs the data of the aggregate pressure value that was calculated in step S23 to the controller 104 as data of the grasping force Fz value. This data of the grasping force Fz value is used, for example, at the controller 104 in adjusting the grasping force Fz in order to make it such that the workpiece W does not fall down, adjusting the grasping force Fz in accordance with the weight or the ease of breakage or the like of the workpiece W, or the like.

(Aggregate Shearing Force Fx Value Data Outputting Processing)

The output section 12 calculates one aggregate shearing force Fx value for the entire contacting surface 28, and outputs the data of the aggregate shearing force Fx value. This processing of outputting the data of the aggregate shearing force Fx value is executed at the CPU 54 of the output section 12 by the following procedures for example.

Figure 21:
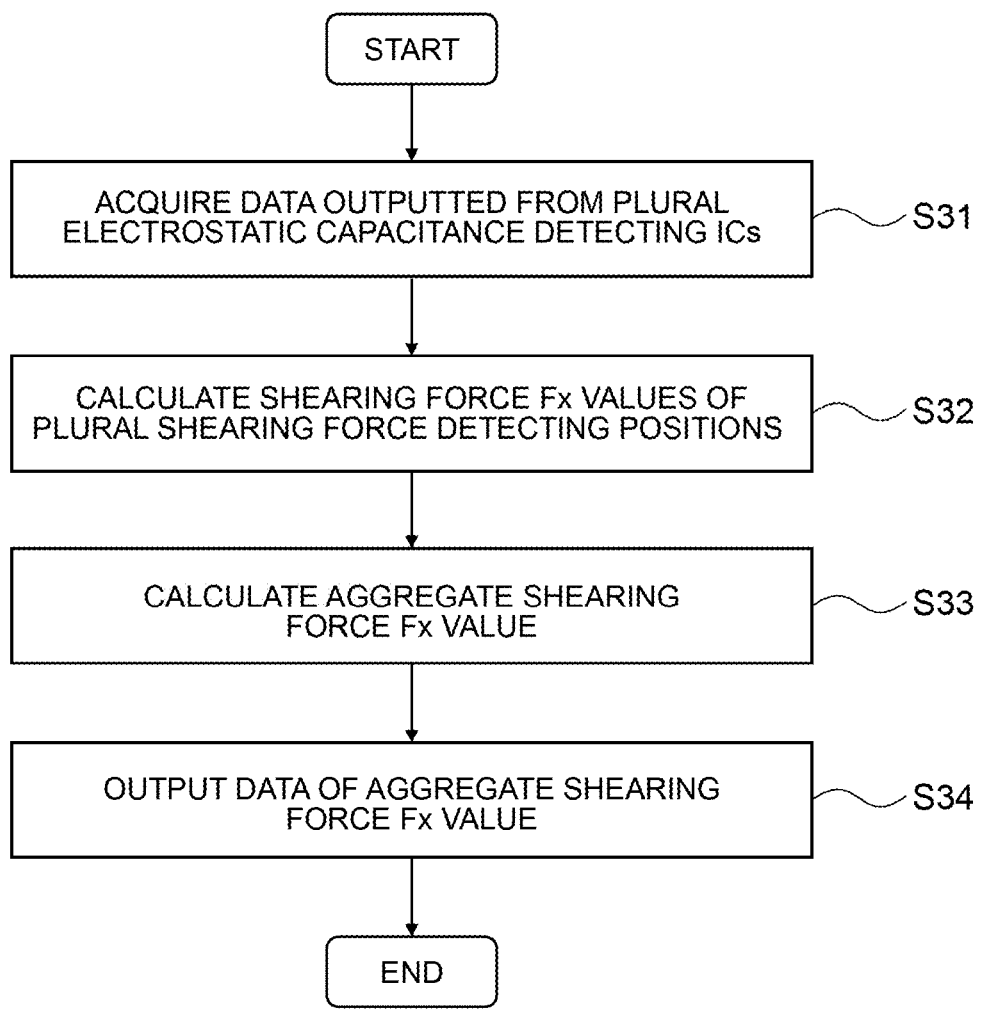
FIG. 21 is a flowchart illustrating an example of the flow of the processing of outputting data of an aggregate shearing force Fx value at the output section of FIG. 16.

FIG. 21 is a flowchart illustrating an example of the flow of the processing of outputting data of the aggregate shearing force Fx value at the output section 12 of FIG. 16. In step S31, the CPU 54 acquires the data outputted from the plural electrostatic capacitance detecting ICs 44. This data acquired in step S31 is data of the signals outputted from the sensor portion 18 in correspondence with the first electrodes 34 that are the objects of calculation of displacement $\Delta x$ in step S32 described hereinafter.

In step S32, on the basis of the data acquired in step S31, the CPU 54 calculates the respective displacements $\Delta x$ for the positions of the plural second electrodes 36 as an example of the "plurality of shearing force detecting positions". The position of the second electrode 36 is expressed by the position of a specific region of the second electrode 36, such as the center of or any corner of or the like of the second electrode 36. The calculating of the displacement $\Delta x$ is carried out by using all of or some of the signals corresponding to the four first electrodes 34 that partially overlap with the one second electrode 36, in accordance with the description of the above-described case in which $\Delta x$, $\Delta y$, $\Delta z \neq 0$. In a case of using some of the signals, the signals corresponding to at least two electrodes whose positions in the x direction are different, among the four first electrodes 34 that overlap the one second electrode 36, are used. At this time, the plural second electrodes 36 that are the objects of calculation of the displacement $\Delta x$ may be all of the second electrodes 36 among the second electrodes 36, or may be some of the second electrodes 36 among the second electrodes 36. Further, in step S32, all of the plural signals outputted from the sensor portion 18 may be used, or some of the plural signals may be used.

The displacements $\Delta x$, which are calculated for the respective positions of the plural second electrodes 36 and are calculated in this way, are proportional to the shearing force Fx values at the respective positions of the plural second electrodes 36. Accordingly, due to the displacements $\Delta x$ being calculated for the respective positions of the plural second electrodes 36, the shearing force Fx values at the respective positions of the plural second electrodes 36 are calculated.

Note that, in the processing of outputting the data of the aggregate shearing force Fx value relating to the first embodiment, the shearing force Fx values that are calculated for the respective positions of the plural second electrodes 36 correspond to an example of the "respective shearing force values of the plurality of shearing force detecting positions within the contacting surface".

In step S33, the CPU 54 calculates the aggregate shearing force Fx value by carrying out at least any of calculating a representative value, calculating the total value and calculating the average value for the shearing force Fx values at the respective positions of the plural second electrodes 36 that were calculated in step S32.

In step S34, the CPU 54 outputs the data of the aggregate shearing force Fx value that was calculated in step S33 to the controller 104. This data of the aggregate shearing force Fx value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

(Aggregate Shearing Force Fy Value Data Outputting Processing)

The output section 12 calculates one aggregate shearing force Fy value for the entire contacting surface 28, and outputs the data of the aggregate shearing force Fy value. This processing of outputting the data of the aggregate shearing force Fy value is executed at the CPU 54 of the output section 12 by the following procedures for example.

Figure 22:
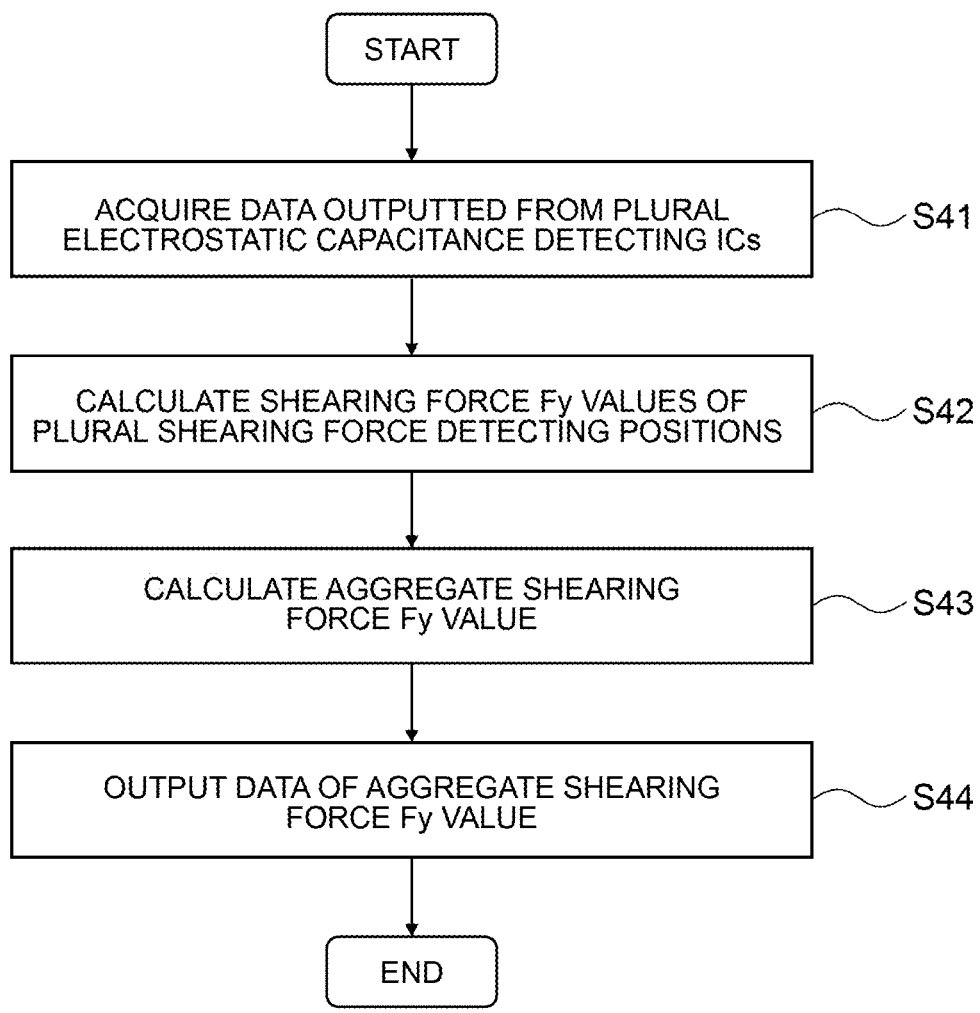
FIG. 22 is a flowchart illustrating an example of the flow of the processing of outputting data of an aggregate shearing force Fy value at the output section of FIG. 16.

FIG. 22 is a flowchart illustrating an example of the flow of the processing of outputting data of the aggregate shearing force Fy value at the output section 12 of FIG. 16. In step S41, the CPU 54 acquires the data outputted from the plural electrostatic capacitance detecting ICs 44. This data acquired in step S41 is data of the signals outputted from the sensor portion 18 in correspondence with the first electrodes 34 that are the objects of calculation of displacement $\Delta y$ in step S42 described hereinafter.

In step S42, on the basis of the data acquired in step S41, the CPU 54 calculates the respective displacements $\Delta y$ for the positions of the plural second electrodes 36 as an example of the "plurality of shearing force detecting positions". The position of the second electrode 36 is expressed by the position of a specific region of the second electrode 36, such as the center of or any corner of or the like of the second electrode 36. The calculating of the displacement $\Delta y$ is carried out by using all of or some of the signals corresponding to the four first electrodes 34 that partially overlap with the one second electrode 36, in accordance with the description of the above-described case in which $\Delta x$, $\Delta y$, $\Delta z \neq 0$. In a case of using some of the signals, the signals corresponding to at least two electrodes whose positions in the y direction are different, among the four first electrodes 34 that overlap the one second electrode 36, are used. At this time, the plural second electrodes 36 that are the objects of calculation of the displacement $\Delta y$ may be all of the second electrodes 36 among the second electrodes 36, or may be some of the second electrodes 36 among the second electrodes 36. Further, in step S42, all of the plural signals outputted from the sensor portion 18 may be used, or some of the plural signals may be used.

The displacements $\Delta y$, which are calculated for the respective positions of the plural second electrodes 36 in this way, are proportional to the shearing force Fy values at the respective positions of the plural second electrodes 36. Accordingly, due to the displacements $\Delta y$ being calculated for the respective positions of the plural second electrodes 36, the shearing force Fy values at the respective positions of the plural second electrodes 36 are calculated.

Note that, in the processing of outputting the data of the aggregate shearing force Fy value relating to the first embodiment, the shearing force Fy values that are calculated for the respective positions of the plural second electrodes 36 correspond to an example of the "respective shearing force values of the plurality of shearing force detecting positions within the contacting surface".

In step S43, the CPU 54 calculates the aggregate shearing force Fy value by carrying out at least any of calculating a representative value, calculating the total value and calculating the average value for the shearing force Fy values at the respective positions of the plural second electrodes 36 that were calculated in step S42.

In step S44, the CPU 54 outputs the data of the aggregate shearing force Fy value that was calculated in step S43 to the controller 104. This data of the aggregate shearing force Fy value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

(Moment Mx Value Data Outputting Processing)

The output section 12 respectively calculates a first aggregate pressure value and a second aggregate pressure value for the second electrodes 36 that are at two places that are apart in the Y-axis direction at the contacting surface 28. At this time, it is assumed that the tactile sensor 10 is receiving force from the workpiece W at least at the positions of the second electrodes 36 of these two places. Then, on the basis of the first aggregate pressure value and the second aggregate pressure value, the output section 12 calculates the value of the moment Mx around the X-axis direction that is applied to the tactile sensor 10, as the moment Mx value, and outputs the data of the moment Mx value. This processing of outputting the data of the moment Mx value is executed at the CPU 54 of the output section 12 by the following procedures for example.

Figure 23:
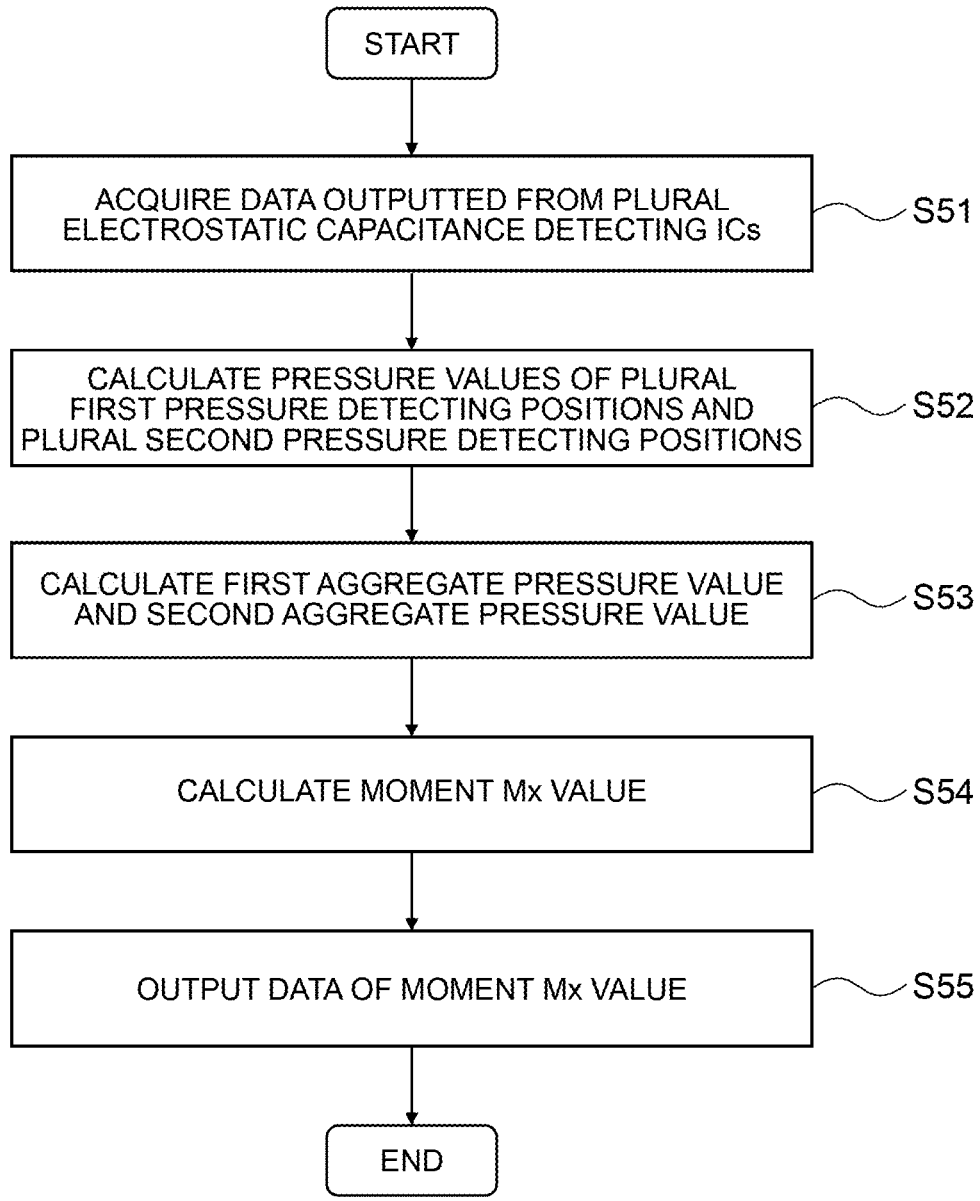
FIG. 23 is a flowchart illustrating an example of the flow of the processing of outputting data of a moment Mx value at the output section of FIG. 16.

FIG. 23 is a flowchart illustrating an example of the flow of the processing of outputting data of the moment Mx value at the output section 12 of FIG. 16. In step S51, the CPU 54 acquires the data outputted from the plural electrostatic capacitance detecting ICs 44. This data acquired in step S51 is data of the signals outputted from the sensor portion 18 in correspondence with the first electrodes 34 that are the objects of calculation of displacement $\Delta z$ in step S52 described hereinafter.

In step S52, on the basis of the data acquired in step S51 and as an example of the "first aggregate pressure detecting position", the CPU 54 selects the second electrode 36-4 (see FIG. 12) that is apart in the Y-axis direction from the center of the contacting surface 28, and calculates the displacements $\Delta z$ for the respective positions of the four first electrodes 34 that partially overlap with the second electrode 36-4. The positions of these four first electrodes 34 are an example of the "plurality of pressure detecting positions that are in a vicinity of the first aggregate pressure detecting position". Moreover, as an example of the "second aggregate pressure detecting position", the CPU 54 selects the second electrode 36-6 (see FIG. 12) that is apart from the center of the contacting surface 28 in the opposite direction of the second electrode 36-4, and calculates the displacements $\Delta z$ for the respective positions of the four first electrodes 34 that partially overlap with the second electrode 36-6. The positions of these four first electrodes 34 are an example of the "plurality of pressure detecting positions that are in a vicinity of the second aggregate pressure detecting position".

The displacements $\Delta z$, which are calculated in this way for the respective positions of the first electrodes 34 that partially overlap with the plural second electrodes 36-4,6, are proportional to the pressure values at the respective positions of the first electrodes 34. Accordingly, due to the displacements $\Delta z$ being calculated for the respective positions of the first electrodes 34, the pressure values at the respective positions of the first electrodes 34 are calculated.

Note that, in the processing of outputting the data of the moment Mx value relating to the first embodiment, the pressure values calculated for the respective positions of the first electrodes 34 that partially overlap with the second electrode 36-4 correspond to an example of the "respective pressure values of the plurality of pressure detecting positions that are in a vicinity of the first aggregate pressure detecting position, among the plurality of pressure detecting positions within the contacting surface". Further, the pressure values calculated for the respective positions of the first electrodes 34 that partially overlap with the second electrode 36-6 correspond to an example of the "respective pressure values of the plurality of pressure detecting positions that are in a vicinity of the second aggregate pressure detecting position, among the plurality of pressure detecting positions within the contacting surface".

In step S53, the CPU 54 carries out at least any of calculation of a representative value, calculation of the total value and calculation of the average value for the pressure values of the respective positions of the first electrodes 34 that partially overlap with the second electrode 36-4, and makes this calculated value be the first aggregate pressure value. Due thereto, the first aggregate pressure value is calculated for the second electrode 36-4. The first aggregate pressure value corresponds to the normal load Fz'.

Similarly, in step S53, the CPU 54 carries out at least any of calculation of a representative value, calculation of the total value and calculation of the average value for the pressure values of the respective positions of the first electrodes 34 that partially overlap with the second electrode 36-6, and makes this calculated value be the second aggregate pressure value. Due thereto, the second aggregate pressure value is calculated for the second electrode 36-6. The second aggregate pressure value corresponds to the normal load Fz'.

In steps S52 and S53, in the same way as the calculating of the first aggregate pressure value for the second electrode 36-4, the first aggregate pressure values may be calculated for the second electrodes 36-1,7 also, and at least any of calculation of a representative value, calculation of the total value and calculation of the average value may be carried out for these three first aggregate pressure values, and the calculated value may be made to be the final first aggregate pressure value. The first aggregate pressure detecting positions in this case are the respective positions of the second electrodes 36-1,4,7. Further, in steps S52 and S53, in the same way as the calculating of the second aggregate pressure value for the second electrode 36-6, the second aggregate pressure values may be calculated for the second electrodes 36-3,9 also, and at least any of calculation of a representative value, calculation of the total value and calculation of the average value may be carried out for these three second aggregate pressure values, and the calculated value may be made to be the final second aggregate pressure value. The second aggregate pressure detecting positions in this case are the respective positions of the second electrodes 36-3,6,9. At this time, it is assumed that the tactile sensor 10 is receiving force from the workpiece W at least at the positions of the second electrodes 36 of these six places.

In step S54, the CPU 54 calculates the difference between a value, which is obtained by multiplying the first aggregate pressure value (the normal load Fz') calculated for the second electrode 36-4 or group of 36-1,4,7 in step S53 by the distance dx, and a value, which is obtained by multiplying the second aggregate pressure value (the normal load Fz') calculated for the second electrode 36-6 or group of 36-3,6,9 in step S53 by the distance dx, and makes this difference be the moment Mx value. Due thereto, the moment Mx value (the magnitude and direction of the moment) is calculated. The moment Mx value is an example of the "first moment value".

In step S55, the CPU 54 outputs the data of the moment Mx value that was calculated in step S54 to the controller 104.

(Moment My Value Data Outputting Processing)

The output section 12 respectively calculates a first aggregate pressure value and a second aggregate pressure value for the second electrodes 36 that are at two places that are apart in the X-axis direction at the contacting surface 28. At this time, it is supposed that the tactile sensor 10 is receiving force from the workpiece W at least at the positions of the second electrodes 36 of these two places. Then, on the basis of the first aggregate pressure value and the second aggregate pressure value, the output section 12 calculates the value of the moment My around the Y-axis direction that is applied to the tactile sensor 10, as the moment My value, and outputs the data of the moment My value. This processing of outputting the data of the moment My value is executed at the CPU 54 of the output section 12 by the following procedures for example.

Figure 24:
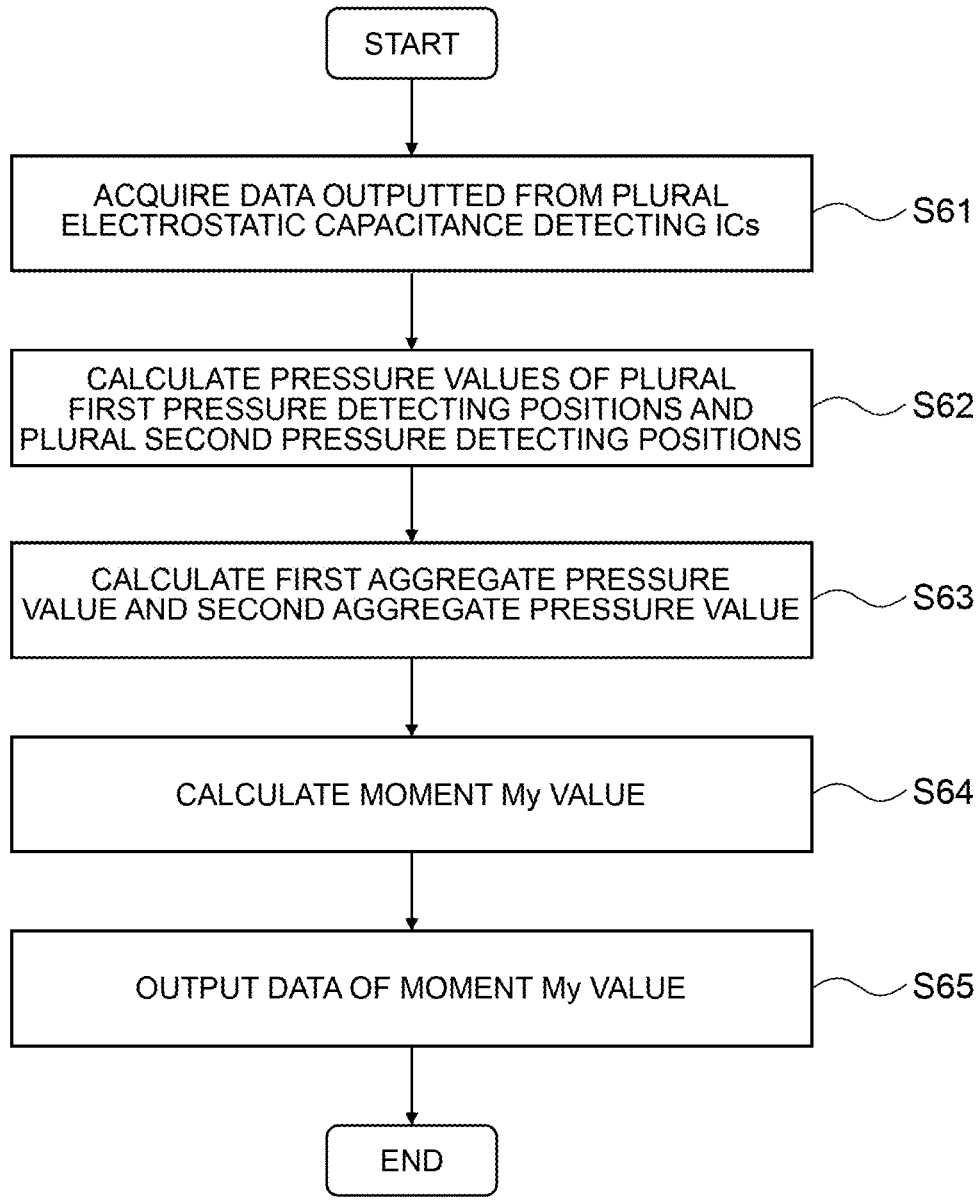
FIG. 24 is a flowchart illustrating an example of the flow of the processing of outputting data of a moment My value at the output section of FIG. 16.

FIG. 24 is a flowchart illustrating an example of the flow of the processing of outputting data of the moment My value at the output section 12 of FIG. 16. In step S61, the CPU 54 acquires the data outputted from the plural electrostatic capacitance detecting ICs 44. This data acquired in step S61 is data of the signals outputted from the sensor portion 18 in correspondence with the first electrodes 34 that are the objects of calculation of displacement Δz in step S62 described hereinafter.

In step S62, on the basis of the data acquired in step S61, as an example of the "first aggregate pressure detecting position", the CPU 54 selects the second electrode 36-2 (see FIG. 12) that is apart in the X-axis direction from the center of the contacting surface 28, and calculates the displacements Δz for the respective positions of the four first electrodes 34 that partially overlap with the second electrode 36-2. The positions of these four first electrodes 34 are an example of the "plurality of pressure detecting positions that are in a vicinity of the first aggregate pressure detecting position". Moreover, as an example of the "second aggregate pressure detecting position", the CPU 54 selects the second electrode 36-8 (see FIG. 12) that is apart from the center of the contacting surface 28 in the opposite direction of the second electrode 36-2, and calculates the displacements Δz for the respective positions of the four first electrodes 34 that partially overlap with the second electrode 36-8. The positions of these four first electrodes 34 are an example of the "plurality of pressure detecting positions that are in a vicinity of the second aggregate pressure detecting position".

The displacements Δz, which are calculated in this way for the respective positions of the first electrodes 34 that partially overlap with the plural second electrodes 36-2,8, are proportional to the pressure values at the respective positions of the first electrodes 34. Accordingly, due to the displacements Δz being calculated for the respective positions of the first electrodes 34, the pressure values at the respective positions of the first electrodes 34 are calculated.

Note that, in the processing of outputting the data of the moment My value relating to the first embodiment, the pressure values calculated for the respective positions of the first electrodes 34 that partially overlap with the second electrode 36-2 correspond to an example of the "respective pressure values of the plurality of pressure detecting positions that are in a vicinity of the first pressure detecting position, among the plurality of pressure detecting positions within the contacting surface". Further, the pressure values calculated for the respective positions of the first electrodes 34 that partially overlap with the second electrode 36-8 correspond to an example of the "respective pressure values of the plurality of pressure detecting positions that are in a vicinity of the second aggregate pressure detecting position, among the plurality of pressure detecting positions within the contacting surface".

In step S63, the CPU 54 carries out at least any of calculation of a representative value, calculation of the total value and calculation of the average value for the respective pressure values of the first electrodes 34 that partially overlap with the second electrode 36-2, and makes this calculated value be the first aggregate pressure value. Due thereto, the first aggregate pressure value is calculated for the second electrode 36-2. The first aggregate pressure value corresponds to the normal load Fz'.

Similarly, in step S63, the CPU 54 carries out at least any of calculation of a representative value, calculation of the total value and calculation of the average value for the respective pressure values of the first electrodes 34 that partially overlap with the second electrode 36-8, and makes this calculated value be the second aggregate pressure value. Due thereto, the second aggregate pressure value is calculated for the second electrode 36-8. The second aggregate pressure value corresponds to the normal load Fz'.

In steps S62 and S63, in the same way as the calculating of the first aggregate pressure value for the second electrode 36-2, the first aggregate pressure values may be calculated for the second electrodes 36-1,3 also, and at least any of calculation of a representative value, calculation of the total value and calculation of the average value may be carried out for these three first aggregate pressure values, and the calculated value may be made to be the final first aggregate pressure value. The first aggregate pressure detecting positions in this case are the respective positions of the second electrodes 36-1,2,3. Further, in steps S62 and S63, in the same way as the calculating of the second aggregate pressure value for the second electrode 36-8, the second aggregate pressure values may be calculated for the second electrodes 36-7,9 also, and at least any of calculation of a representative value, calculation of the total value and calculation of the average value may be carried out for these three second aggregate pressure values, and the calculated value may be made to be the final second aggregate pressure value. The second aggregate pressure detecting positions in this case are the respective positions of the second electrodes 36-7,8,9. At this time, it is assumed that the tactile sensor 10 is receiving force from the workpiece W at least at the positions of the second electrodes 36 of these six places.

In step S64, the CPU 54 calculates the difference between a value, which is obtained by multiplying the first aggregate pressure value (the normal load Fz') calculated for the second electrode 36-2 or group of 36-1,2,3 in step S63 by the distance dy, and a value, which is obtained by multiplying the second aggregate pressure value (the normal load Fz') calculated for the second electrode 36-8 or group of 36-7,8,9 in step S63 by the distance dy, and makes this difference be the moment My value. Due thereto, the moment My value (the magnitude and direction of the moment) is calculated. The moment My value is an example of the "first moment value".

In step S65, the CPU 54 outputs the data of the moment My value that was calculated in step S64 to the controller 104.

(Moment Mz Value Data Outputting Processing)

The output section 12 respectively calculates a first aggregate shearing force value and a second aggregate shearing force value for the second electrodes 36 that are at two places that are apart from the center of the contacting surface 28 in the X-axis direction or the Y-axis direction. Then, on the basis of the first aggregate shearing force value and the second aggregate shearing force value, the output section 12 calculates the value of the moment Mz around the Z-axis direction that is applied to the tactile sensor 10, as the moment Mz value, and outputs the data of the moment Mz value.

Figure 25:
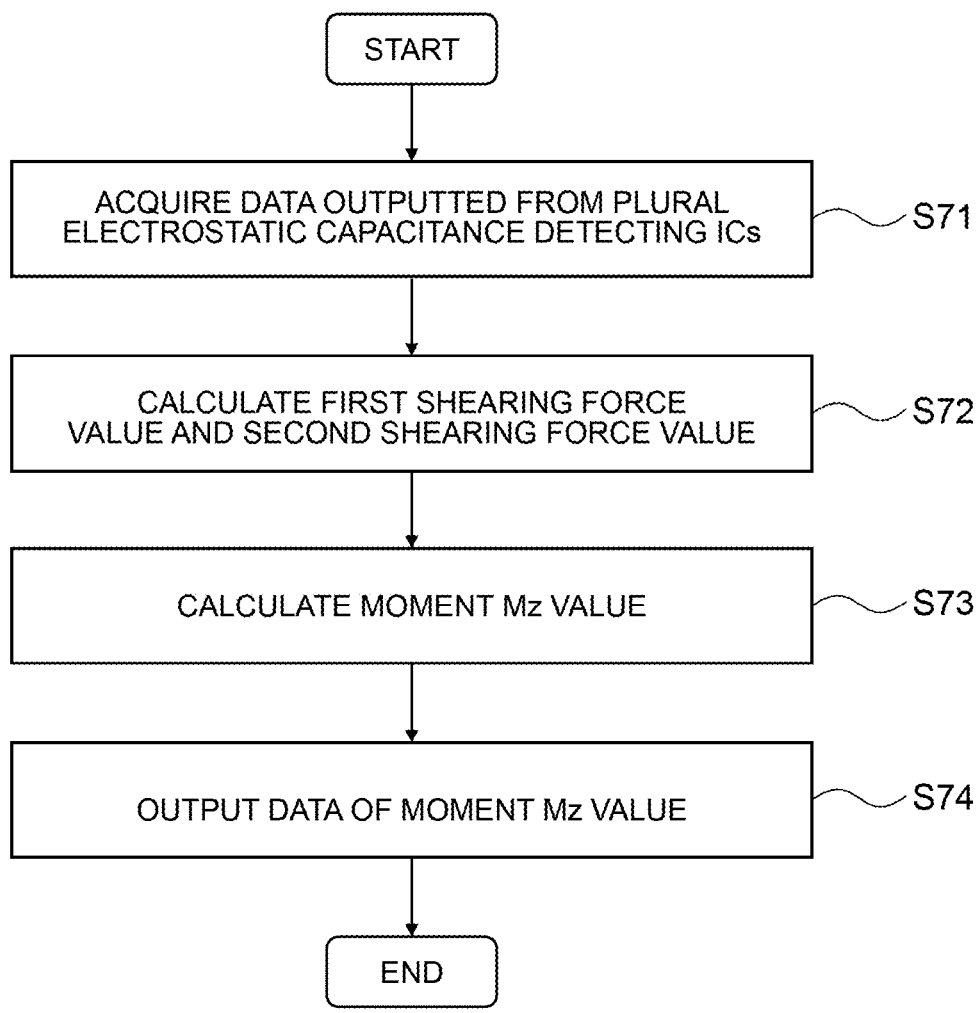
FIG. 25 is a flowchart illustrating an example of the flow of the processing of outputting data of a moment Mz value at the output section of FIG. 16.

FIG. 25 is a flowchart illustrating an example of the flow of the processing of outputting data of the moment Mz value at the output section 12 of FIG. 16. There are the following first example and second example of the processing of outputting data of the moment Mz value.

The moment Mz value data outputting processing relating to the first example is executed at the CPU 54 of the output section 12 by the following procedures for example. In step S71, the CPU 54 acquires the data outputted from the plural electrostatic capacitance detecting ICs 44. This data acquired in step S71 is data of the signals outputted from the sensor portion 18 in correspondence with the first electrodes 34 that are the objects of calculation of displacement $\Delta y$ in step S72 described hereinafter.

In step S72, on the basis of the data acquired in step S71, as examples of the "first shearing force detecting position" and the "second shearing force detecting position", the CPU 54 calculates the displacements $\Delta y$ for the respective positions of the second electrodes 36-2,8 that are apart from the center of the contacting surface 28 in the X-axis direction.

The displacements $\Delta y$, which are calculated in this way for the respective positions of second electrodes 36-2,8, are proportional to the shearing force Fy values at the respective positions of second electrodes 36-2,8. Therefore, due to the displacements $\Delta y$ being calculated for the respective positions of second electrodes 36-2,8, the shearing force Fy values at the respective positions of the second electrodes 36-2,8 are calculated. Hereinafter, the shearing force Fy value that is calculated for the second electrode 36-2 in this way is called the first shearing force Fy value, and the shearing force Fy value that is calculated for the second electrode 36-8 is called the second shearing force Fy value.

Further, the first shearing force Fy value that is calculated for the second electrode 36-2 corresponds to an example of the "first shearing force value that is calculated for the first shearing force detecting position within the contacting surface". Moreover, the second shearing force Fy value that is calculated for the second electrode 36-8 corresponds to an example of the "second shearing force value that is calculated for the second shearing force detecting position within the contacting surface".

In step S73, the CPU 54 calculates the difference between a value, which is obtained by multiplying the first shearing force Fy value calculated for the second electrode 36-2 in step S72 by the distance dy, and a value, which is obtained by multiplying the second shearing force Fy calculated for the second electrode 36-8 in step S72 by the distance dy, and makes this difference be the moment Mz value. Due thereto, the moment Mz value (the magnitude and direction of the moment) is calculated. The moment Mz value is an example of the "second moment value".

In step S74, the CPU 54 outputs the data of the moment Mz value that was calculated in step S73 to the controller 104.

Note that, although the first shearing force Fy value is calculated for the second electrode 36-2 in above-described step S72, the first shearing force Fy value may be calculated for at least one second electrode 36 among the second electrodes 36-1,2,3. Similarly, although the second shearing force Fy value is calculated for the second electrode 36-8 in above-described step S72, the second shearing force Fy value may be calculated for at least one second electrode 36 among the second electrodes 36-7,8,9.

The moment Mz value data outputting processing relating to the second example is executed at the CPU 54 of the output section 12 by the following procedures for example. In step S71, the CPU 54 acquires the data outputted from the plural electrostatic capacitance detecting ICs 44. This data acquired in step S71 is data of the signals outputted from the sensor portion 18 in correspondence with the first electrodes 34 that are the objects of calculation of displacement Δx in step S72 described hereinafter.

In step S72, on the basis of the data acquired in step S71, as examples of the "first shearing force detecting position" and the "second shearing force detecting position", the CPU 54 calculates the displacements Δx for the respective positions of the second electrodes 36-4,6 that are apart from the center of the contacting surface 28 in the Y-axis direction.

The displacements Δx, which are calculated in this way for the respective positions of second electrodes 36-4,6, are proportional to the shearing force Fx values at the respective positions of second electrodes 36-4,6. Therefore, due to the displacements Δx being calculated for the respective positions of second electrodes 36-4,6, the shearing force Fx values at the respective second electrodes 36-4,6 are calculated.

Further, the first shearing force Fx value that is calculated for the second electrode 36-4 corresponds to an example of the "first shearing force value that is calculated for the first shearing force detecting position within the contacting surface". Moreover, the second shearing force Fx value that is calculated for the second electrode 36-6 corresponds to an example of the "second shearing force value that is calculated for the second shearing force detecting position within the contacting surface".

In step S73, the CPU 54 calculates the difference between a value, which is obtained by multiplying the first shearing force Fx value calculated for the second electrode 36-4 in step S72 by the distance dx, and a value, which is obtained by multiplying the second shearing force Fx calculated for the second electrode 36-6 in step S72 by the distance dx, and makes this difference be the moment Mz value. Due thereto, the moment Mz value (the magnitude and direction of the moment) is calculated. The moment Mz value is an example of the "second moment value".

In step S74, the CPU 54 outputs the data of the moment Mz value that was calculated in step S73 to the controller 104.

Note that, although the first shearing force Fx value is calculated for the second electrode 36-4 in above-described step S72, the first shearing force Fx value may be calculated for at least one second electrode 36 among the second electrodes 36-1,4,7. Similarly, although the second shearing force Fx value is calculated for the second electrode 36-6 in above-described step S72, the second shearing force Fx value may be calculated for at least one second electrode 36 among the second electrodes 36-3,6,9.

Figure 26:
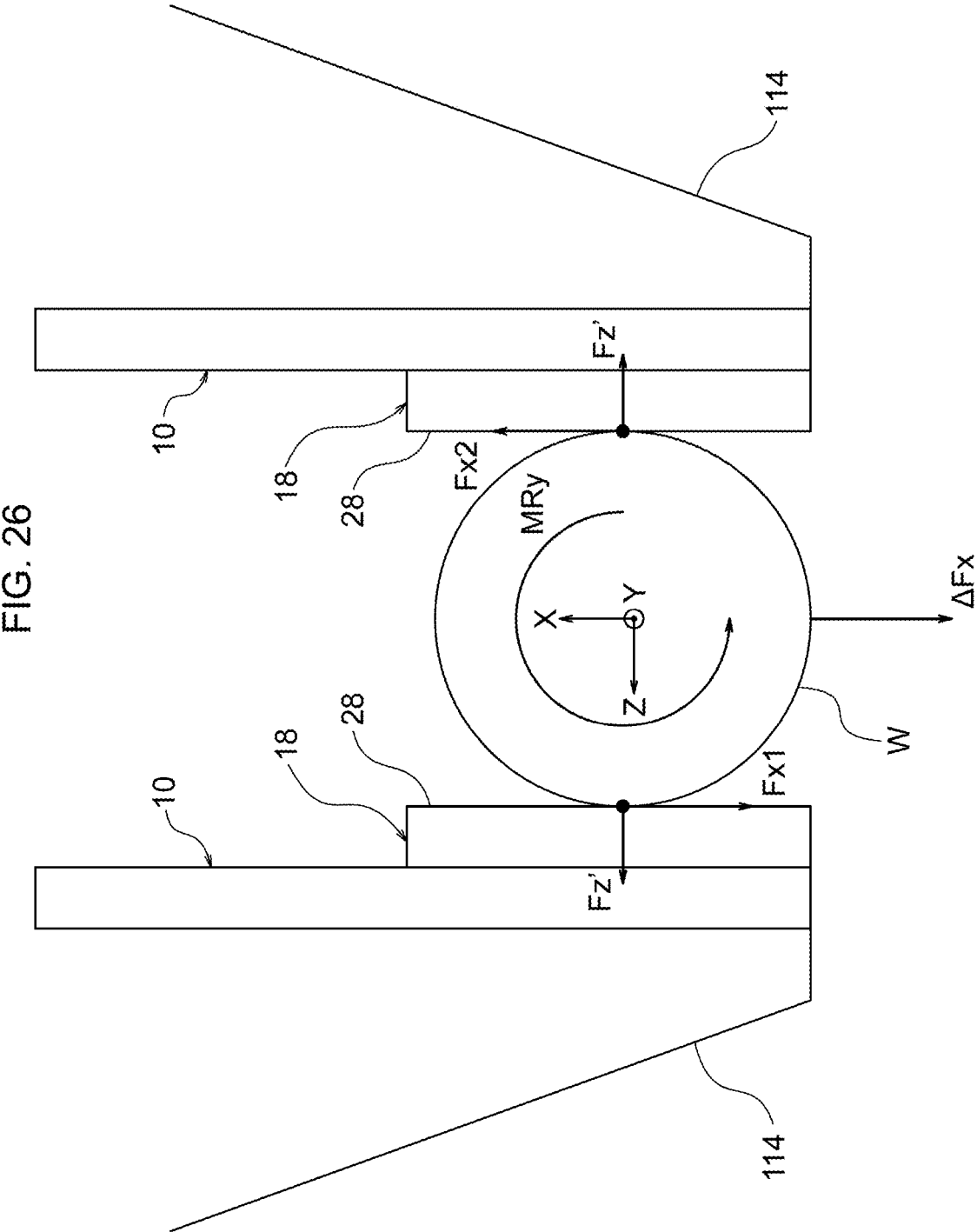
FIG. 26 is a plan view explaining an example of translational force ΔFx in the X-axis direction that is applied to the workpiece grasped by the pair of grasping portions of FIG. 1.

(Translational Force ΔFx Value Data Outputting Processing)
FIG. 26 is a plan view explaining an example of translational force ΔFx in the X-axis direction that is applied to the workpiece W grasped by the pair of grasping portions 114 of FIG. 1. Due to rotational moment MRy around the Y-axis direction being applied to the workpiece W, there are cases in which first shearing force Fx1 in the X-axis direction is applied to the first tactile sensor 10 among the pair of tactile sensors 10, and second shearing force Fx2 in the direction opposite the first shearing force Fx1 is applied to the second tactile sensor 10 among the pair of tactile sensors 10. In this case, the sum of the first shearing force Fx1 and the second shearing force Fx2, which are values to which reference numerals are given, corresponds to the translational force ΔFx in the X-axis direction.

There is a structure in which signals from both of the pair of tactile sensors 10 are inputted to the output section 12 that calculates the translational force ΔFx. The output section 12 calculates the sum of the first aggregate shearing force Fx1 value and the second aggregate shearing force Fx2 value, which are calculated for the pair of tactile sensors 10 respectively, as the translational force ΔFx value, and outputs the data of the translational force ΔFx value.

Figure 27:
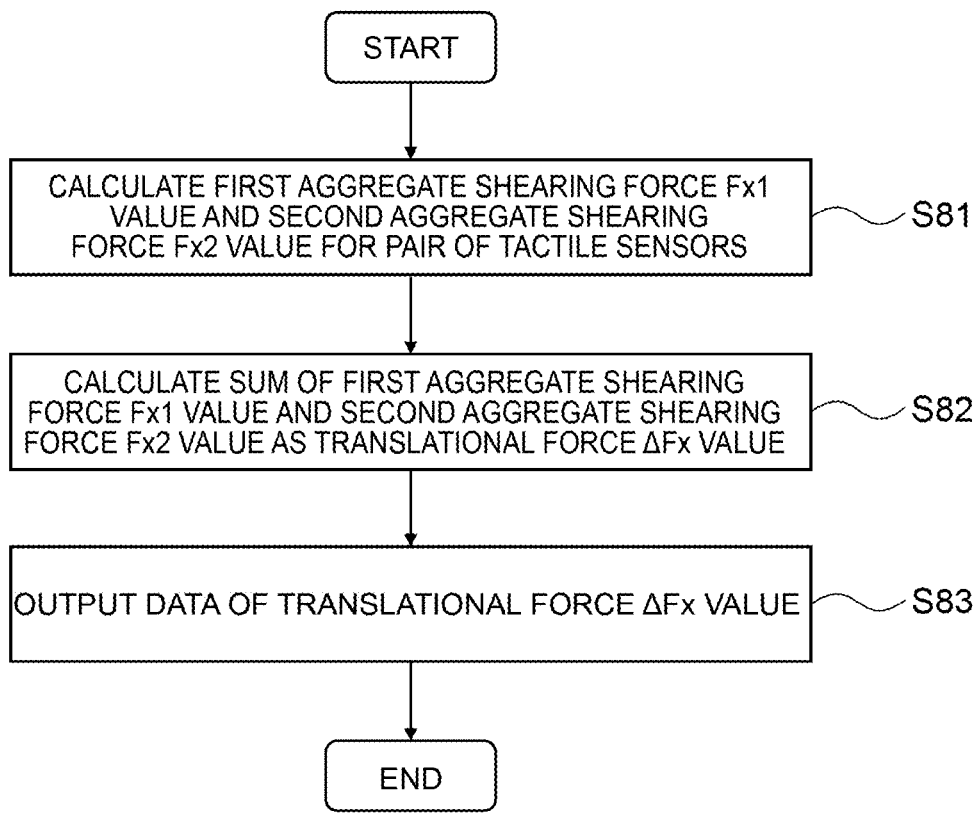
FIG. 27 is a flowchart illustrating an example of the flow of the processing of outputting data of the translational force ΔFx value at the output section of FIG. 16.

FIG. 27 is a flowchart illustrating an example of the flow of the processing of outputting data of the translational force ΔFx value at the output section 12 of FIG. 16. In step S81, the CPU 54 calculates the first aggregate shearing force Fx1 value in the X-axis direction for the first tactile sensor 10. Similarly, in step S81, the CPU 54 calculates the second aggregate shearing force Fx2 value in the X-axis direction for the second tactile sensor 10.

The method of calculating the first aggregate shearing force Fx1 value and the second aggregate shearing force Fx2 value in the X-axis direction is as per the above-described method of calculating the aggregate shearing force Fx value (see FIG. 21). Due thereto, the first aggregate shearing force Fx1 value and the second aggregate shearing force Fx2 value are calculated for the pair of tactile sensors 10, respectively. The first aggregate shearing force Fx1 value and the second aggregate shearing force Fx2 value correspond to an example of the "aggregate shearing force values calculated for the pair of tactile sensors, respectively".

In step S82, the CPU 54 calculates the sum of the first aggregate shearing force Fx1 value and the second aggregate shearing force Fx2 value, which were calculated in step S81, as the translational force ΔFx value.

In step S83, the CPU 54 outputs the data of the translational force ΔFx value that was calculated in step S82 to the controller 104.

Figure 28:
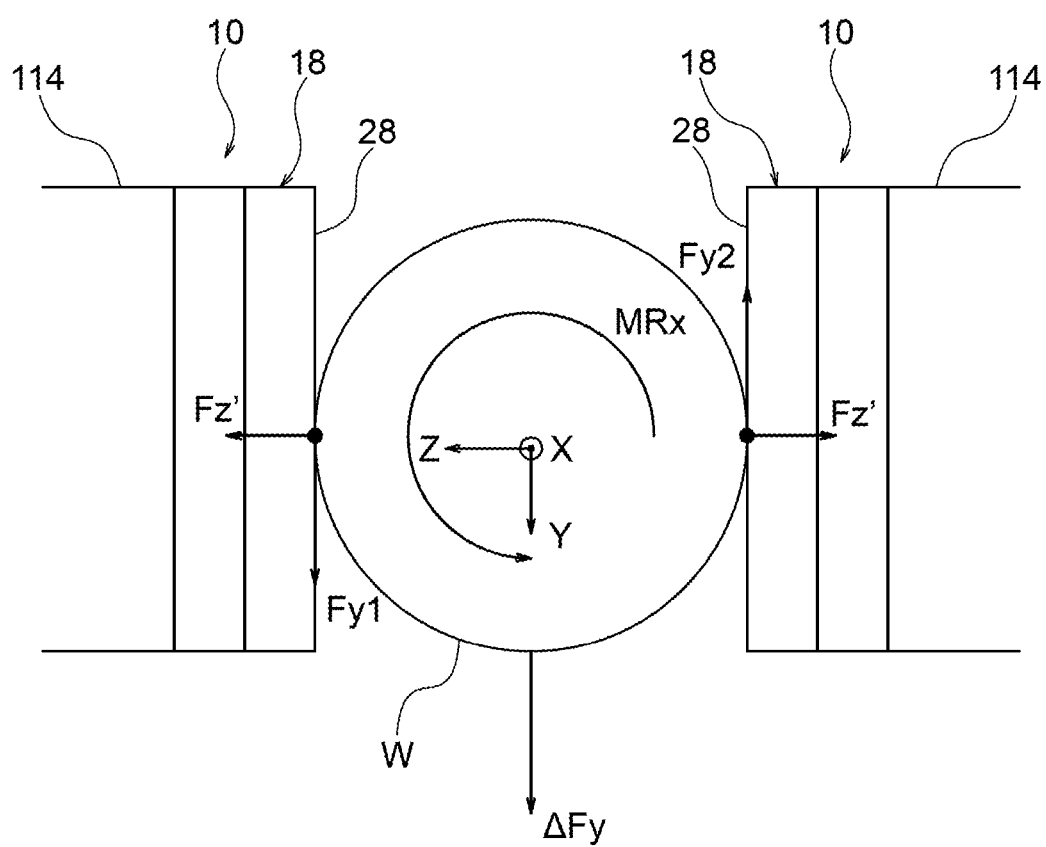
FIG. 28 is a plan view explaining an example of translational force ΔFy in the Y-axis direction that is applied to the workpiece grasped by the pair of grasping portions of FIG. 1.

(Translational Force ΔFy Value Data Outputting Processing)
FIG. 28 is a plan view explaining an example of translational force ΔFy in the Y-axis direction that is applied to the workpiece W grasped by the pair of grasping portions 114 of FIG. 1. Due to rotational moment MRx around the X-axis direction being applied to the workpiece W, there are cases in which first shearing force Fy1 in the Y-axis direction is applied to the first tactile sensor 10 among the pair of tactile sensors 10, and second shearing force Fy2 in the direction opposite the first shearing force Fy1 is applied to the second tactile sensor 10 among the pair of tactile sensors 10. In this case, the sum of the first shearing force Fy1 and the second shearing force Fy2, which are values to which reference numerals are given, corresponds to the translational force ΔFy in the Y-axis direction.

There is a structure in which signals from both of the pair of tactile sensors 10 are inputted to the output section 12 that calculates the translational force ΔFy. The output section 12 calculates the sum of the first aggregate shearing force Fy1 value and the second aggregate shearing force Fy2 value, which are calculated for the pair of tactile sensors 10 respectively, as the translational force ΔFy value, and outputs the data of the translational force ΔFy value.

Figure 29:
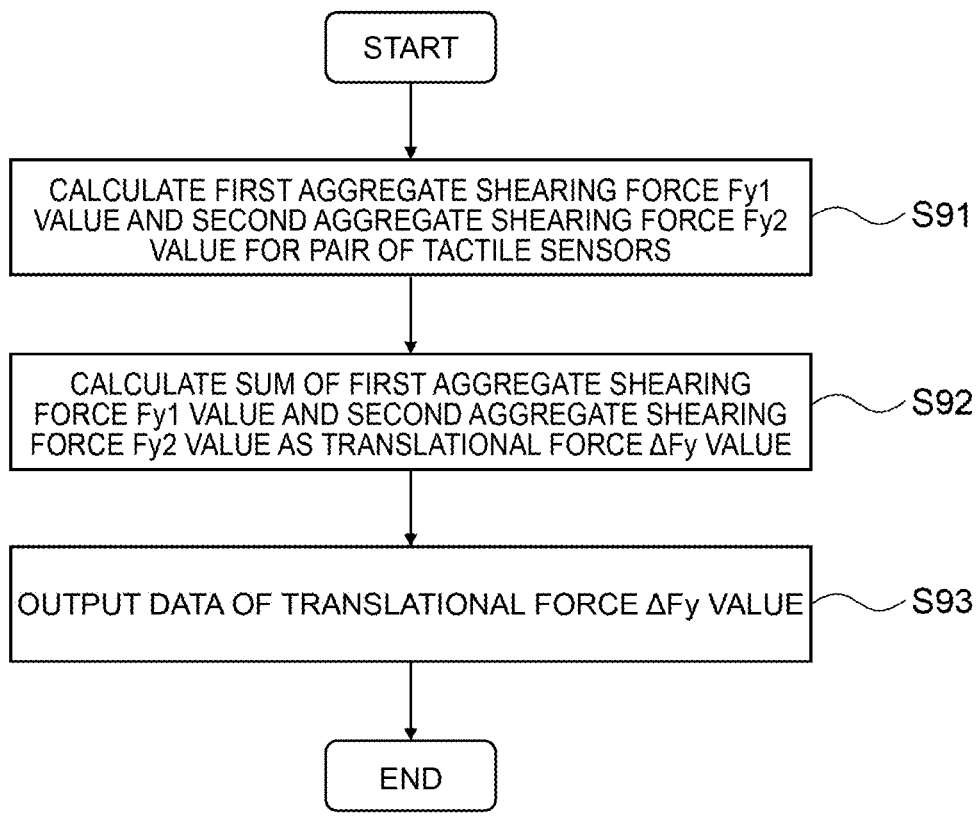
FIG. 29 is a flowchart illustrating an example of the flow of the processing of outputting data of the translational force ΔFy value at the output section of FIG. 16.

FIG. 29 is a flowchart illustrating an example of the flow of the processing of outputting data of the translational force ΔFy value at the output section 12 of FIG. 16. In step S91, the CPU 54 calculates the first aggregate shearing force Fy1 value in the Y-axis direction for the first tactile sensor 10. Similarly, in step S91, the CPU 54 calculates the second aggregate shearing force Fy2 value in the Y-axis direction for the second tactile sensor 10.

The method of calculating the first aggregate shearing force Fy1 value and the second aggregate shearing force Fy2 value in the Y-axis direction is as per the above-described method of calculating the aggregate shearing force Fy value (see FIG. 22). Due thereto, the first aggregate shearing force Fy1 value and the second aggregate shearing force Fy2 value are calculated for the pair of tactile sensors 10, respectively. The first aggregate shearing force Fy1 value and the second aggregate shearing force Fy2 value correspond to an example of the "aggregate shearing force values calculated for the pair of tactile sensors, respectively".

In step S92, the CPU 54 calculates the sum of the first aggregate shearing force Fy1 value and the second aggregate shearing force Fy2 value, which were calculated in step S91, as the translational force ΔFy value.

In step S93, the CPU 54 outputs the data of the translational force ΔFy value that was calculated in step S92 to the controller 104.

(Rotational Moment MRx Value Data Outputting Processing)

As illustrated in FIG. 28, there are cases in which the first shearing force Fy1 in the Y-axis direction is applied to the first tactile sensor 10 among the pair of tactile sensors 10, and the second shearing force Fy2 in the direction opposite the first shearing force Fy1 is applied to the second tactile sensor 10 among the pair of tactile sensors 10. In this case, rotational moment MRx around the X-axis direction is applied to the pair of tactile sensors 10.

There is a structure in which signals from both of the pair of tactile sensors 10 are inputted to the output section 12 that calculates the rotational moment MRx. The output section 12 calculates the rotational moment MRx value around the X-axis direction on the basis of the difference between the first aggregate shearing force Fy1 value and the second aggregate shearing force Fy2 value, which are values calculated for the pair of tactile sensors 10 respectively and to which reference numerals are given, and outputs the data of the rotational moment MRx value.

Figure 30:
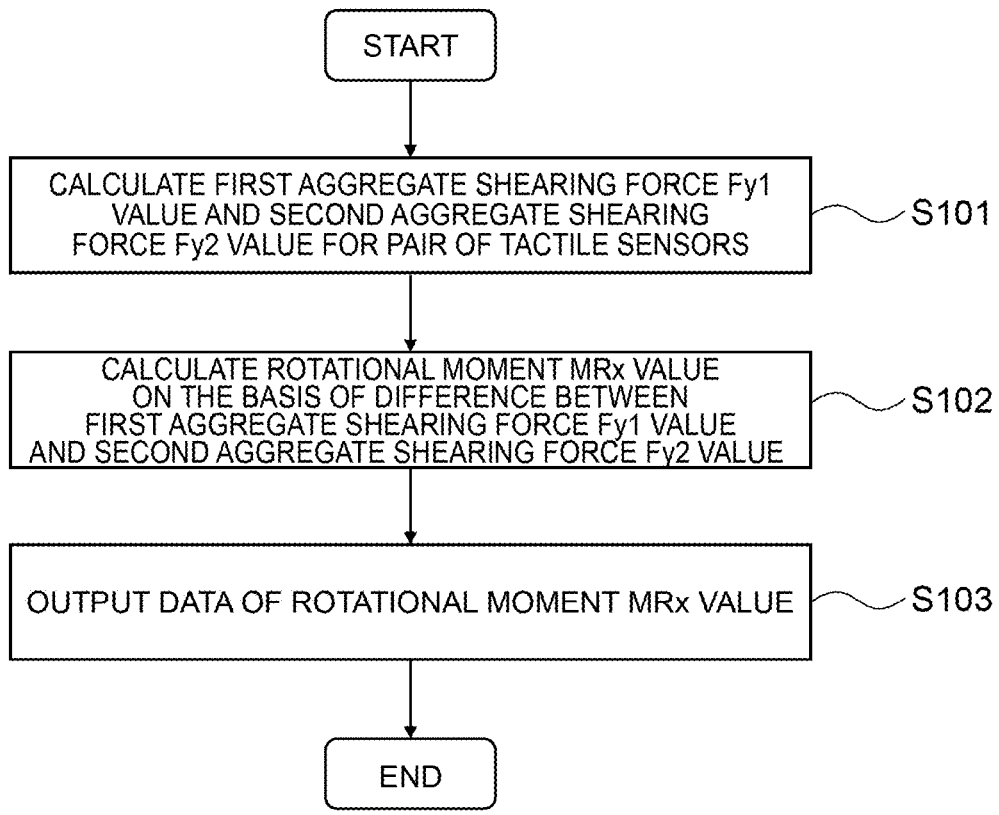
FIG. 30 is a flowchart illustrating an example of the flow of the processing of outputting data of a rotational moment MRx value at the output section of FIG. 16.

FIG. 30 is a flowchart illustrating an example of the flow of the processing of outputting data of the rotational moment MRx value at the output section 12 of FIG. 16. In step S101, the CPU 54 calculates the first aggregate shearing force Fy1 value in the Y-axis direction for the first tactile sensor 10. Similarly, in step S101, the CPU 54 calculates the second aggregate shearing force Fy2 value in the Y-axis direction for the second tactile sensor 10.

The method of calculating the first aggregate shearing force Fy1 value and the second aggregate shearing force Fy2 value in the Y-axis direction is as per the above-described method of calculating the aggregate shearing force Fy value (see FIG. 22). Due thereto, the first aggregate shearing force Fy1 value and the second aggregate shearing force Fy2 value are calculated for the pair of tactile sensors 10, respectively. The first aggregate shearing force Fy1 value and the second aggregate shearing force Fy2 value correspond to an example of the "aggregate shearing force values calculated for the pair of tactile sensors, respectively".

In step S102, the CPU 54 calculates the rotational moment MRx value around the X-axis direction on the basis of the difference between the first aggregate shearing force Fy1 value and the second aggregate shearing force Fy2 value that were calculated in step S101.

In step S103, the CPU 54 outputs the data of the rotational moment MRx value that was calculated in step S102 to the controller 104.

(Rotational Moment MRy Value Data Outputting Processing)

As illustrated in FIG. 26, there are cases in which the first shearing force Fx1 in the X-axis direction is applied to the first tactile sensor 10 among the pair of tactile sensors 10, and the second shearing force Fx2 in the direction opposite the first shearing force Fx1 is applied to the second tactile sensor 10 among the pair of tactile sensors 10. In this case, the rotational moment MRy around the Y-axis direction is applied to the pair of tactile sensors 10.

There is a structure in which signals from both of the pair of tactile sensors 10 are inputted to the output section 12 that calculates the rotational moment MRy. The output section 12 calculates the rotational moment MRy value around the Y-axis direction on the basis of the difference between the first aggregate shearing force Fx1 value and the second aggregate shearing force Fx2 value, which are values calculated for the pair of tactile sensors 10 respectively and to which reference numerals are given, and outputs the data of the rotational moment MRy value.

Figure 31:
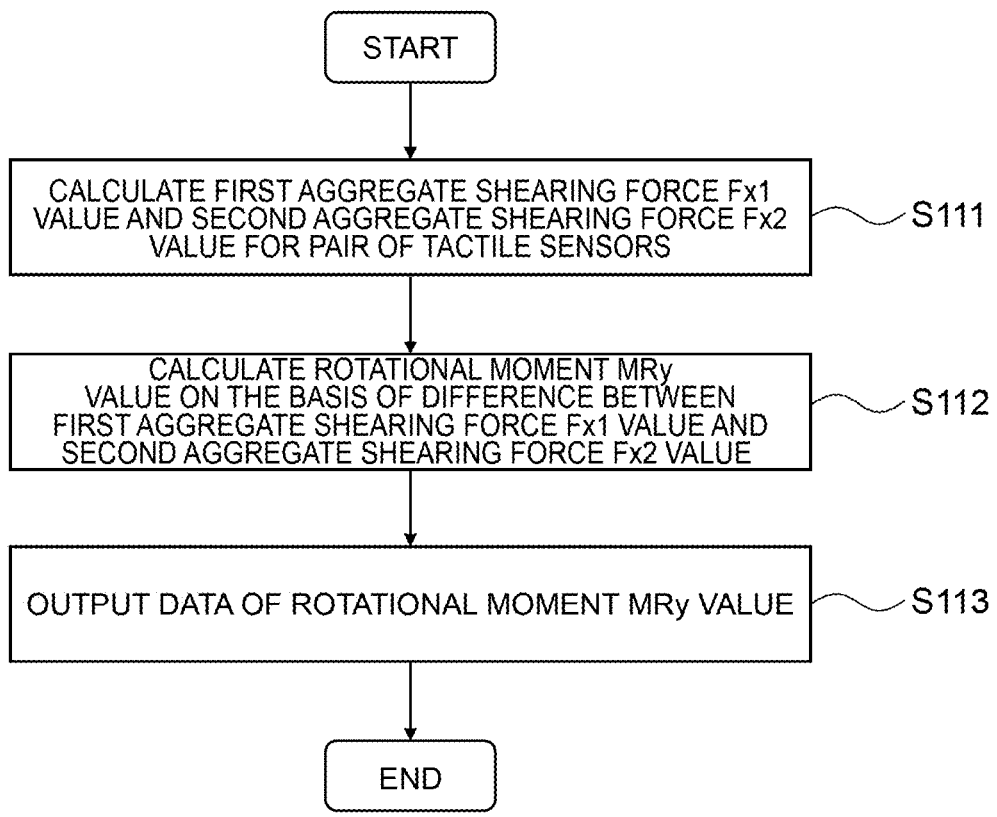
FIG. 31 is a flowchart illustrating an example of the flow of the processing of outputting data of a rotational moment MRy value at the output section of FIG. 16.

FIG. 31 is a flowchart illustrating an example of the flow of the processing of outputting data of the rotational moment MRy value at the output section 12 of FIG. 16. In step S111, the CPU 54 calculates the first aggregate shearing force Fx1 value in the X-axis direction for the first tactile sensor 10. Similarly, in step S111, the CPU 54 calculates the second aggregate shearing force Fx2 value in the X-axis direction for the second tactile sensor 10.

The method of calculating the first aggregate shearing force Fx1 value and the second aggregate shearing force Fx2 value in the X-axis direction is as per the above-described method of calculating the aggregate shearing force Fx value (see FIG. 21). Due thereto, the first aggregate shearing force Fx1 value and the second aggregate shearing force Fx2 value are calculated for the pair of tactile sensors 10, respectively. The first aggregate shearing force Fx1 value and the second aggregate shearing force Fx2 value correspond to an example of the "aggregate shearing force values calculated for the pair of tactile sensors, respectively".

In step S112, the CPU 54 calculates the rotational moment MRy value around the Y-axis direction on the basis of the difference between the first aggregate shearing force Fx1 value and the second aggregate shearing force Fx2 value that were calculated in step S111.

In step S113, the CPU 54 outputs the data of the rotational moment MRy value that was calculated in step S112 to the controller 104.

Operation and effects of the first embodiment are described next.

(1) As described in regard to the plural modes (see FIG. 17) at the output section 12, the output section 12 has the collision sensing mode that outputs collision sensing data in the case of a predetermined condition. Specifically, as predetermined conditions, the output section 12 outputs collision sensing data in a case in which at least a predetermined number of pressure values among the respective pressure values of the plural pressure detecting positions within the contacting surface 28 exceeds a threshold value, or a case in which an aggregate pressure value, which is calculated by carrying out at least one of calculating a representative value, calculating the total value and calculating the average value for the respective pressure values of the plural pressure detecting positions, exceeds a threshold value, or a case in which one aggregate shearing force value calculated for the entire contacting surface 28 exceeds a threshold value. Accordingly, because there is no need to judge a collision at the controller 104, the burden on the controller 104 can be reduced.

(2) As described in regard to the plural modes (see FIG. 17) at the output section 12, the output section 12 has the action content judging mode in which the content of an action of the robot 102 is judged, and various data are selectively outputted in accordance with the content of the action. Specifically, the output section 12 selectively outputs at least any of data of the pressure distribution, data of the grasping force value Fz value, data of the aggregate shearing force Fx value, data of the aggregate shearing force Fy value, data of the moment Mx value, data of the moment My value, and data of the moment Mz value. Accordingly, because various data can be provided to the controller 104 in accordance with the content of the action of the robot 102, the robot 102 can be controlled appropriately by the controller 104.

Further, as described in regard to the plural modes (see FIG. 17) at the output section 12, the output section 12 has the request command handling mode that selectively outputs various data in accordance with a request command from the controller 104. Specifically, the output section 12 selectively outputs at least any of data of the pressure distribution, data of the grasping force Fz value, data of the aggregate shearing force Fx value, data of the aggregate shearing force Fy value, data of the moment Mx value, data of the moment My value, and data of the moment Mz value. Accordingly, because various data can be provided to the controller 104 in accordance with a request command of the controller 104, the robot 102 can be controlled appropriately by the controller 104.

(3) In the processing of outputting data of the grasped position (FIG. 19), on the basis of the respective pressures of the plural pressure detecting positions within the contacting surface 28, the output section 12 specifies the grasped position of the workpiece W within the contacting surface 28, and outputs data of the grasped position. Accordingly, because there is no need to specify the grasped position at the controller 104, the burden on the controller 104 can be reduced.

(4) In the processing of outputting data of the grasping force Fz value (see FIG. 20), the output section 12 calculates an aggregate pressure value by carrying out at least any of calculating a representative value, calculating the total value and calculating the average value for the respective pressure values of the plural pressure detecting positions within the contacting surface 28. Then, the output section 12 outputs the data of the aggregate pressure value as data of the grasping force Fz value. Accordingly, because there is no need to calculate the grasping force Fz value as the aggregate pressure value at the controller 104, the burden on the controller 104 can be reduced.

(5) In the processing of outputting data of the aggregate shearing force Fx value (see FIG. 21), the output section 12 calculates the one aggregate shearing force Fx value for the entire contacting surface 28, and outputs the data of the aggregate shearing force Fx value. Accordingly, because there is no need to calculate the aggregate shearing force Fx value at the controller 104, the burden on the controller 104 can be reduced. Further, for example, as compared with a case of outputting data of a shearing force distribution that expresses the respective shearing force Fx values of plural shearing force detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

Similarly, in the processing of outputting data of the aggregate shearing force Fy value (see FIG. 22), the output section 12 calculates the one aggregate shearing force Fy value for the entire contacting surface 28, and outputs the data of the aggregate shearing force Fy value. Accordingly, because there is no need to calculate the aggregate shearing force Fy value at the controller 104, the burden on the controller 104 can be reduced. Further, for example, as compared with a case of outputting data of a shearing force distribution that expresses the respective shearing force Fx values of plural shearing force detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

(6) In the processing of outputting data of the aggregate shearing force Fx value (see FIG. 21), the output section 12 calculates the shearing force Fx values of the respective positions of the plural second electrodes 36 within the contacting surface 28, on the basis of all or some of the plural signals outputted from the sensor portion 18. Then, the output section 12 calculates the aggregate shearing force Fx value by carrying out at least any of calculating a representative value, calculating the total value and calculating the average value for the shearing force Fx values of the respective positions of the plural second electrodes 36. Accordingly, as compared with the shearing force Fx value that is calculated for one of the second electrodes 36 that is selected arbitrarily, the aggregate shearing force Fx value that more accurately expresses the shearing force Fx value of the entire contacting surface 28 can be outputted.

Similarly, in the processing of outputting data of the aggregate shearing force Fy value (see FIG. 22), the output section 12 calculates the shearing force Fy values of the respective positions of the plural second electrodes 36 within the contacting surface 28, on the basis of all or some of the plural signals outputted from the sensor portion 18. Then, the output section 12 calculates the aggregate shearing force Fy value by carrying out at least any of calculating a representative value, calculating the total value and calculating the average value for the shearing force Fy values of the respective positions of the plural second electrodes 36. Accordingly, as compared with the shearing force Fy value that is calculated for one of the second electrodes 36 that is selected arbitrarily, the aggregate shearing force Fy value that more accurately expresses the shearing force Fy value of the entire contacting surface 28 can be outputted.

(7) In the processing of outputting data of the moment Mx value (see FIG. 23), the output section 12 calculates a first aggregate pressure value and a second aggregate pressure value respectively for the second electrodes 36 that are at two places that are apart in the Y-axis direction at the contacting surface 28. Then, on the basis of the first aggregate pressure value and the second aggregate pressure value, the output section 12 calculates, as the moment Mx value, the value of the moment Mx around the X-axis direction that is applied to the tactile sensor 10, and outputs the data of the moment Mx value. Accordingly, because there is no need for the moment Mx value to be calculated at the controller 104, the burden on the controller 104 can be reduced.

Similarly, in the processing of outputting data of the moment My value (see FIG. 24), the output section 12 calculates a first aggregate pressure value and a second aggregate pressure value respectively for the second electrodes 36 that are at two places that are apart in the X-axis direction at the contacting surface 28. Then, on the basis of the first aggregate pressure value and the second aggregate pressure value, the output section 12 calculates, as the moment My value, the value of the moment My around the Y-axis direction that is applied to the tactile sensor 10, and outputs the data of the moment My value. Accordingly, because there is no need for the moment My value to be calculated at the controller 104, the burden on the controller 104 can be reduced.

(8) In the first example of the processing of outputting data of the moment Mz value (see FIG. 25), the output section 12 calculates a first shearing force Fy value and a second shearing force Fy value respectively for the second electrodes 36 that are at two places that are apart in the X-axis direction at the contacting surface 28. Then, on the basis of the first shearing force Fy value and the second shearing force Fy value, the output section 12 calculates, as the moment Mz value, the value of the moment Mz around the Z-axis direction that is applied to the tactile sensor 10, and outputs the data of the moment Mz value. Accordingly, because there is no need for the moment Mz value to be calculated at the controller 104, the burden on the controller 104 can be reduced.

Similarly, in the second example of the processing of outputting data of the moment Mz value (see FIG. 25), the output section 12 calculates a first shearing force Fx value and a second shearing force Fx value respectively for the second electrodes 36 that are at two places that are apart in the Y-axis direction at the contacting surface 28. Then, on the basis of the first shearing force Fx value and the second shearing force Fx value, the output section 12 calculates, as the moment Mz value, the value of the moment Mz around the Z-axis direction that is applied to the tactile sensor 10, and outputs the data of the moment Mz value. Accordingly, because there is no need for the moment Mz value to be calculated at the controller 104, the burden on the controller 104 can be reduced.

(9) In the processing of outputting data of the translational force ΔFx value (see FIG. 27), the output section 12 calculates, as the translational force ΔFx value, the sum of the first aggregate shearing force Fx1 value and the second aggregate shearing force Fx2 value that were calculated for the pair of tactile sensors 10 respectively, and outputs the translational force ΔFx value. Accordingly, because there is no need to calculate the translational force ΔFx value at the controller 104, the burden on the controller 104 can be reduced.

Similarly, in the processing of outputting data of the translational force ΔFy value (see FIG. 29), the output section 12 calculates, as the translational force ΔFy value, the sum of the first aggregate shearing force Fy1 value and the second aggregate shearing force Fy2 value that were calculated for the pair of tactile sensors 10 respectively, and outputs the translational force ΔFy value. Accordingly, because there is no need to calculate the translational force ΔFy value at the controller 104, the burden on the controller 104 can be reduced.

(10) In the processing of outputting the data of the rotational moment MRx value (see FIG. 30), on the basis of the difference between the first aggregate shearing force Fy1 value and the second aggregate shearing force Fy2 value that were calculated for the pair of tactile sensors 10 respectively, the output section 12 calculates the value of the rotational moment MRx around the X-axis direction as the rotational moment MRx value. Then, the output section 12 outputs the data of the rotational moment MRx value. Accordingly, because there is no need to calculate data of the rotational moment MRx value at the controller 104, the burden on the controller 104 can be reduced.

Similarly, in the processing of outputting the data of the rotational moment MRy value (see FIG. 31), on the basis of the difference between the first aggregate shearing force Fx1 value and the second aggregate shearing force Fx2 value that were calculated for the pair of tactile sensors 10 respectively, the output section 12 calculates the value of the rotational moment MRy around the Y-axis direction as the rotational moment MRy value. Then, the output section 12 outputs the data of the rotational moment MRy value. Accordingly, because there is no need to calculate data of the rotational moment MRy value at the controller 104, the burden on the controller 104 can be reduced.

(11) At the tactile sensor 10 (see FIG. 3 through FIG. 7), the second electrode layer 26 is configured by the plural second electrodes 36 that are a single layer. Accordingly, the structure and the manufacturing processes of the tactile sensor 10 can be simplified.

Further, the pressures at the respective positions of the plural first electrodes 34 can be detected by detecting the electrostatic capacitances that change in accordance with the distances between the first electrodes 34 and the second electrodes 36. Moreover, because each of the second electrodes 36 partially overlaps the respective four first electrodes 34 that are adjacent in the X-axis direction and the Y-axis direction, shearing forces also can be detected at the positions of the respective second electrodes 36 by detecting the electrostatic capacitances that change in accordance with the surface areas over which the four first electrodes 34 and the second electrode 36 overlap one another.

Moreover, due to the number of the plural second electrodes 36 being less than the number of the plural first electrodes 34, the plural first electrodes 34 correspond to the one second electrode 36. Therefore, the intervals between the plural first electrodes 34 can be narrowed as compared with a case in which, for example, the plural first electrodes 34 and the plural second electrodes 36 are in a one-to-one correspondence. Due thereto, because the number of the plural first electrodes 34 can be ensured, the resolution of the pressure distribution can be ensured.

In this way, in accordance with the tactile sensor 10 relating to the first embodiment, shearing forces can be detected, and the resolution of the pressure distribution can be ensured, even by a simple structure and simple manufacturing processes.

Modified examples of the first embodiment are described next.

(1) Although the output section 12 and the tactile sensor 10 are structured separately, the tactile sensor 10 and the output section 12 may be made into a unit.

(2) The output section 12 is provided at the wrist joint portion 112 that connects the robot hand 108 to the robot arm 106. However, at least a portion of the output section 12 may be provided at any of the robot hand 108, the robot arm 106, the input section of the controller 104, and a program part that is provided at the controller 104 and executes program processings. Note that, in the case in which the output section 12 is a program part executed at the controller 104, what is called the controller 104 as opposed to the output section 12 means the portion of the physical controller 104 which portion is other than the program part that is the output section 12.

Further, the input section of the controller 104 may be, for example, an amplifier unit connected to the CPU 54 of the controller 104, or a program part (function block) to which data outputted from the tactile sensors 10 is inputted and that executes program processings. If at least some of the output section 12 is provided at the input section of the controller 104, the burden on the user who carries out programming of the controller 104 can be reduced.

(3) As a preferable example, the output section 12 has both the action content judging mode and the request command handling mode, but either one of the action content judging mode and the request command handling mode may be omitted.

(4) The output section 12 carries out the processings of outputting the respective data of the pressure distribution, the grasped position, the grasping force Fz value, the aggregate shearing force Fx value, the aggregate shearing force Fy value, the moment Mx value, the moment My value, the moment Mz value, the translational force ΔFx value, the translation force ΔFy value, the rotational moment MRx value, and the rotational moment MRy value. However, any one or any several of these plural data outputting processings may be omitted.

(5) The tactile sensor 10 preferably has the above-described structure. However, the tactile sensor 10 may have a structure other than that described above, provided that it is a structure in which the first electrode layer 24 has the plural first electrodes 34, the second electrode layer 26 has the plural second electrodes 36, and two or more of the plural first electrodes 34 partially overlap with the second electrodes 36 as viewed in plan view.

(6) The tactile sensor 10 has the 36 first electrodes 34, but the number of the plural first electrodes 34 may be any number.

(7) The number of the plural second electrodes 36 may be any number, provided that it is less than the number of the plural first electrodes 34.

(8) The plural first electrodes 34 are preferably arrayed in the form of a matrix along the contacting surface 28. However, the first electrodes may be disposed in a form other than a matrix form, provided that the desired pressure distribution is obtained within the contacting surface 28.

Second Embodiment

Figure 32:
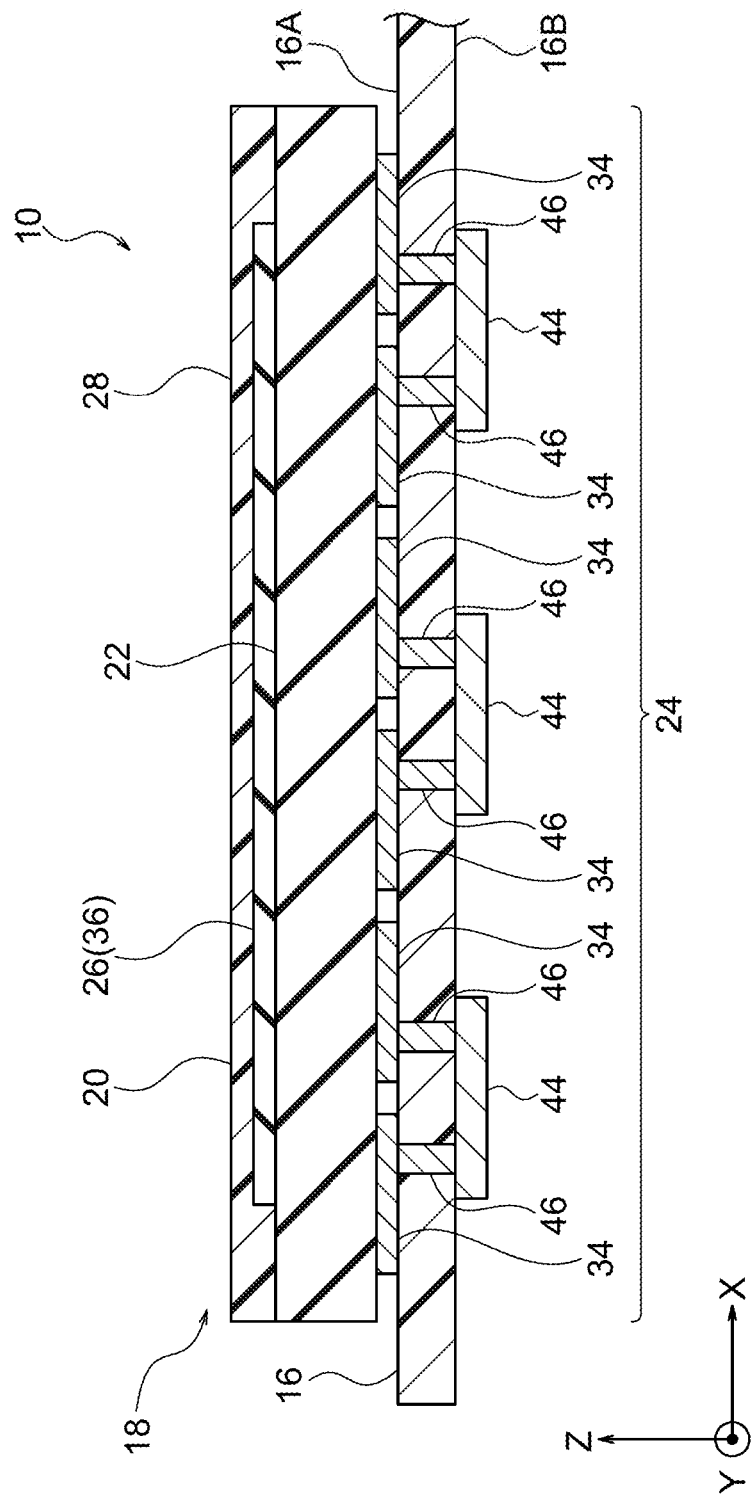
FIG. 32 is a vertical sectional view of the tactile sensor relating to a second embodiment.

A second embodiment is described next.
(Structure of Tactile Sensor 10)
FIG. 32 is a vertical sectional view of the tactile sensor 10 relating to a second embodiment. In the tactile sensor 10 relating to the second embodiment, the structure of the second electrode layer 26 is changed as follows with respect to that of the tactile sensor 10 relating to the above-described first embodiment (see FIG. 3 through FIG. 6).

FIG. 33 is a plan view of the second electrode layer 26 of FIG. 32. The second electrode layer 26 is configured by the one second electrode 36 that is a single layer. Namely, the second electrode 36 forms a single island portion. The second electrode 36 is formed of a conductive rubber for example. This second electrode 36 is formed in the shape of a flat plate. The second electrode 36 may be connected to the ground of the substrate 16, or may be floating with respect to ground.

Figure 34:
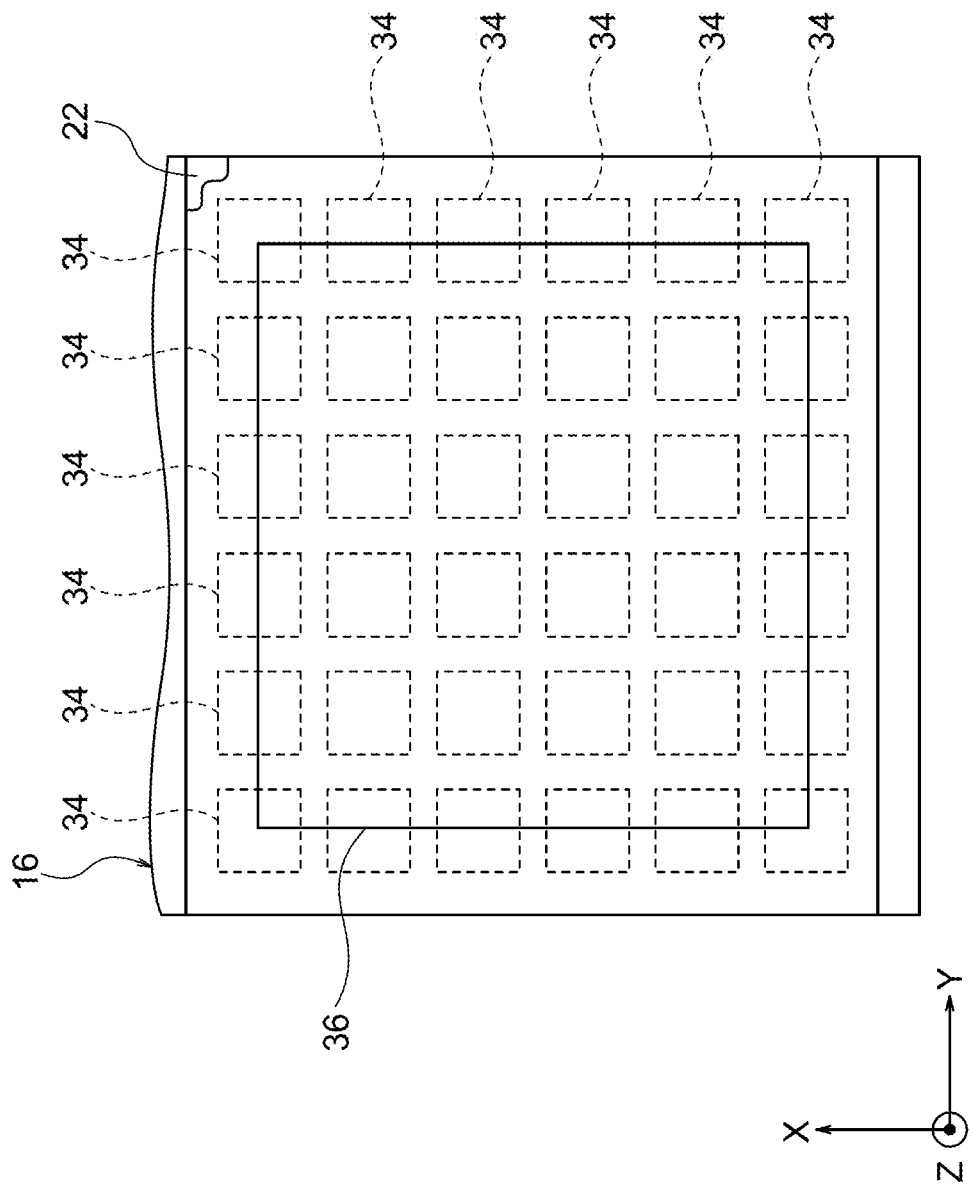
FIG. 34 is a plan view illustrating a state in which the second electrode and the elastic layer and the substrate of FIG. 32 are superposed.

FIG. 34 is a plan view illustrating a state in which the second electrode 36 and the elastic layer 22 and the substrate 16 of FIG. 32 are superposed. As example, the number of the plural first electrodes 34 is 36, whereas the second electrode 36 forms one island portion. Therefore, in the second embodiment, the number of island portions formed by the second electrode 36 is less than the number of the plural first electrodes 34.

As an example, the second electrode 36 is formed in the shape of a square that is smaller than the contacting surface 28 (see FIG. 32). This second electrode 36 is a size that overlaps all of the plural first electrodes 34 as viewed in plan view. Specifically, the second electrode 36 is a size such that the first electrodes 34, which are lined-up along the outer peripheral portion of the second electrode 36 among the plural first electrodes 34, and the outer peripheral portion of the second electrode 36 overlap as viewed in a plan view. Due thereto, the first electrodes 34 that are lined-up along the outer peripheral portion of the second electrode 36 partially overlap with the second electrode 36 as viewed in a plan view. Among the plural first electrodes 34, the first electrodes 34 that are positioned at the inner side of the outer peripheral portion of the second electrode 36 entirely overlap the second electrode 36.

In the second embodiment, among the plural first electrodes 34, the first electrodes 34 that partially overlap with the second electrode 36 correspond to an example of the "plurality of partially-overlapping electrodes that partially overlap with the second electrode", and the plural signals outputted from these first electrodes 34 that partially overlap with the second electrode 36 correspond to an example of the "plurality of partially-overlapping electrode signals".

At the sensor portion 18 of the tactile sensor 10 illustrated in FIG. 32, when pressure is applied to the contacting surface 28, and the distance d between each first electrode 34 and the second electrode 36 changes, the electrostatic capacitance C changes in accordance with this change in the distance d. Further, at the sensor portion 18, when shearing force is applied to the contacting surface 28, and the surface area A over which the first electrode 34 (see FIG. 34), which partially overlaps the second electrode 36, and the second electrode 36 overlap one another changes, the electrostatic capacitance C changes in accordance with this change in the surface area A.

The tactile sensor 10 of this structure is manufactured in the same way as the tactile sensor 10 relating to the above-described first embodiment (see FIG. 3 through FIG. 6).

Figure 35:
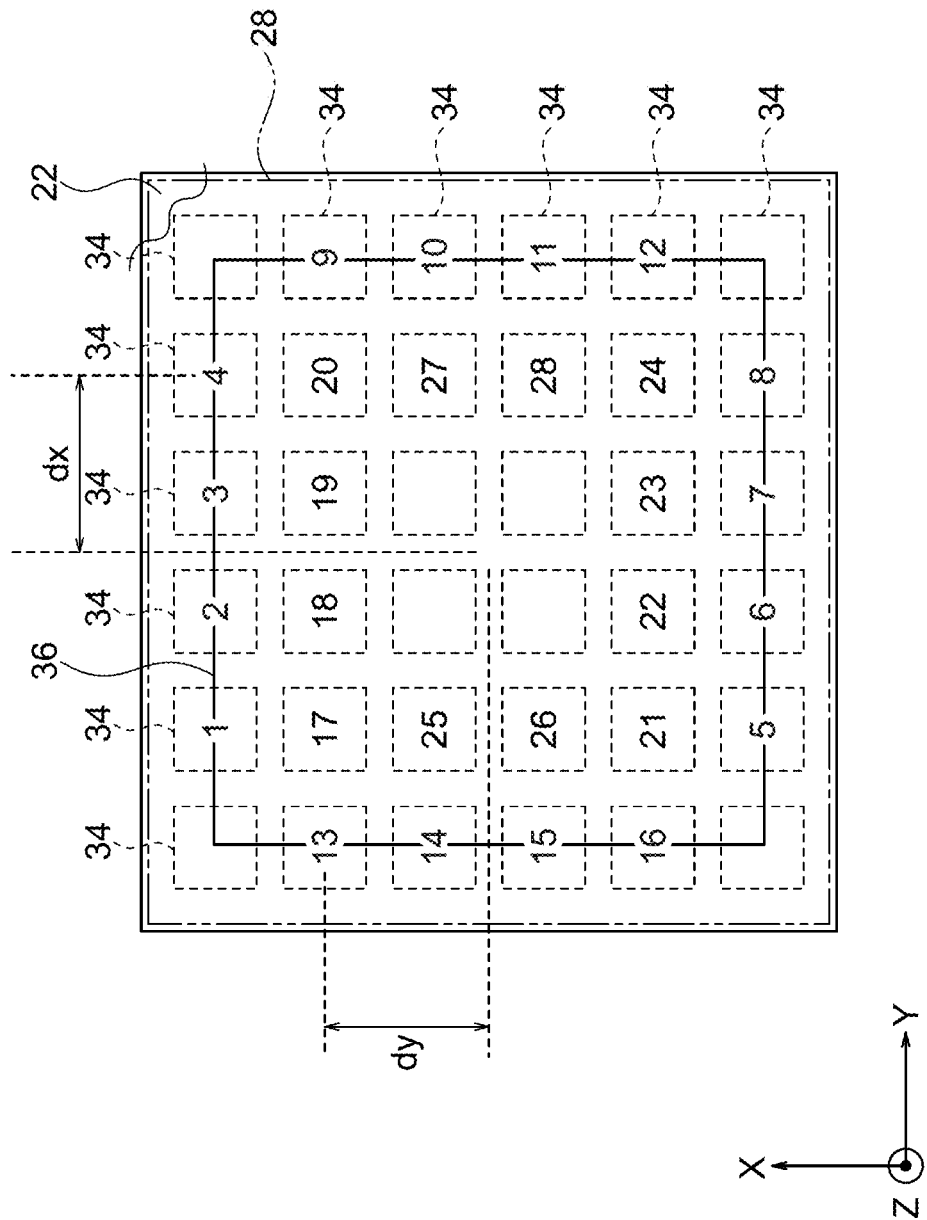
FIG. 35 is a drawing illustrating an example of moment lengths at the tactile sensor of FIG. 32.

FIG. 35 is a drawing explaining an example of the moment lengths dx, dy at the tactile sensor 10 of FIG. 32. Note that, in FIG. 35, identification numbers 1~28 are shown for the plural first electrodes 34. When identifying the plural first electrodes 34, the plural first electrodes 34 are respectively called the first electrodes 34-1~28.

The moment length dx is the length that is used at the time of calculating the moment Mx around the X-axis direction (see FIG. 11). As an example, the moment length dx corresponds to the distance along the Y-axis direction between the center of the contacting surface 28 and the center of the first electrode 34-4 that is at a position apart from the center of the contacting surface 28 in the Y-axis direction.

The moment length dy illustrated in FIG. 35 is the length that is used at the time of calculating the moment My around the Y-axis direction (see FIG. 11). As an example, the moment length dy corresponds to the distance along the X-axis direction between the center of the second electrode 36 and the center of the first electrode 34-13 that is at a position apart from the center of the second electrode 36 in the X-axis direction.

In the second embodiment, the calculation of the displacements $\Delta x$, $\Delta y$, $\Delta z$ is carried out on the basis of an approach similar to that of the case of the first embodiment. In the second embodiment, the hardware structures of the tactile sensor 10, the output section 12 and the controller 104, and the plural modes at the output section 12, are the same as those of the first embodiment. Further, in the second embodiment, the processings of outputting the respective data of the pressure distribution, the grasped position, the grasping force Fz value, the translational force $\Delta$Fx value, the translation force $\Delta$Fy value, the rotational moment MRx value, and the rotational moment MRy value are the same as in the first embodiment.

On the other hand, the processings of outputting the respective data of the aggregate shearing force Fx value, the aggregate shearing force Fy value, the moment Mx value, the moment My value, and the moment Mz value differ from the first embodiment.

(Aggregate Shearing Force Fx Value Data Outputting Processing)

In the second embodiment, the output section 12 calculates one aggregate shearing force Fx value for the entire contacting surface 28, and outputs the data of the aggregate shearing force Fx value. This processing of outputting the data of the aggregate shearing force Fx value is executed at the CPU 54 of the output section 12 by the following procedures for example. The flow of the processing of outputting the data of the aggregate shearing force Fx value in the second embodiment is described hereinafter with reference to FIG. 21.

In step S31, the CPU 54 acquires the data outputted from the plural electrostatic capacitance detecting ICs 44. This data acquired in step S31 is data of the signals outputted from the sensor portion 18 in correspondence with the first electrodes 34 that are the objects of calculation of displacement $\Delta x$ in step S32 described hereinafter.

In step S32, on the basis of the data acquired in step S31, the CPU 54 calculates the displacements $\Delta x$ at the respective positions of the plural first electrodes 34-1~8 that partially overlap with the second electrode 36. At this time, the plural first electrodes 34 that are the objects of calculation of the displacement $\Delta x$ may be all of the plural first electrodes 34-1~8, or may be some of the plural first electrodes 34-1~8.

In the second embodiment, as an example, the CPU 54 calculates the displacements $\Delta x$ for the respective positions of the plural first electrodes 34-1~8. In this step S32, the displacements $\Delta x$ for the respective positions of the plural first electrodes 34-1~8 are calculated on the basis of some of the plural signals outputted from the sensor portion 18. Note that, in the second embodiment, it is preferable to carry out correction of the displacement $\Delta x$ by the values of the displacement $\Delta z$ that are calculated for the first electrodes 34-17~20,21~24.

The displacements $\Delta x$, which are calculated for the respective positions of the plural first electrodes 34-1~8 in this way, are proportional to the shearing force Fx values at the respective positions of the plural first electrodes 34-1~8. Accordingly, due to the displacements $\Delta x$ being calculated for the respective positions of the plural first electrodes 34-1~8, the shearing force Fx values at the respective positions of the plural first electrodes 34-1~8 are calculated.

Note that, in the processing of outputting the data of the aggregate shearing force Fx value relating to the second embodiment, the shearing force Fx values that are calculated for the respective positions of the plural first electrodes 34-1~8 correspond to an example of the "respective shearing force values of the plurality of shearing force detecting positions within the contacting surface".

In step S33, the CPU 54 calculates the aggregate shearing force Fx value by carrying out at least any of calculating a representative value, calculating the total value and calculating the average value for the shearing force Fx values at the respective positions of the plural first electrodes 34-1~8 that were calculated in step S32.

In step S34, the CPU 54 outputs the data of the aggregate shearing force Fx value that was calculated in step S33 to the controller 104. This data of the aggregate shearing force Fx value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

(Aggregate Shearing Force Fy Value Data Outputting Processing)

In the second embodiment, the output section 12 calculates one aggregate shearing force Fy value for the entire contacting surface 28, and outputs the data of the aggregate shearing force Fy value. This processing of outputting the data of the aggregate shearing force Fy value is executed at the CPU 54 of the output section 12 by the following procedures for example. The flow of the processing of outputting the data of the aggregate shearing force Fy value in the second embodiment is described hereinafter with reference to FIG. 22.

In step S41, the CPU 54 acquires the data outputted from the plural electrostatic capacitance detecting ICs 44. This data acquired in step S41 is data of the signals outputted from the sensor portion 18 in correspondence with the first electrodes 34 that are the objects of calculation of displacement $\Delta y$ in step S42 described hereinafter.

In step S42, on the basis of the data acquired in step S41, the CPU 54 calculates the displacements $\Delta y$ at the respective positions of the plural first electrodes 34-9~16 that partially overlap with the second electrode 36. At this time, the plural first electrodes 34 that are the objects of calculation of the displacement $\Delta y$ may be all of the plural first electrodes 34-9~16, or may be some of the plural first electrodes 34-9~16.

In the second embodiment, as an example, the CPU 54 calculates the displacements $\Delta y$ for the respective positions of the plural first electrodes 34-9~16. In this step S42, the displacements $\Delta y$ for the respective positions of the plural first electrodes 34-9~16 are calculated on the basis of some of the plural signals outputted from the sensor portion 18. Note that, in the second embodiment, it is preferable to carry out correction of the displacement $\Delta y$ by the values of the displacement $\Delta z$ calculated for the first electrodes 34-17~25, 26, 21, 20, 27, 28, 24.

The displacements $\Delta y$, which are calculated for the respective positions of the plural first electrodes 34-9~16 in this way, are proportional to the shearing force Fy values at the respective positions of the plural first electrodes 34-9~16. Accordingly, due to the displacements $\Delta y$ being calculated for the respective positions of the plural first electrodes 34-9~16, the shearing force Fy values at the respective positions of the plural first electrodes 34-9~16 are calculated.

Note that, in the processing of outputting the data of the aggregate shearing force Fy value relating to the second embodiment, the shearing force Fy values that are calculated for the respective positions of the plural first electrodes 34-9~16 correspond to an example of the "respective shearing force values of the plurality of shearing force detecting positions within the contacting surface".

In step S43, the CPU 54 calculates an aggregate shearing force Fy value by carrying out at least any of calculating a representative value, calculating the total value and calculating the average value of the shearing force Fy values at the respective positions of the plural first electrodes 34-9~16 that were calculated in step S42.

In step S44, the CPU 54 outputs the data of the aggregate shearing force Fy value that was calculated in step S43 to the controller 104. This data of the aggregate shearing force Fy value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

(Moment Mx Value Data Outputting Processing)

In the second embodiment, the output section 12 respectively calculates a first aggregate pressure value and a second aggregate pressure value for the first electrodes 34 that are at two places that are apart in the Y-axis direction at the contacting surface 28. Then, on the basis of the first aggregate pressure value and the second aggregate pressure value, the output section 12 calculates the value of the moment Mx around the X-axis direction that is applied to the tactile sensor 10, as the moment Mx value, and outputs the data of the moment Mx value.

This processing of outputting the data of the moment Mx value is executed at the CPU 54 of the output section 12 by the following procedures for example. The flow of the processing of outputting the data of the moment Mx value in the second embodiment is described hereinafter with reference to FIG. 23.

In step S51, the CPU 54 acquires the data outputted from the plural electrostatic capacitance detecting ICs 44. This data acquired in step S51 is data of the signals outputted from the sensor portion 18 in correspondence with the first electrodes 34 that are the objects of calculation of displacement Δz in step S52 described hereinafter.

In step S52, on the basis of the data acquired in step S51, the CPU 54 calculates the displacements Δz for the respective positions of the first electrodes 34-20, 27, 28, 24 and the first electrodes 34-17, 25, 26, 21 that are apart from the center of the contacting surface 28 in the Y-axis direction, as examples of the "plurality of first aggregate pressure detecting positions" and the "plurality of second aggregate pressure detecting positions".

The displacements Δz, which are calculated in this way for the respective positions of the plural first electrodes 34, are proportional to the pressure values at the respective positions of the plural first electrodes 34. Accordingly, due to the displacements Δz being calculated for the respective positions of the plural first electrodes 34, the pressure values at the respective positions of the plural first electrodes 34 are calculated.

Note that, in the processing of outputting the data of the moment Mx value relating to the second embodiment, the pressure values calculated for the respective positions of the first electrodes 34-20, 27, 28, 24 correspond to an example of the "respective pressure values of the plurality of first aggregate pressure detecting positions, among the plurality of pressure detecting positions within the contacting surface". Further, the pressure values calculated for the respective positions of the first electrodes 34-17, 25, 26, 21 correspond to an example of the "respective pressure values of the plurality of second aggregate pressure detecting positions, among the plurality of pressure detecting positions within the contacting surface".

In step S53, the CPU 54 carries out at least any of calculation of a representative value, calculation of the total value and calculation of the average value for the pressure values of the respective positions of the first electrodes 34-20, 27, 28, 24, and makes this calculated value be the first aggregate pressure value. Due thereto, the first aggregate pressure value is calculated for the first electrodes 34-20, 27, 28, 24. The first aggregate pressure value corresponds to the normal load Fz'.

Similarly, in step S53, the CPU 54 carries out at least any of calculation of a representative value, calculation of the total value and calculation of the average value for the pressure values of the respective positions of the first electrodes 34-17, 25, 26, 21, and makes this calculated value be the second aggregate pressure value. Due thereto, the second aggregate pressure value is calculated for the first electrodes 34-17, 25, 26, 21. The second aggregate pressure value corresponds to the normal load Fz'.

In step S54, the CPU 54 calculates the difference between a value, which is obtained by multiplying the first aggregate pressure value (the normal load Fz') calculated for the first electrodes 34-17, 25, 26, 21 in step S53 by the distance dx, and a value, which is obtained by multiplying the second aggregate pressure value (the normal load Fz') calculated for the first electrodes 34-17, 25, 26, 21 in step S53 by the distance dx, and makes this difference be the moment Mx value. Due thereto, the moment Mx value (the magnitude and direction of the moment) is calculated. The moment Mx value is an example of the "first moment value".

In step S55, the CPU 54 outputs the data of the moment Mx value that was calculated in step S54 to the controller 104.

Note that, although the pressure values at the respective positions of the first electrodes 34-20, 27, 28, 24 are calculated in above-described step S52, the pressure values at the respective positions of any two first electrodes 34 among the first electrodes 34-20, 27, 28, 24 may be calculated. Similarly, although the pressure values at the respective positions of the first electrodes 34-17, 25, 26, 21 are calculated in above-described step S52, the pressure values at the respective positions of any two first electrodes 34 among the first electrodes 34-17, 25, 26, 21 may be calculated.

(Moment My Value Data Outputting Processing)

In the second embodiment, the output section 12 respectively calculates a first aggregate pressure value and a second aggregate pressure value for the first electrodes 34 that are at two places that are apart in the X-axis direction at the contacting surface 28. Then, on the basis of the first aggregate pressure value and the second aggregate pressure value, the output section 12 calculates the value of the moment My around the Y-axis direction that is applied to the tactile sensor 10, as the moment My value, and outputs the data of the moment My value.

This processing of outputting the data of the moment Mx value is executed at the CPU 54 of the output section 12 by the following procedures for example. The flow of the processing of outputting the data of the moment My value in the second embodiment is described hereinafter with reference to FIG. 24.

In step S61, the CPU 54 acquires the data outputted from the plural electrostatic capacitance detecting ICs 44. This data acquired in step S61 is data of the signals outputted from the sensor portion 18 in correspondence with the first electrodes 34 that are the objects of calculation of displacement Δz in step S62 described hereinafter.

In step S62, on the basis of the data acquired in step S61, the CPU 54 calculates the displacements Δz for the respective positions of the first electrodes 34-17, 18, 19, 20 and the first electrodes 34-21, 22, 23, 24 that are apart from the center of the contacting surface 28 in the X-axis direction, as examples of the "plurality of first aggregate pressure detecting positions" and the "plurality of second aggregate pressure detecting positions".

The displacements Δz, which are calculated in this way for the respective positions of the plural first electrodes 34, are proportional to the pressure values at the respective positions of the plural first electrodes 34. Accordingly, due to the displacements Δz being calculated for the respective positions of the plural first electrodes 34, the pressure values at the respective positions of the plural first electrodes 34 are calculated.

Note that, in the processing of outputting the data of the moment Mx value relating to the second embodiment, the pressure values calculated for the respective positions of the first electrodes 34-17, 18, 19, 20 correspond to an example of the "respective pressure values of the plurality of first aggregate pressure detecting positions, among the plurality of pressure detecting positions within the contacting surface". Further, the pressure values calculated for the respective positions of the first electrodes 34-21, 22, 23, 24 correspond to an example of the "respective pressure values of the plurality of second aggregate pressure detecting positions, among the plurality of pressure detecting positions within the contacting surface".

In step S63, the CPU 54 carries out at least any of calculation of a representative value, calculation of the total value and calculation of the average value for the pressure values of the respective positions of the first electrodes 34-17, 18, 19, 20, and makes this calculated value be the first aggregate pressure value. Due thereto, the first aggregate pressure value is calculated for the first electrodes 34-17, 18, 19, 20. The first aggregate pressure value corresponds to the normal load Fz'.

Similarly, in step S63, the CPU 54 carries out at least any of calculation of a representative value, calculation of the total value and calculation of the average value for the pressure values of the respective positions of the first electrodes 34-21, 22, 23, 24, and makes this calculated value be the second aggregate pressure value. Due thereto, the second aggregate pressure value is calculated for the first electrodes 34-21, 22, 23, 24. The second aggregate pressure value corresponds to the normal load Fz'.

In step S64, the CPU 54 calculates the difference between a value, which is obtained by multiplying the first aggregate pressure value (the normal load Fz') calculated for the first electrodes 34-17, 18, 19, 20 in step S63 by the distance dy, and a value, which is obtained by multiplying the second aggregate pressure value (the normal load Fz') calculated for the first electrodes 34-21, 22, 23, 24 in step S63 by the distance dy, and makes this difference be the moment My value. Due thereto, the moment My value (the magnitude and direction of the moment) is calculated. The moment My value is an example of the "first moment value".

In step S65, the CPU 54 outputs the data of the moment My value that was calculated in step S64 to the controller 104.

Note that, although the pressure values at the respective positions of the first electrodes 34-17, 18, 19, 20 are calculated in above-described step S62, the pressure values at the respective positions of any two first electrodes 34 among the first electrodes 34-17, 18, 19, 20 may be calculated. Similarly, although the pressure values at the respective positions of the first electrodes 34-21, 22, 23, 24 are calculated in above-described step S62, the pressure values at the respective positions of any two first electrodes 34 among the first electrodes 34-21, 22, 23, 24 may be calculated.

(Moment Mz Value Data Outputting Processing)

In the second embodiment, the output section 12 respectively calculates a first shearing force value and a second shearing force value for the first electrodes 34 that are at two places that are apart from the center of the contacting surface 28 in the X-axis direction or the Y-axis direction. Then, on the basis of the first shearing force value and the second shearing force value, the output section 12 calculates the value of the moment Mz around the Z-axis direction that is applied to the tactile sensor 10, as the moment Mz value, and outputs the data of the moment Mz value.

The flow of the processing of outputting data of the moment Mz value in the second embodiment is described hereinafter with reference to FIG. 25. There are the following first example and second example of the processing of outputting data of the moment Mz value.

The moment Mz value data outputting processing relating to the first example is executed at the CPU 54 of the output section 12 by the following procedures for example. In step S71, the CPU 54 acquires the data outputted from the plural electrostatic capacitance detecting ICs 44. This data acquired in step S71 is data of the signals outputted from the sensor portion 18 in correspondence with the first electrodes 34 that are the objects of calculation of displacement Δx in step S72 described hereinafter.

In step S72, on the basis of the data acquired in step S71, as examples of the "first shearing force detecting position" and the "second shearing force detecting position", the CPU 54 calculates the displacements Δx for the respective positions of the first electrodes 34 that are at two places that are apart from one another in the Y-axis direction, among the first electrodes 34-1~4, 5~8.

At this time, for example, the CPU 54 may calculate the displacements Δx for the respective positions of the first electrodes 34-1,4 that are at two places apart from one another in the Y-axis direction among the first electrodes 34-1~4, or may calculate the displacements Δx for the respective positions of the first electrodes 34-5,8 that are at two places apart from one another in the Y-axis direction among the first electrodes 34-5~8.

Further, for example, the CPU 54 may calculate the displacements Δx for the respective positions of the first electrodes 34-2,3 that are at two places apart from one another in the Y-axis direction among the first electrodes 34-1~4, or may calculate the displacements Δx for the respective positions of the first electrodes 34-6,7 that are at two places apart from one another in the Y-axis direction among the first electrodes 34-5~8.

The displacements Δx, which are calculated in this way for the respective positions of the first electrodes 34 of two places that are apart from one another in the Y-axis direction, are proportional to the shearing force Fx values at the respective positions of the first electrodes 34 of these two places. Accordingly, due to the displacements Δx being calculated for the respective positions of the first electrodes 34 of two places that are apart from one another in the Y-axis direction, the shearing force Fx values at the respective positions of the first electrodes 34 of these two places are calculated.

Hereinafter, the shearing force Fx value that is calculated in this way for one of the first electrodes 34 among the first electrodes 34 at two places is called the first shearing force Fx value, and the shearing force Fx value that is calculated for the other first electrode 34 among the first electrodes 34 at two places is called the second shearing force Fx value.

In step S73, the CPU 54 calculates the difference between the first shearing force Fx value and the second shearing force Fx calculated in step S72, and calculates the moment Mz value (the magnitude and direction of the moment) on the basis of this difference. The moment Mz value is an example of the "second moment value".

In step S74, the CPU 54 outputs the data of the moment Mz value that was calculated in step S73 to the controller 104.

The moment Mz value data outputting processing relating to the second example is executed at the CPU 54 of the output section 12 by the following procedures for example. In step S71, the CPU 54 acquires the data outputted from the plural electrostatic capacitance detecting ICs 44. This data acquired in step S71 is data of the signals outputted from the sensor portion 18 in correspondence with the first electrodes 34 that are the objects of calculation of displacement Δy in step S72 described hereinafter.

In step S72, on the basis of the data acquired in step S71, as examples of the "first shearing force detecting position" and the "second shearing force detecting position", the CPU 54 calculates the displacements Δy for the respective positions of the first electrodes 34 at two places that are apart from one another in the X-axis direction, among the first electrodes 34-9~12, 13~16.

At this time, for example, the CPU 54 may calculate the displacements Δy for the respective positions of the first electrodes 34-9,12 that are at two places apart from one another in the X-axis direction among the first electrodes 34-9~2, or may calculate the displacements Δy for the respective positions of the first electrodes 34-13,16 that are at two places apart from one another in the X-axis direction among the first electrodes 34-13~16.

Further, for example, the CPU 54 may calculate the displacements Δy for the respective positions of the first electrodes 34-10,11 that are at two places apart from one another in the X-axis direction among the first electrodes 34-9~2, or may calculate the displacements Δy for the respective positions of the first electrodes 34-14,15 that are at two places apart from one another in the X-axis direction among the first electrodes 34-13~16.

The displacements Δy, which are calculated in this way for the respective positions of the first electrodes 34 that are at two places apart from one another in the X-axis direction, are proportional to the shearing force Fy values at the respective positions the first electrodes 34 at these two places. Accordingly, due to the displacements Δy being calculated for the respective positions of the first electrodes 34 that are at two places apart from one another in the X-axis direction, the shearing force Fy values at the respective positions of the first electrodes 34 at these two places are calculated.

Hereinafter, the shearing force Fy value that is calculated in this way for one of the first electrodes 34 among the first electrodes 34 at the two places is called the first shearing force Fy value, and the shearing force Fy value that is calculated for the other first electrode 34 among the first electrodes 34 at the two places is called the second shearing force Fy value.

In step S73, the CPU 54 calculates the difference between the first shearing force Fy value and the second shearing force Fy calculated in step S72, and calculates the moment Mz value (the magnitude and direction of the moment) on the basis of this difference. The moment Mz value is an example of the "second moment value".

In step S74, the CPU 54 outputs the data of the moment Mz value that was calculated in step S73 to the controller 104.

Operation and effects of the second embodiment are described next.

(1) In the processing of outputting data of the aggregate shearing force Fx value (see FIG. 21), the output section 12 calculates the one aggregate shearing force Fx value for the entire contacting surface 28, and outputs the data of the aggregate shearing force Fx value. Accordingly, because there is no need to calculate the aggregate shearing force Fx value at the controller 104, the burden on the controller 104 can be reduced. Further, for example, as compared with a case of outputting data of a shearing force distribution that expresses the respective shearing force Fx values of plural pressure detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

Similarly, in the processing of outputting data of the aggregate shearing force Fy value (see FIG. 22), the output section 12 calculates the one aggregate shearing force Fy value for the entire contacting surface 28, and outputs the data of the aggregate shearing force Fy value. Accordingly, because there is no need to calculate the aggregate shearing force Fy value at the controller 104, the burden on the controller 104 can be reduced. Further, for example, as compared with a case of outputting data of a shearing force distribution that expresses the respective shearing force Fx values of plural pressure detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

(2) In the processing of outputting data of the aggregate shearing force Fx value (see FIG. 21), the output section 12 calculates the shearing force Fx values of the respective positions of the plural first electrodes 34 within the contacting surface 28, on the basis of some of the plural signals outputted from the sensor portion 18. Then, the output section 12 calculates the aggregate shearing force Fx value by carrying out at least any of calculating a representative value, calculating the total value and calculating the average value for the shearing force Fx values of the respective positions of the plural first electrodes 34. Accordingly, as compared with the shearing force Fx value that is calculated for one of the first electrodes 34 that is selected arbitrarily, the aggregate shearing force Fx value that more accurately expresses the shearing force Fx value of the entire contacting surface 28 can be outputted.

Similarly, in the processing of outputting data of the aggregate shearing force Fy value (see FIG. 22), the output section 12 calculates the shearing force Fy values of the respective positions of the plural first electrodes 34 within the contacting surface 28, on the basis of some of the plural signals outputted from the sensor portion 18. Then, the output section 12 calculates the aggregate shearing force Fy value by carrying out at least any of calculating a representative value, calculating the total value and calculating the average value for the shearing force Fy values of the respective positions of the plural first electrodes 34. Accordingly, as compared with the shearing force Fy value that is calculated for one of the first electrodes 34 that is selected arbitrarily, the aggregate shearing force Fy value data that more accurately expresses the shearing force Fy value of the entire contacting surface 28 can be outputted.

(3) In the processing of outputting data of the moment Mx value (see FIG. 23), the output section 12 calculates a first aggregate pressure value and a second aggregate pressure value respectively for the first electrodes 34 that are at two places that are apart in the Y-axis direction at the contacting surface 28. Then, on the basis of the first aggregate pressure value and the second aggregate pressure value, the output section 12 calculates, as the moment Mx value, the value of the moment Mx around the X-axis direction that is applied to the tactile sensor 10, and outputs the data of the moment Mx value. Accordingly, because there is no need for the moment Mx value to be calculated at the controller 104, the burden on the controller 104 can be reduced.

Similarly, in the processing of outputting data of the moment My value (see FIG. 24), the output section 12 calculates a first aggregate pressure value and a second aggregate pressure value respectively for the first electrodes 34 that are at two places that are apart in the X-axis direction at the contacting surface 28. Then, on the basis of the first aggregate pressure value and the second aggregate pressure value, the output section 12 calculates, as the moment My value, the value of the moment My around the Y-axis direction that is applied to the tactile sensor 10, and outputs the data of the moment My value. Accordingly, because there is no need for the moment My value to be calculated at the controller 104, the burden on the controller 104 can be reduced.

(4) In the first example of the processing of outputting data of the moment Mz value (see FIG. 25), the output section 12 calculates a first aggregate shearing force Fx value and a second aggregate shearing force Fy value respectively for the first electrodes 34 that are at two places that are apart in the Y-axis direction at the contacting surface 28. Then, on the basis of the first aggregate shearing force Fx value and the second aggregate shearing force Fx value, the output section 12 calculates, as the moment Mz value, the value of the moment Mz around the Z-axis direction that is applied to the tactile sensor 10, and outputs the data of the moment Mz value. Accordingly, because there is no need for the moment Mz value to be calculated at the controller 104, the burden on the controller 104 can be reduced.

Similarly, in the second example of the processing of outputting data of the moment Mz value (see FIG. 25), the output section 12 calculates a first aggregate shearing force Fy value and a second aggregate shearing force Fx value respectively for the first electrodes 34 that are at two places that are apart in the X-axis direction at the contacting surface 28. Then, on the basis of the first aggregate shearing force Fy value and the second aggregate shearing force Fy value, the output section 12 calculates, as the moment Mz value, the value of the moment Mz around the Z-axis direction that is applied to the tactile sensor 10, and outputs the data of the moment Mz value. Accordingly, because there is no need for the moment Mz value to be calculated at the controller 104, the burden on the controller 104 can be reduced.

(5) At the tactile sensor 10 (see FIG. 32 through FIG. 34), the second electrode layer 26 is configured by the one second electrode 36 that is a single layer. Accordingly, the structure and the manufacturing processes of the tactile sensor 10 can be simplified.

Further, the pressures at the respective positions of the plural first electrodes 34 can be detected by detecting the electrostatic capacitances that change in accordance with the distances between the first electrodes 34 and the second electrode 36. Moreover, some of the plural first electrodes 34, i.e., the first electrodes 34 that are lined-up along the outer peripheral portion of the second electrode 36, partially overlap with the second electrode 36 as viewed in plan view. Therefore, by detecting the electrostatic capacitances that change in accordance with the surface areas over which the first electrodes 34 and the second electrode 36 overlap one another, shearing forces also can be detected at the positions of the first electrodes 34 that are lined-up along the outer peripheral portion of the second electrode 36.

Moreover, due to the number of the second electrodes 36 being one and being less than the number of the plural first electrodes 34, the plural first electrodes 34 correspond to the one second electrode 36. Therefore, the intervals between the plural first electrodes 34 can be narrowed as compared with a case in which, for example, the plural first electrodes 34 and the plural second electrodes 36 are in a one-to-one correspondence. Due thereto, because the number of the plural first electrodes 34 can be ensured, the resolution of the pressure distribution can be ensured.

In this way, in accordance with the tactile sensor 10 relating to the second embodiment, shearing forces can be detected, and the resolution of the pressure distribution can be ensured, even by a simple structure and simple manufacturing processes.

(6) Because the second electrode 36 is a single structure, as compared with a case in which the second electrode 36 is configured by plural members for example, the manufacturing efficiency can be improved, and the number of parts can be reduced.

(7) In the second embodiment, structures that are similar to those of the first embodiment exhibit operation and effects that are similar to the first embodiment.

Modified examples of the second embodiment are described next.

(1) The tactile sensor 10 preferably has the above-described structure. However, the tactile sensor 10 may have a structure other than that described above, provided that it is a structure in which the first electrode layer 24 has the plural first electrodes 34, the second electrode layer 26 has the one second electrode 36, and two or more of the plural first electrodes 34 partially overlap with the second electrode 36 as viewed in plan view.

(2) The tactile sensor 10 has the 36 first electrodes 34, but the number of the plural first electrodes 34 may be any number.

(3) The number of the second electrodes 36 is one, but may be any number provided that it is less than the number of the plural first electrodes 34.

(4) The plural first electrodes 34 are preferably arrayed in the form of a matrix along the contacting surface 28. However, the first electrodes may be disposed in a form other than a matrix form, provided that the desired pressure distribution is obtained within the contacting surface 28.

(5) In the second embodiment, structures that are similar to those of the first embodiment may employ modified examples that are similar to those of the first embodiment.

Third Embodiment

Figure 36:
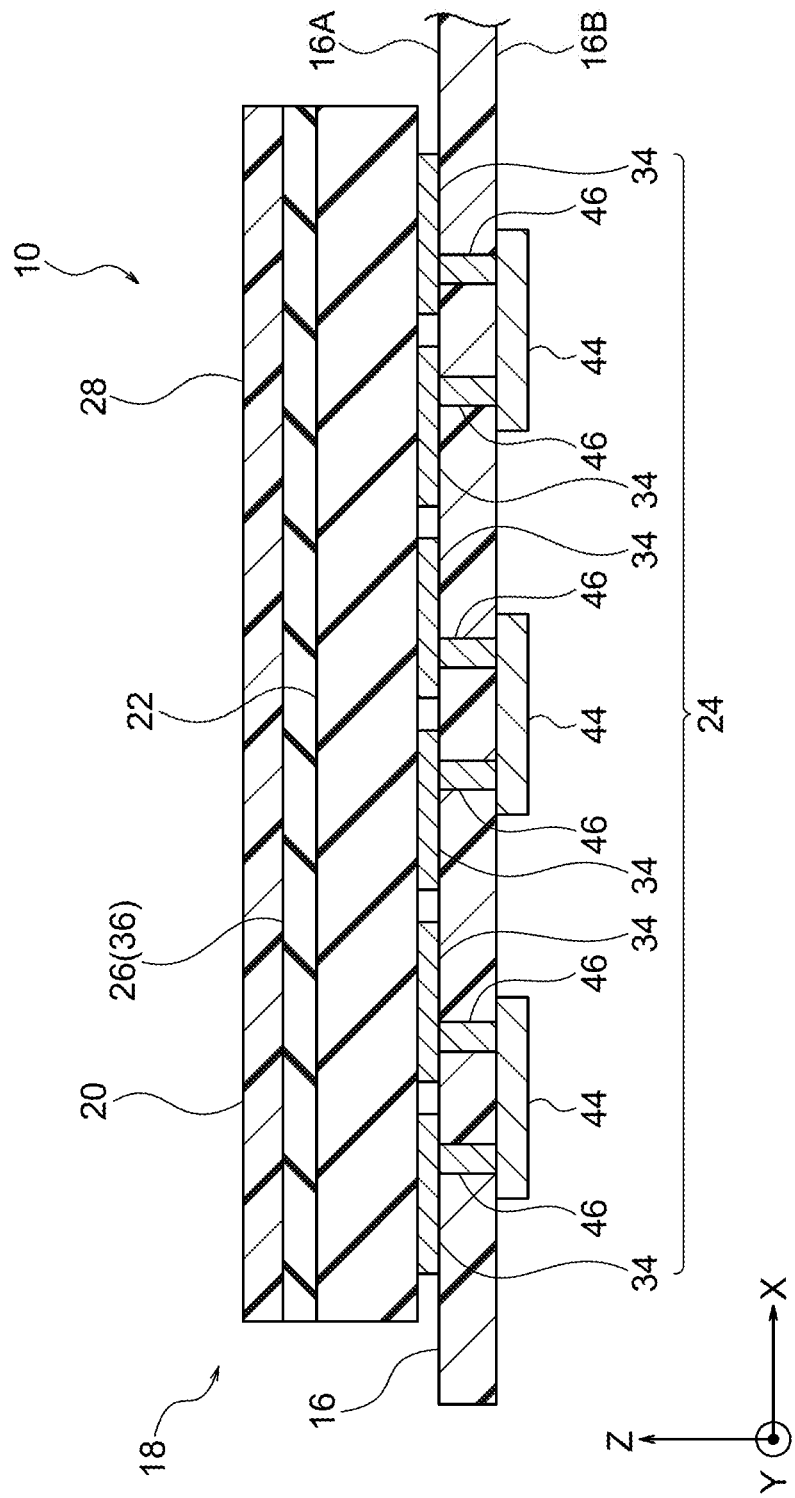
FIG. 36 is a vertical sectional view of the tactile sensor relating to a third embodiment.

A third embodiment is described next.
(Structure of Tactile Sensor 10)
FIG. 36 is a vertical sectional view of the tactile sensor 10 relating to a third embodiment. In the tactile sensor 10 relating to the third embodiment, the structure of the second electrode layer 26 is changed as follows with respect to that of the tactile sensor 10 relating to the above-described first embodiment (see FIG. 3 through FIG. 6).

Figure 37:
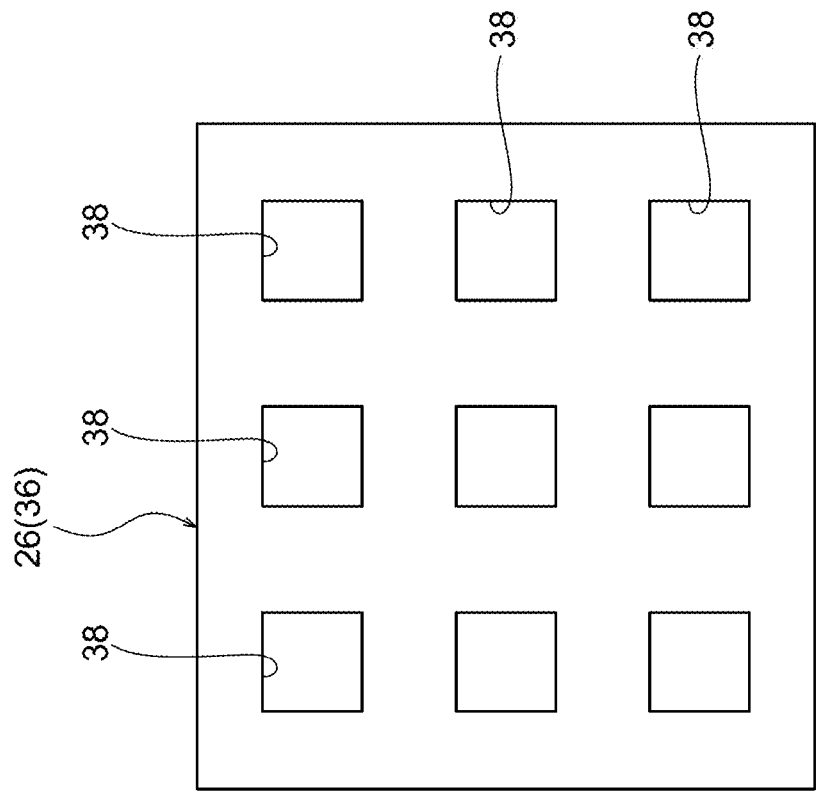
FIG. 37 is a plan view of the second electrode layer of FIG. 36.

FIG. 37 is a plan view of the second electrode layer 26 of FIG. 36. The second electrode layer 26 is configured by the one second electrode 36 that is a single layer. The second electrode 36 is formed from a conductive rubber for example. This second electrode 36 is formed in the shape of a flat plate. As an example, the second electrode 36 is formed in a square shape as viewed in plan view. The second electrode 36 may be connected to the ground of the substrate 16 (see FIG. 3), or may be floating with respect to ground.

Plural openings 38 are formed in the second electrode 36. The plural openings 38 pass-through in the plate thickness direction of the second electrode 36, i.e., the Z-axis direction. The plural openings 38 are arrayed in the form of a matrix along the X-Y plane. Namely, the plural openings 38 are arrayed with the X-axis direction being the length direction and the Y-axis direction being the width direction.

The plural openings 38 are the same shape, and, as an example, the plural openings 38 are formed in square shapes as viewed in plan view. The number of the plural openings 38 is less than the number of the above-described, plural first electrodes 34 (see FIG. 4). As an example, the plural openings 38 are arrayed such that there are three thereof in the X-axis direction and three thereof in the Y-axis direction. Namely, the number of the plural openings 38 is nine. These plural openings 38 are arrayed at uniform intervals in the X-axis direction and the Y-axis direction, respectively.

Figure 38:
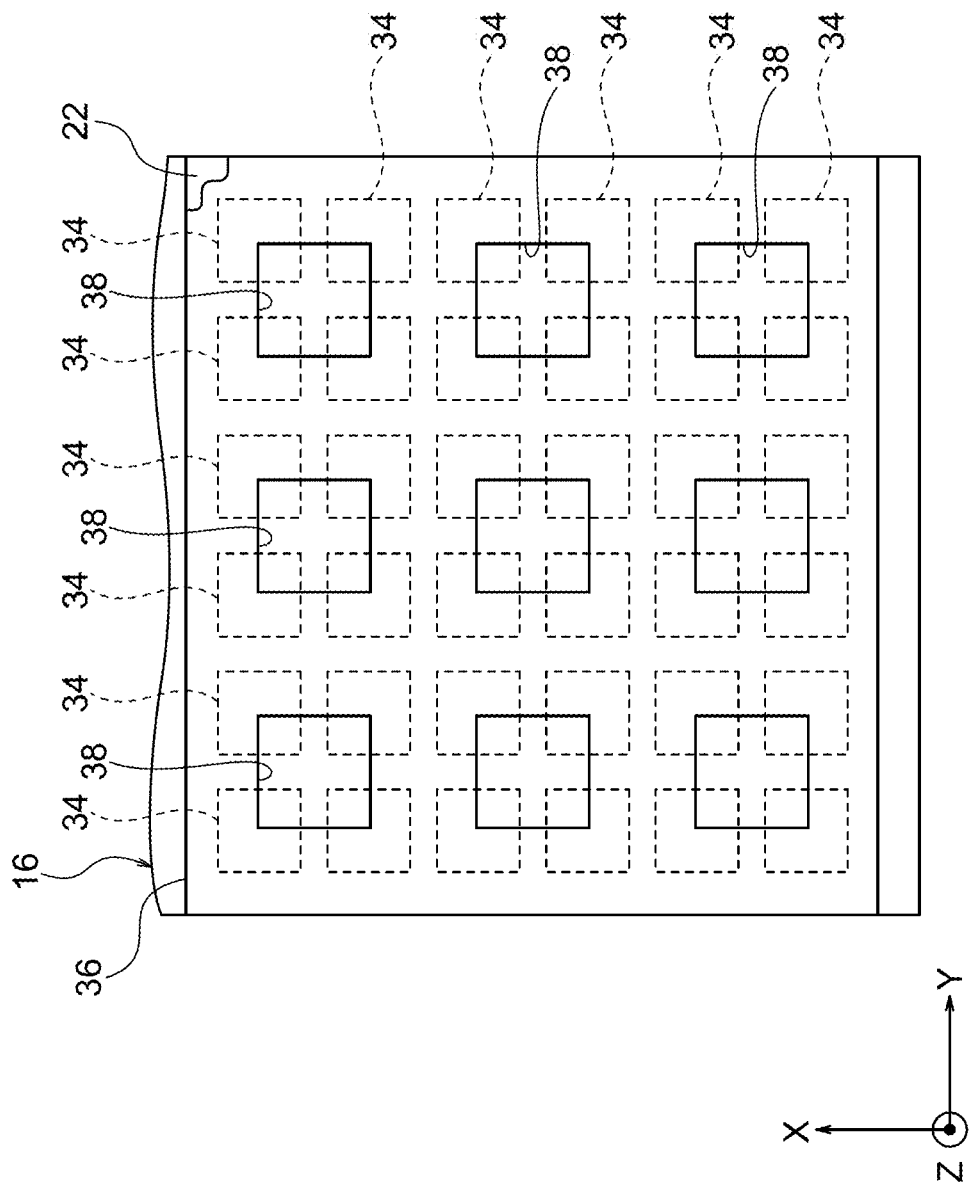
FIG. 38 is a plan view illustrating a state in which the second electrode and the elastic layer and the substrate of FIG. 36 are superposed.

FIG. 38 is a plan view illustrating a state in which the second electrode 36 and the elastic layer 22 and the substrate 16 of FIG. 36 are superposed. The second electrode 36 is a size that overlaps all of the plural first electrodes 34 as viewed in plan view. Specifically, the second electrode 36 is a size that is such that all of the plural first electrodes 34 are contained at the inner side of the outer shape of the second electrode 36 as viewed in plan view.

The plural openings 38 are respectively formed so as to partially overlap with the respective four first electrodes 34 that are adjacent in the X-axis direction and the Y-axis direction, among the plural first electrodes 34, as viewed in plan view. Specifically, as viewed in plan view, each of the openings 38 is positioned at the central portion of four of the first electrodes 34, and partially overlaps these four first electrodes 34.

In this way, in the third embodiment, all of the plural first electrodes 34 are contained at the inner side of the outer shape of the second electrode 36 as viewed in a plan view, and further, all of the plural first electrodes 34 partially overlap with the openings 38. All of the plural first electrodes 34 partially overlapping the openings 38 corresponds to all of the plural first electrodes 34 partially overlapping the second electrode 36.

In the third embodiment, all of the plural first electrodes 34 correspond to an example of the "plurality of partially-overlapping electrodes that partially overlap with the second electrode", and the plural signals that are outputted from the plural first electrodes 34 correspond to an example of the "plurality of partially-overlapping electrode signals".

In the sensor portion 18 of the tactile sensor 10 illustrated in FIG. 36, when pressure is applied to the contacting surface 28, and the distance d between each first electrode 34 and the opening 38 changes, the electrostatic capacitance C changes in accordance with this change in the distance d. Further, at the sensor portion 18, when shearing force is applied to the contacting surface 28, and the surface area A over which each first electrode 34 and the opening 38 overlap one another changes, the electrostatic capacitance C changes in accordance with this change in the surface area A.

The tactile sensor 10 of this structure is manufactured in the same way as the tactile sensor 10 relating to the above-described first embodiment (see FIG. 3 through FIG. 6).

Figure 39:
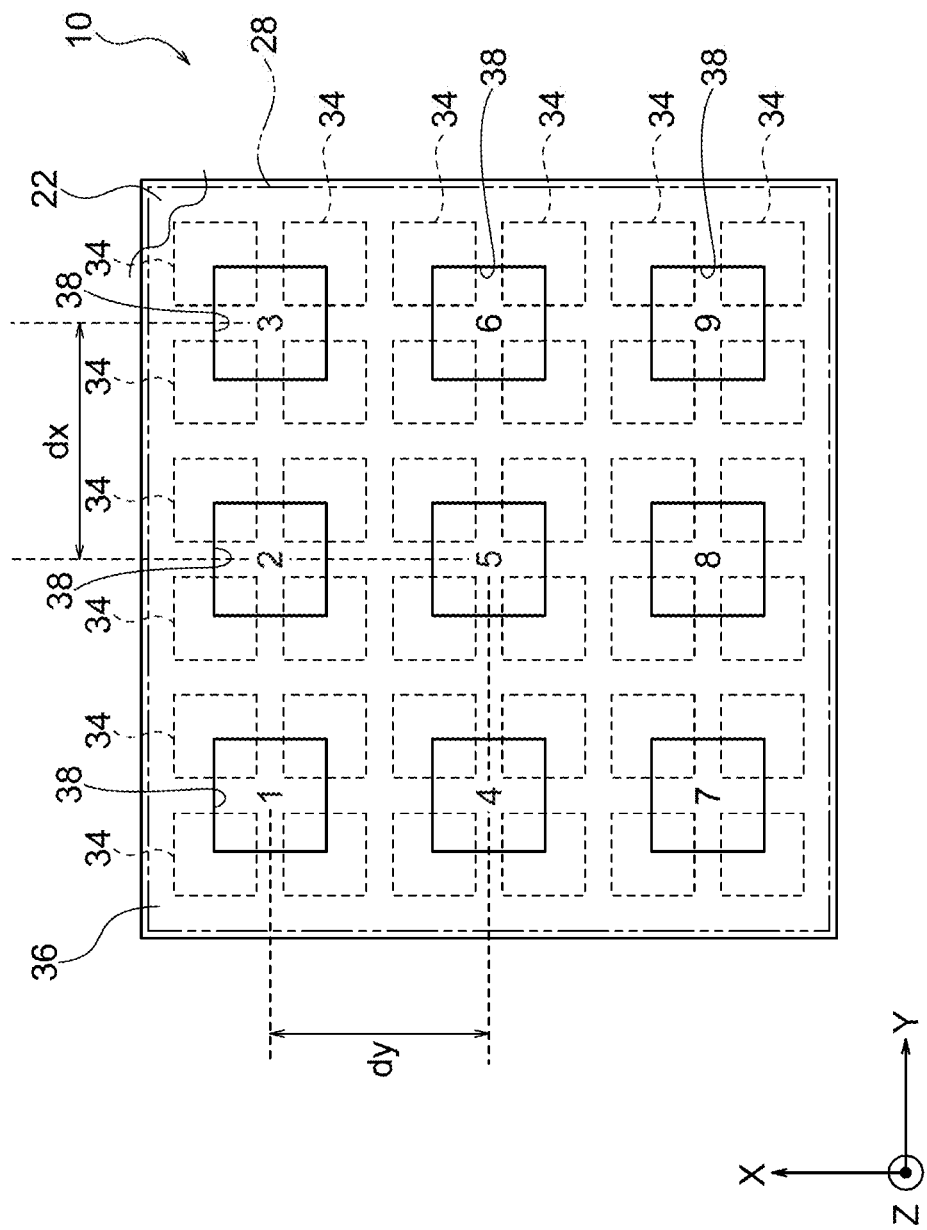
FIG. 39 is a drawing illustrating an example of moment lengths at the tactile sensor of FIG. 36.

FIG. 39 is a drawing explaining an example of the moment lengths dx, dy at the tactile sensor 10 of FIG. 36. Note that, in FIG. 35, identification numbers 1~9 are shown for the plural openings 38. When identifying the plural openings 38, the plural openings 38 are respectively called openings 38-1~9.

The moment length dx illustrated in FIG. 39 is the length that is used at the time of calculating the moment Mx around the X-axis direction (see FIG. 11). As an example, the moment length dx corresponds to the distance along the Y-axis direction between the center of the contacting surface 28 and the center of the opening 38-3 that is at a position apart from the center of the contacting surface 28 in the Y-axis direction.

The moment length dy illustrated in FIG. 39 is the length that is used at the time of calculating the moment My around the Y-axis direction (see FIG. 11). As an example, the moment length dy corresponds to the distance along the X-axis direction between the center of the contacting surface 28 and the center of the opening 38-1 that is at a position apart from the center of the contacting surface 28 in the X-axis direction.

In the third embodiment, the calculation of the displacements $\Delta x$, $\Delta y$, $\Delta z$ is carried out on the basis of an approach similar to that of the case of the first embodiment. In the third embodiment, the hardware structures of the tactile sensors 10, the output section 12 and the controller 104, and the plural modes at the output section 12, are the same as those of the first embodiment. Further, in the third embodiment, the processings of outputting the respective data of the pressure distribution, the grasped position, the grasping force Fz value, the translational force $\Delta Fx$ value, the translation force $\Delta Fy$ value, the rotational moment MRx value, and the rotational moment MRy value are the same as in the first embodiment.

On the other hand, in the third embodiment, the processings of outputting the respective data of the aggregate shearing force Fx value, the aggregate shearing force Fy value, the moment Mx value, the moment My value, and the moment Mz value differ from the first embodiment.

(Aggregate Shearing Force Fx Value Data Outputting Processing)

In the third embodiment, the output section 12 calculates one aggregate shearing force Fx value for the entire contacting surface 28, and outputs the data of the aggregate shearing force Fx value. This processing of outputting the data of the aggregate shearing force Fx value is executed at the CPU 54 of the output section 12 by the following procedures for example. The flow of the processing of outputting the data of the aggregate shearing force Fx value in the third embodiment is described hereinafter with reference to FIG. 21.

In step S31, the CPU 54 acquires the data outputted from the plural electrostatic capacitance detecting ICs 44. This data acquired in step S31 is data of the signals outputted from the sensor portion 18 in correspondence with the first electrodes 34 that are the objects of calculation of displacement $\Delta x$ in step S32 described hereinafter.

In step S32, on the basis of the data acquired in step S31, the CPU 54 calculates the displacements $\Delta x$ at the respective positions of the plural openings 38, as an example of the "plurality of shearing force detecting positions". The position of the opening 38 is expressed by the position of a specific region of the opening 38, such as the center of or any corner of or the like of the opening 38. The calculating of the displacement $\Delta x$ is carried out on the basis of an approach similar to the explanation of the case in which $\Delta x, \Delta y, \Delta z \neq 0$ in the first embodiment, by using all or some of the signals corresponding to the four first electrodes 34 that partially overlap with the one opening 38. In a case of using some of the signals, the signals corresponding to at least two electrodes whose positions in the x direction differ, among the four first electrodes 34 that overlap the one opening 38, are used. At this time, the plural openings 38 that are the objects of calculation of the displacement $\Delta x$ may be all of the openings 38, or may be some of the openings 38. Further, in step S32, all of the plural signals outputted from the sensor portion 18 may be used, or some of the plural signals may be used.

The displacements $\Delta x$, which are calculated for the respective positions of the plural openings 38 in this way, are proportional to the shearing force Fx values at the respective positions of the plural openings 38. Accordingly, due to the displacements $\Delta x$ being calculated for the respective positions of the plural openings 38, the shearing force Fx values at the respective positions of the plural openings 38 are calculated.

Note that, in the processing of outputting the data of the aggregate shearing force Fx value relating to the third embodiment, the shearing force Fx values that are calculated for the respective positions of the plural openings 38 correspond to an example of the "respective shearing force values of the plurality of shearing force detecting positions within the contacting surface".

In step S33, the CPU 54 calculates an aggregate shearing force Fx value by carrying out at least any of calculating a representative value, calculating the total value and calculating the average value for the shearing force Fx values at the respective positions of the plural openings 38 that were calculated in step S32.

In step S34, the CPU 54 outputs the data of the aggregate shearing force Fx value that was calculated in step S33 to the controller 104. This data of the aggregate shearing force Fx value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

(Aggregate Shearing Force Fy Value Data Outputting Processing)

In the third embodiment, the output section 12 calculates one aggregate shearing force Fy value for the entire contacting surface 28, and outputs the data of the aggregate shearing force Fy value. This processing of outputting the data of the aggregate shearing force Fy value is executed at the CPU 54 of the output section 12 by the following procedures for example. The flow of the processing of outputting the data of the aggregate shearing force Fy value in the third embodiment is described hereinafter with reference to FIG. 22.

In step S41, the CPU 54 acquires the data outputted from the plural electrostatic capacitance detecting ICs 44. This data acquired in step S41 is data of the signals outputted from the sensor portion 18 in correspondence with the first electrodes 34 that are the objects of calculation of displacement $\Delta y$ in step S42 described hereinafter.

In step S42, on the basis of the data acquired in step S41, the CPU 54 calculates the displacements $\Delta y$ at the respective positions of the plural openings 38, as an example of the "plurality of shearing force detecting positions". The position of the opening 38 is expressed by the position of a specific region of the opening 38, such as the center of or any corner of or the like of the opening 38. The calculating of the displacement $\Delta y$ is carried out on the basis of an approach similar to the explanation of the case in which $\Delta x, \Delta y, \Delta z \neq 0$ in the first embodiment, by using all or some of the signals corresponding to the four first electrodes 34 that partially overlap with the one opening 38. In a case of using some of the signals, the signals corresponding to at least two electrodes whose positions in the y direction differ, among the four first electrodes 34 that overlap the one opening 38, are used. At this time, the plural openings 38 that are the object of calculation of the displacement $\Delta y$ may be all of the openings 38, or may be some of the openings 38. Further, in step S42, all of the plural signals outputted from the sensor portion 18 may be used, or some of the plural signals may be used.

The displacements $\Delta y$, which are calculated for the respective positions of the plural openings 38 in this way, are proportional to the shearing force Fy values at the respective positions of the plural openings 38. Accordingly, due to the displacements $\Delta y$ being calculated for the respective positions of the plural openings 38, the shearing force Fy values at the respective positions of the plural openings 38 are calculated.

Note that, in the processing of outputting the data of the aggregate shearing force Fy value relating to the third embodiment, the shearing force Fy values that are calculated for the respective positions of the plural openings 38 correspond to an example of the "respective shearing force values of the plurality of shearing force detecting positions within the contacting surface".

In step S43, the CPU 54 calculates the aggregate shearing force Fy value by carrying out at least any of calculating a representative value, calculating the total value and calculating the average value for the shearing force Fy values at the respective positions of the plural openings 38 that were calculated in step S42.

In step S44, the CPU 54 outputs the data of the aggregate shearing force Fy value that was calculated in step S43 to the controller 104. This data of the aggregate shearing force Fy value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

(Moment Mx Value Data Outputting Processing)

In the third embodiment, the output section 12 respectively calculates a first aggregate pressure value and a second aggregate pressure value for the openings 38 that are at two places that are apart in the Y-axis direction at the contacting surface 28. At this time, it is assumed that the tactile sensor 10 is receiving force from the workpiece W at least at the positions of the openings 38 of these two places. Then, on the basis of the first aggregate pressure value and the second aggregate pressure value, the output section 12 calculates the value of the moment Mx around the X-axis direction that is applied to the tactile sensor 10, as the moment Mx value, and outputs the data of the moment Mx value.

This processing of outputting the data of the moment Mx value is executed at the CPU 54 of the output section 12 by the following procedures for example. The flow of the processing of outputting the data of the moment Mx value in the third embodiment is described hereinafter with reference to FIG. 23.

In step S51, the CPU 54 acquires the data outputted from the plural electrostatic capacitance detecting ICs 44. This data acquired in step S51 is data of the signals outputted from the sensor portion 18 in correspondence with the first electrodes 34 that are the objects of calculation of displacement Δz in step S52 described hereinafter.

In step S52, on the basis of the data acquired in step S51 and as an example of the "plurality of first aggregate pressure detecting positions", the opening 38-4 (see FIG. 39), which is apart from the center of the contacting surface 28 in the Y-axis direction, is selected, and the CPU 54 calculates the displacements Δz for the respective positions of the four first electrodes 34 that partially overlap with the opening 38-4. The positions of these four first electrodes 34 are an example of the "plurality of pressure detecting positions that are in a vicinity of the first aggregate pressure detecting position". Moreover, as an example of the "second aggregate pressure detecting position", the opening 38-6 (see FIG. 39) that is apart from the center of the contacting surface 28 in the opposite direction of the opening 38-4, is selected, and the displacements Δz for the respective positions of the four first electrodes 34 that partially overlap with the opening 38-6 are calculated. The positions of these four first electrodes 34 are an example of the "plurality of pressure detecting positions that are in a vicinity of the second aggregate pressure detecting position".

The displacements Δz, which are calculated in this way for the respective positions of the first electrodes 34 that partially overlap with the plural openings 38-4,6, are proportional to the pressure values at the respective positions of the first electrodes 34. Accordingly, due to the displacements Δz being calculated for the respective positions of the first electrodes 34, the pressure values at the respective positions of the first electrodes 34 are calculated.

Note that, in the processing of outputting the data of the moment Mx value relating to the third embodiment, the pressure values calculated for the respective positions of the first electrodes 34 that partially overlap with the opening 38-4 correspond to an example of the "respective pressure values of the plurality of pressure detecting positions that are in a vicinity of the first aggregate pressure detecting position, among the plurality of pressure detecting positions within the contacting surface". Further, the pressure values calculated for the respective positions of the first electrodes 34 that partially overlap with the opening 38-6 correspond to an example of the "respective pressure values of the plurality of pressure detecting positions that are in a vicinity of the second aggregate pressure detecting position, among the plurality of pressure detecting positions within the contacting surface".

In step S53, the CPU 54 carries out at least any of calculation of a representative value, calculation of the total value and calculation of the average value for the pressure values of the respective positions of the first electrodes 34 that partially overlap with the opening 38-4, and makes this calculated value be the first aggregate pressure value. Due thereto, the first aggregate pressure value is calculated for the opening 38-4. The first aggregate pressure value corresponds to the normal load Fz'.

Similarly, in step S53, the CPU 54 carries out at least any of calculation of a representative value, calculation of the total value and calculation of the average value for the pressure values of the respective positions of the first electrodes 34 that partially overlap with the opening 38-6, and makes this calculated value be the second aggregate pressure value. Due thereto, the second aggregate pressure value is calculated for the opening 38-6. The second aggregate pressure value corresponds to the normal load Fz'.

In steps S52 and S53, in the same way as the calculating of the first aggregate pressure value for the opening 38-4, the first aggregate pressure values may be calculated for the openings 38-1,7 also, and at least any of calculation of a representative value, calculation of the total value and calculation of the average value may be carried out for these three first aggregate pressure values, and the calculated value may be made to be the final first aggregate pressure value. The first aggregate pressure detecting positions in this case are the respective positions of the openings 38-1,4,7. Further, in steps S52 and S53, in the same way as the calculating of the second aggregate pressure value for the opening 38-6, the second aggregate pressure values may be calculated for the openings 38-3,9 also, and at least any of calculation of a representative value, calculation of the total value and calculation of the average value may be carried out for these three second aggregate pressure values, and the calculated value may be made to be the final second aggregate pressure value. The second aggregate pressure detecting positions in this case are the respective positions of the openings 38-3,6,9. At this time, it is assumed that the tactile sensor 10 is receiving force from the workpiece W at least at the positions of the openings 38 of these six places.

In step S54, the CPU 54 calculates the difference between a value, which is obtained by multiplying the first aggregate pressure value (the normal load Fz') calculated for the opening 38-4 or group of 38-1,4,7 in step S53 by the distance dx, and a value, which is obtained by multiplying the second aggregate pressure value (the normal load Fz') calculated for the opening 38-6 or group of 38-3,6,9 in step S53 by the distance dx, and makes this difference be the moment Mx value. Due thereto, the moment Mx value (the magnitude and direction of the moment) is calculated. The moment Mx value is an example of the "first moment value".

In step S55, the CPU 54 outputs the data of the moment Mx value that was calculated in step S54 to the controller 104.

(Moment My Value Data Outputting Processing)

In the third embodiment, the output section 12 respectively calculates a first aggregate pressure value and a second aggregate pressure value for the openings 38 that are at two places that are apart in the X-axis direction at the contacting surface 28. At this time, it is assumed that the tactile sensor 10 is receiving force from the workpiece W at least at the positions of the openings 38 of these two places. Then, on the basis of the first aggregate pressure value and the second aggregate pressure value, the output section 12 calculates the value of the moment My around the Y-axis direction that is applied to the tactile sensor 10, as the moment My value, and outputs the data of the moment My value.

This processing of outputting the data of the moment My value is executed at the CPU 54 of the output section 12 by the following procedures for example. The flow of the processing of outputting the data of the moment My value in the third embodiment is described hereinafter with reference to FIG. 24.

In step S61, the CPU 54 acquires the data outputted from the plural electrostatic capacitance detecting ICs 44. This data acquired in step S61 is data of the signals outputted from the sensor portion 18 in correspondence with the first electrodes 34 that are the objects of calculation of displacement Δx in step S62 described hereinafter.

In step S62, on the basis of the data acquired in step S61 and as an example of the "plurality of first aggregate pressure detecting positions", the opening 382, which is apart from the center of the contacting surface 28 in the X-axis direction, is selected, and the CPU 54 calculates the displacements Δz for the respective positions of the four first electrodes 34 that partially overlap with the opening 38-2. The positions of these four first electrodes 34 are an example of the "plurality of pressure detecting positions that are in a vicinity of the first aggregate pressure detecting position". Moreover, as an example of the "second aggregate pressure detecting position", the opening 38-8 (see FIG. 39) that is apart from the center of the contacting surface 28 in the opposite direction of the opening 38-2, is selected, and the displacements Δz for the respective positions of the four first electrodes 34 that partially overlap with the second electrode -8 are calculated. The positions of these four first electrodes 34 are an example of the "plurality of pressure detecting positions that are in a vicinity of the second aggregate pressure detecting position".

The displacements Δz, which are calculated in this way for the respective positions of the first electrodes 34 that partially overlap with the plural openings 38-2,8, are proportional to the pressure values at the respective positions of the first electrodes 34. Accordingly, due to the displacements Δz being calculated for the respective positions of the first electrodes 34, the pressure values at the respective positions of the first electrodes 34 are calculated.

Note that, in the processing of outputting the data of the moment My value relating to the third embodiment, the pressure values calculated for the respective positions of the first electrodes 34 that partially overlap with the opening 38-2 correspond to an example of the "respective pressure values of the plurality of pressure detecting positions that are in a vicinity of the first pressure detecting position, among the plurality of pressure detecting positions within the contacting surface". Further, the pressure values calculated for the respective positions of the first electrodes 34 that partially overlap with the opening 38-8 correspond to an example of the "respective pressure values of the plurality of pressure detecting positions that are in a vicinity of the second aggregate pressure detecting position, among the plurality of pressure detecting positions within the contacting surface".

In step S63, the CPU 54 carries out at least any of calculation of a representative value, calculation of the total value and calculation of the average value for the respective pressure values of the first electrodes 34 that partially overlap with the opening 38-2, and makes this calculated value be the first aggregate pressure value. Due thereto, the first aggregate pressure value is calculated for the openings 38-1,2,3. The first aggregate pressure value corresponds to the normal load Fz'.

Similarly, in step S63, the CPU 54 carries out at least any of calculation of a representative value, calculation of the total value and calculation of the average value for the respective pressure values of the first electrodes 34 that partially overlap with the opening 38-8, and makes this calculated value be the second aggregate pressure value. Due thereto, the second aggregate pressure value is calculated for the opening 38-8. The second aggregate pressure value corresponds to the normal load Fz'.

In steps S62 and S63, in the same way as the calculating of the first aggregate pressure value for the opening 38-2, the first aggregate pressure values may be calculated for the openings 38-1,3 also, and at least any of calculation of a representative value, calculation of the total value and calculation of the average value may be carried out for these three first aggregate pressure values, and the calculated value may be made to be the final first aggregate pressure value. The first aggregate pressure detecting positions in this case are the respective positions of the openings 38-1,2,3. Further, in steps S62 and S63, in the same way as the calculating of the second aggregate pressure value for the opening 38-8, the second aggregate pressure values may be calculated for the openings 38-7,9 also, and at least any of calculation of a representative value, calculation of the total value and calculation of the average value may be carried out for these three second aggregate pressure values, and the calculated value may be made to be the final second aggregate pressure value. The second aggregate pressure detecting positions in this case are the respective positions of the openings 38-7,8,9. At this time, it is assumed that the tactile sensor 10 is receiving force from the workpiece W at least at the positions of the openings 38 of these six places.

In step S64, the CPU 54 calculates the difference between a value, which is obtained by multiplying the first aggregate pressure value (the normal load Fz') calculated for the opening 38-4 or group of 38-1,2,3 in step S63 by the distance dy, and a value, which is obtained by multiplying the second aggregate pressure value (the normal load Fz') calculated for the opening 38-8 or group of 38-7,8,9 in step S63 by the distance dy, and makes this difference be the moment My value. Due thereto, the moment My value (the magnitude and direction of the moment) is calculated. The moment My value is an example of the "first moment value".

In step S65, the CPU 54 outputs the data of the moment My value that was calculated in step S64 to the controller 104.

(Moment Mz Value Data Outputting Processing)

In the third embodiment, the output section 12 respectively calculates a first aggregate shearing force value and a second aggregate shearing force value for the openings 38 that are at two places that are apart from the center of the contacting surface 28 in the X-axis direction or the Y-axis direction. Then, on the basis of the first aggregate shearing force value and the second aggregate shearing force value, the output section 12 calculates the value of the moment Mz around the Z-axis direction that is applied to the tactile sensor 10, as the moment Mz value, and outputs the data of the moment Mz value.

The flow of the processing of outputting data of the moment Mz value in the third embodiment is described with reference to FIG. 25. There are the following first example and second example of the processing of outputting data of the moment Mz value.

The moment Mz value data outputting processing relating to the first example is executed at the CPU 54 of the output section 12 by the following procedures for example. In step S71, the CPU 54 acquires the data outputted from the plural electrostatic capacitance detecting ICs 44. This data acquired in step S71 is data of the signals outputted from the sensor portion 18 in correspondence with the first electrodes 34 that are the objects of calculation of displacement Δy in step S72 described hereinafter.

In step S72, on the basis of the data acquired in step S71, as examples of the "first shearing force detecting position" and the "second shearing force detecting position", the CPU 54 calculates the displacements Δy for the respective positions of the openings 38-2,8 that are apart from the center of the contacting surface 28 in the X-axis direction.

The displacements Δy, which are calculated in this way for the respective positions of the openings 38-2,8, are proportional to the shearing force Fy values at the respective positions of the openings 38. Therefore, due to the displacements Δy being calculated for the respective positions of the openings 38-2,8, the shearing force Fy values at the respective positions of the openings 38-2,8 are calculated. Hereinafter, the shearing force Fy value that is calculated for the opening 38-2 in this way is called the first shearing force Fy value, and the shearing force Fy value that is calculated for the opening 38-8 is called the second shearing force Fy value.

Further, the first shearing force Fy value that is calculated for the opening 38-2 corresponds to an example of the "first shearing force value that is calculated for the first shearing force detecting position within the contacting surface". Moreover, the second shearing force Fy value that is calculated for the opening 38-8 corresponds to an example of the "second shearing force value that is calculated for the second shearing force detecting position within the contacting surface".

In step S73, the CPU 54 calculates the difference between a value, which is obtained by multiplying the first shearing force Fy value calculated for the opening 38-2 in step S72 by the distance dy, and a value, which is obtained by multiplying the second shearing force Fy calculated for the opening 38-8 in step S72 by the distance dy, and makes this difference be the moment Mz value. Due thereto, the moment Mz value (the magnitude and direction of the moment) is calculated. The moment Mz value is an example of the "second moment value".

In step S74, the CPU 54 outputs the data of the moment Mz value that was calculated in step S73 to the controller 104.

Note that, although the first shearing force Fy value is calculated for the opening 38-2 in above-described step S72, the first shearing force Fy value may be calculated for at least one opening 38 among the openings 38-1,2,3. Similarly, although the second shearing force Fy value is calculated for the opening 38-8 in above-described step S72, the second shearing force Fy value may be calculated for at least one opening 38 among the openings 38-7,8,9.

The moment Mz value data outputting processing relating to the second example is executed at the CPU 54 of the output section 12 by the following procedures for example. In step S71, the CPU 54 acquires the data outputted from the plural electrostatic capacitance detecting ICs 44. This data acquired in step S71 is data of the signals outputted from the sensor portion 18 in correspondence with the first electrodes 34 that are the objects of calculation of displacement Δx in step S72 described hereinafter.

In step S72, on the basis of the data acquired in step S71, as examples of the "first shearing force detecting position" and the "second shearing force detecting position", the CPU 54 calculates the displacements Δx for the respective positions of the openings 38-4,6 that are apart from the center of the contacting surface 28 in the Y-axis direction.

The displacements Δx, which are calculated in this way for the respective positions of the openings 38-4,6, are proportional to the shearing force Fx values at the respective positions of the openings 38. Therefore, due to the displacements Δx being calculated for the respective positions of the openings 38-4,6, the shearing force Fx values at the respective positions of the openings 38-4,6 are calculated.

Further, the first shearing force Fx value that is calculated for the opening 38-4 corresponds to an example of the "first shearing force value that is calculated for the first shearing force detecting position within the contacting surface". Moreover, the second shearing force Fx value that is calculated for the opening 38-6 corresponds to an example of the "second shearing force value that is calculated for the second shearing force detecting position within the contacting surface".

In step S73, the CPU 54 calculates the difference between a value, which is obtained by multiplying the first shearing force Fx value calculated for the opening 38-4 in step S72 by the distance dx, and a value, which is obtained by multiplying the second shearing force Fx calculated for the opening 38-8 in step S72 by the distance dx, and makes this difference be the moment Mz value. Due thereto, the moment Mz value (the magnitude and direction of the moment) is calculated. The moment Mz value is an example of the "second moment value".

In step S74, the CPU 54 outputs the data of the moment Mz value that was calculated in step S73 to the controller 104.

Note that, although the first shearing force Fx value is calculated for the opening 38-4 in above-described step S72, the first shearing force Fx value may be calculated for at least one opening 38 among the openings 38-1,4,7. Similarly, although the second shearing force Fx value is calculated for the opening 38-6 in above-described step S72, the second shearing force Fx value may be calculated for at least an opening 38 among the openings 38-3,6,9.

Operation and effects of the third embodiment are described next.

(1) In the processing of outputting data of the aggregate shearing force Fx value (see FIG. 21), the output section 12 calculates the one aggregate shearing force Fx value for the entire contacting surface 28, and outputs the data of the aggregate shearing force Fx value. Accordingly, because there is no need to calculate the aggregate shearing force Fx value at the controller 104, the burden on the controller 104 can be reduced. Further, for example, as compared with a case of outputting data of a shearing force distribution that expresses the respective shearing force Fx values of plural shearing force detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

Similarly, in the processing of outputting data of the aggregate shearing force Fy value (see FIG. 22), the output section 12 calculates the one aggregate shearing force Fy value for the entire contacting surface 28, and outputs the data of the aggregate shearing force Fy value. Accordingly, because there is no need to calculate the aggregate shearing force Fy value at the controller 104, the burden on the controller 104 can be reduced. Further, for example, as compared with a case of outputting data of a shearing force distribution that expresses the respective shearing force Fx values of plural shearing force detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

(2) In the processing of outputting data of the aggregate shearing force Fx value (see FIG. 21), the output section 12 calculates the shearing force Fx values of the respective positions of the plural openings 38 within the contacting surface 28, on the basis of all or some of the plural signals outputted from the sensor portion 18. Then, the output section 12 calculates the aggregate shearing force Fx value by carrying out at least any of calculating a representative value, calculating the total value and calculating the average value for the shearing force Fx values of the respective positions of the plural openings 38. Accordingly, as compared with the shearing force Fx value that is calculated for one of the openings 38 that is selected arbitrarily, the aggregate shearing force Fx value that more accurately expresses the shearing force Fx value of the entire contacting surface 28 can be outputted.

Similarly, in the processing of outputting data of the aggregate shearing force Fy value (see FIG. 22), the output section 12 calculates the shearing force Fy values of the respective positions of the plural openings 38 within the contacting surface 28, on the basis of all or some of the plural signals outputted from the sensor portion 18. Then, the output section 12 calculates the aggregate shearing force Fy value by carrying out at least any of calculating a representative value, calculating the total value and calculating the average value for the shearing force Fy values of the respective positions of the plural openings 38. Accordingly, as compared with the shearing force Fy value that is calculated for one of the openings 38 that is selected arbitrarily, the aggregate shearing force Fy value that more accurately expresses the shearing force Fy value of the entire contacting surface 28 can be outputted.

(3) In the processing of outputting data of the moment Mx value (see FIG. 23), the output section 12 calculates a first aggregate pressure value and a second aggregate pressure value respectively for the openings 38 that are at two places that are apart in the Y-axis direction at the contacting surface 28. Then, on the basis of the first aggregate pressure value and the second aggregate pressure value, the output section 12 calculates, as the moment Mx value, the value of the moment Mx around the X-axis direction that is applied to the tactile sensor 10, and outputs the data of the moment Mx value. Accordingly, because there is no need for the moment Mx value to be calculated at the controller 104, the burden on the controller 104 can be reduced.

Similarly, in the processing of outputting data of the moment My value (see FIG. 24), the output section 12 calculates a first aggregate pressure value and a second aggregate pressure value respectively for the openings 38 that are at two places that are apart in the X-axis direction at the contacting surface 28. Then, on the basis of the first aggregate pressure value and the second aggregate pressure value, the output section 12 calculates, as the moment My value, the value of the moment My around the Y-axis direction that is applied to the tactile sensor 10, and outputs the data of the moment My value. Accordingly, because there is no need for the moment My value to be calculated at the controller 104, the burden on the controller 104 can be reduced.

(4) In the first example of the processing of outputting data of the moment Mz value (see FIG. 25), the output section 12 calculates a first shearing force Fy value and a second shearing force Fy value respectively for the openings 38 at two places that are apart in the X-axis direction at the contacting surface 28. Then, on the basis of the first shearing force Fy value and the second shearing force Fy value, the output section 12 calculates, as the moment Mz value, the value of the moment Mz around the Z-axis direction that is applied to the tactile sensor 10, and outputs the data of the moment Mz value. Accordingly, because there is no need for the moment Mz value to be calculated at the controller 104, the burden on the controller 104 can be reduced.

Similarly, in the second example of the processing of outputting data of the moment Mz value (see FIG. 25), the output section 12 calculates a first shearing force Fx value and a second shearing force Fx value respectively for the openings 38 at two places that are apart in the Y-axis direction at the contacting surface 28. Then, on the basis of the first shearing force Fx value and the second shearing force Fx value, the output section 12 calculates, as the moment Mz value, the value of the moment Mz around the Z-axis direction that is applied to the tactile sensor 10, and outputs the data of the moment Mz value. Accordingly, because there is no need for the moment Mz value to be calculated at the controller 104, the burden on the controller 104 can be reduced.

(5) At the tactile sensor 10 (see FIG. 36 through FIG. 38), the second electrode layer 26 is configured by the one second electrode 36 that is a single layer. Accordingly, the structure and the manufacturing processes of the tactile sensor 10 can be simplified.

Further, the pressures at the respective positions of the plural first electrodes 34 can be detected by detecting the electrostatic capacitances that change in accordance with the distances between the first electrodes 34 and the openings 38. Moreover, the respective openings 38 partially overlap with the respective, four first electrodes that are adjacent in the X-axis direction and the Y-axis direction. Therefore, by detecting the electrostatic capacitances that change in accordance with the surface areas over which the four first electrodes 34 and the plural openings 38 overlap one another, shearing forces also can be detected at the positions of the respective openings 38.

Moreover, due to the number of the openings 38 formed in the second electrode 36 being less than the number of the plural first electrodes 34, the plural first electrodes 34 correspond to the one opening 38. Therefore, the intervals between the plural first electrodes 34 can be narrowed as compared with a case in which, for example, the plural first electrodes 34 and the plural openings 38 are in a one-to-one correspondence. Due thereto, because the number of the plural first electrodes 34 can be ensured, the resolution of the pressure distribution can be ensured.

In this way, in accordance with the tactile sensor 10 relating to the third embodiment, shearing forces can be detected, and the resolution of the pressure distribution can be ensured, even by a simple structure and simple manufacturing processes.

Further, because the second electrode 36 is a single structure having the plural openings 38, as compared with a case in which the second electrode 36 is configured by plural members for example, the manufacturing efficiency can be improved, and the number of parts can be reduced.

Modified examples of the third embodiment are described next.

(1) The tactile sensor 10 preferably has the above-described structure. However, the tactile sensor 10 may have a structure other than that described above, provided that it is a structure in which the first electrode layer 24 has the plural first electrodes 34, the second electrode layer 26 has the one second electrode 36, and two or more of the plural first electrodes 34 partially overlap with the second electrode 36 as viewed in plan view.

(2) The tactile sensor 10 has the 36 first electrodes 34, but the number of the plural first electrodes 34 may be any number.

(3) Although the second electrode 36 has the nine openings 38, the number of openings 38 may be any number provided that the number of openings 38 is less than the number of the plural first electrodes 34.

(4) The plural first electrodes 34 are preferably arrayed in the form of a matrix along the contacting surface 28. However, the first electrodes may be disposed in a form other than a matrix form, provided that the desired pressure distribution is obtained within the contacting surface 28.

(5) In the third embodiment, structures that are similar to those of the first embodiment may employ modified examples that are similar to those of the first embodiment.

Fourth Embodiment

Figure 40:
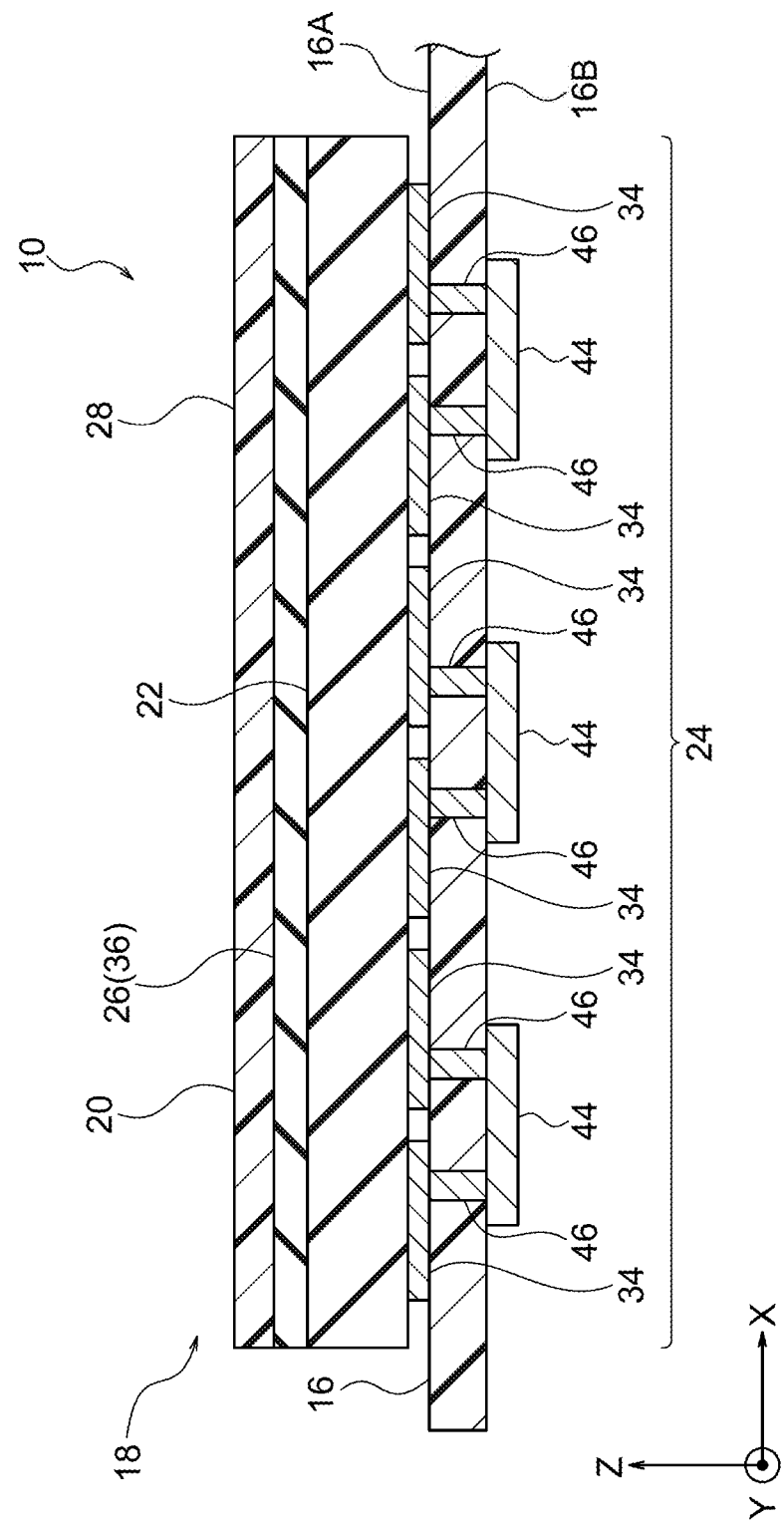
FIG. 40 is a vertical sectional view of the tactile sensor relating to a fourth embodiment.

A fourth embodiment is described next.
(Structure of Tactile Sensor 10)
FIG. 40 is a vertical sectional view of the tactile sensor 10 relating to a fourth embodiment. In the tactile sensor 10 relating to the fourth embodiment, the structure of the second electrode layer 26 is changed as follows with respect to that of the tactile sensor 10 relating to the above-described first embodiment (see FIG. 3 through FIG. 6).

Figure 41:
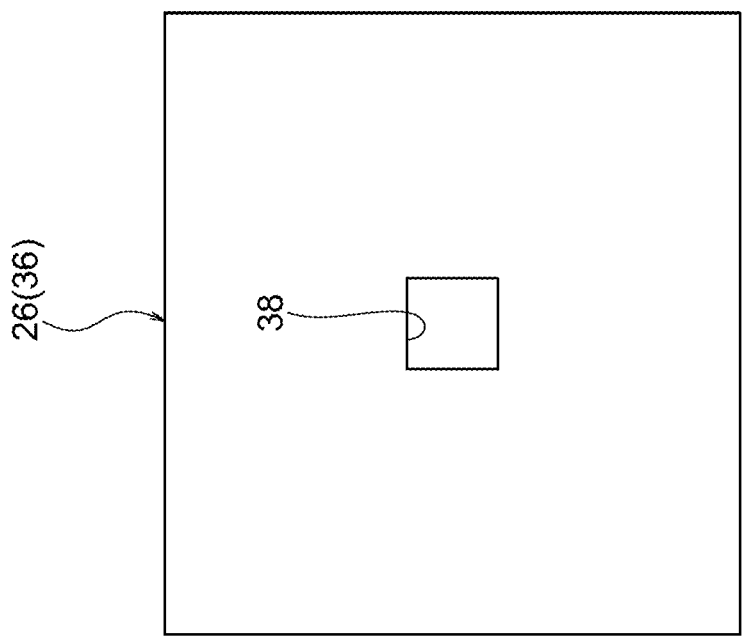
FIG. 41 is a plan view of the second electrode layer of FIG. 40.

FIG. 41 is a plan view of the second electrode layer 26 of FIG. 40. The second electrode layer 26 is configured by the one second electrode 36 that is a single layer. The second electrode 36 is formed in the shape of a flat plate. The second electrode 36 may be connected to the ground of the substrate 16, or may be floating with respect to ground. The second electrode 36 is formed of a conductive rubber for example.

One opening 38 is formed in the second electrode 36. As an example, the opening 38 is formed in the central portion of the second electrode 36. The second electrode 36 is formed in a square shape as viewed in plan view, and the opening 38 also is formed in a square shape as viewed in plan view.

Figure 42:
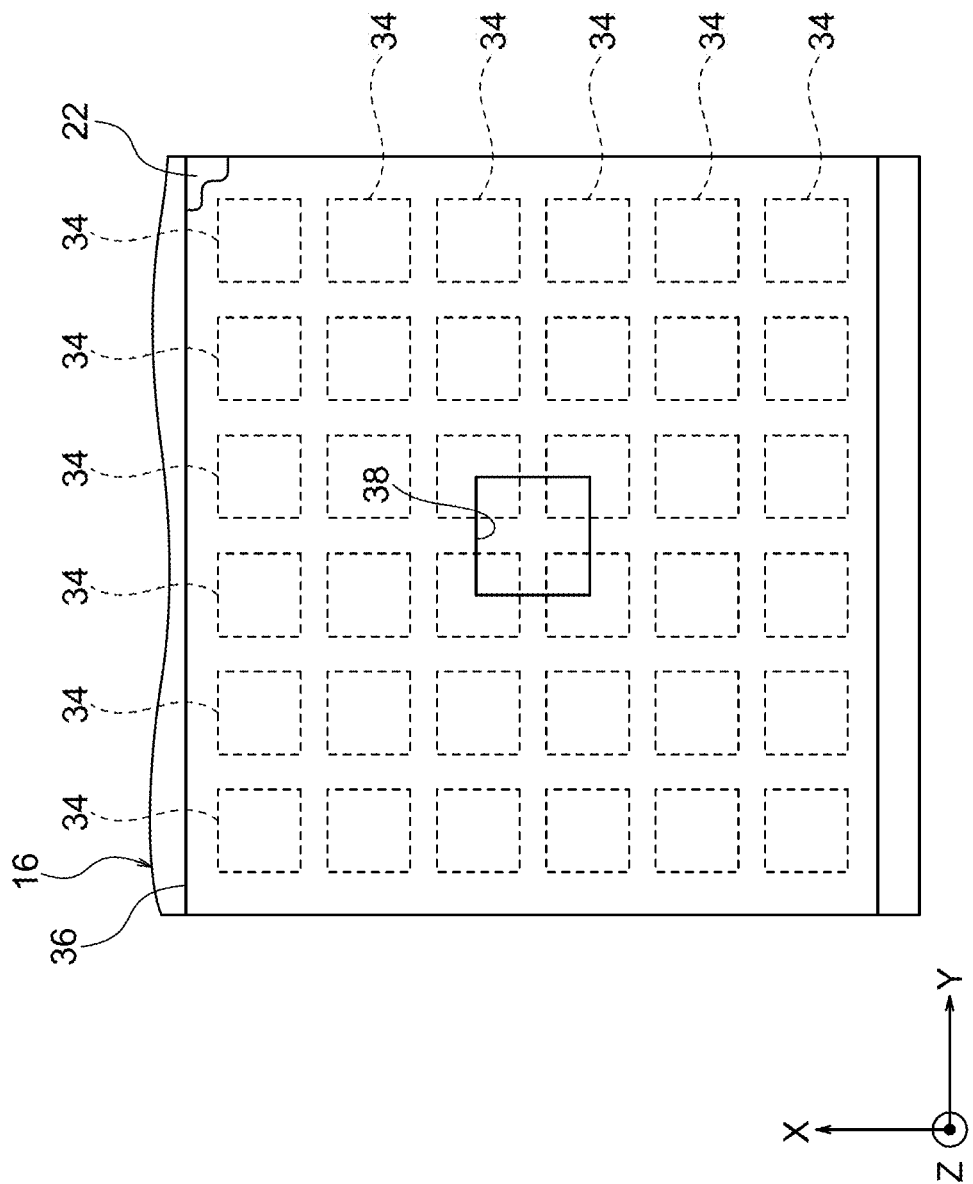
FIG. 42 is a plan view illustrating a state in which the second electrode and the elastic layer and the substrate of FIG. 40 are superposed.

FIG. 42 is a plan view illustrating a state in which the second electrode 36 and the elastic layer 22 and the substrate 16 of FIG. 40 are superposed. As an example, the number of the plural first electrodes 34 is 36, whereas the one opening 38 is formed in the second electrode 36. Therefore, in the fourth embodiment, the number of the openings 38 formed in the second electrode 36 is less than the number of the plural first electrodes 34.

The second electrode 36 is a size that overlaps all of the plural first electrodes 34 as viewed in plan view. Specifically, the second electrode 36 is a size that is such that all of the plural first electrodes 34 are contained at the inner side of the outer shape of the second electrode 36 as viewed in plan view.

As an example, the opening 38 is formed in the shape of a square that is smaller than the minimum square that contains all of the central, four first electrodes 34 that are adjacent in the X-axis direction and the Y-axis direction, as viewed in plan view. The opening 38 is positioned at the central portion of the central, four first electrodes 34 as viewed in plan view, and partially overlaps these four first electrodes 34. Due thereto, among the plural first electrodes 34, the central, four first electrodes 34 partially overlap with the second electrode 36 as viewed in plan view. Among the plural first electrodes 34, the first electrodes 34 that are other than the central, four first electrodes 34 completely overlap the second electrode 36.

In the second embodiment, the central, four first electrodes 34 among the plural first electrodes 34 correspond to an example of the "plurality of partially-overlapping electrodes that partially overlap with the second electrode", and the plural signals outputted from these central, four first electrodes correspond to an example of the "plurality of partially-overlapping electrode signals".

The tactile sensor 10 of this structure is manufactured in the same way as the tactile sensor 10 relating to the above-described first embodiment (see FIG. 3 through FIG. 6).

In the fourth embodiment, the calculation of the displacements $\Delta x$, $\Delta y$, $\Delta z$ is carried out on the basis of an approach similar to that of the case of the first embodiment. In the fourth embodiment, the hardware structures of the tactile sensors 10, the output section 12 and the controller 104, and the plural modes at the output section 12, are the same as those of the first embodiment. Further, in the fourth embodiment, the processings of outputting the respective data of the pressure distribution, the grasped position, the grasping force Fz value, the translational force $\Delta Fx$ value, the translation force $\Delta Fy$ value, the rotational moment MRx value, and the rotational moment MRy value are the same as in the first embodiment.

On the other hand, the processings of outputting the respective data of the aggregate shearing force Fx value and the aggregate shearing force Fy value differ from the first embodiment.
(Aggregate Shearing Force Fx Value Data Outputting Processing)
In the fourth embodiment, the output section 12 calculates one aggregate shearing force Fx value for the entire contacting surface 28, and outputs the data of the aggregate shearing force Fx value. This processing of outputting the data of the aggregate shearing force Fx value is executed at the CPU 54 of the output section 12 by the following procedures for example. Hereinafter, the flow of the processing of outputting the data of the aggregate shearing force Fx value in the fourth embodiment is described with reference to FIG. 21.

In step S31, the CPU 54 acquires the data outputted from the plural electrostatic capacitance detecting ICs 44. This data acquired in step S31 is data of the signals outputted from the sensor portion 18 in correspondence with the first electrodes 34 that are the objects of calculation of displacement Δx in step S32 described hereinafter.

In step S32, on the basis of the data acquired in step S31, the CPU 54 calculates the displacement Δx for the position of the opening 38. The calculating of the displacement Δx is carried out in accordance with the explanation of the case in which Δx, Δy, Δz≠0 in the first embodiment, by using all or some of the signals corresponding to the four first electrodes 34 that partially overlap with the one opening 38. In a case of using some of the signals, the signals corresponding to at least two electrodes whose positions in the x direction differ, among the four first electrodes 34 that overlap the one opening 38, are used. In this step S32, the displacement Δx for the position of the opening 38 is calculated on the basis of some of the plural signals outputted from the sensor portion 18.

The displacement Δx, which is calculated for the position of the opening 38 in this way, is proportional to the shearing force Fx value at the position of the opening 38. Accordingly, due to the displacement Δx being calculated for the position of the opening 38, the shearing force Fx value at the position of the opening 38 is calculated.

In step S33, the CPU 54 makes the shearing force Fx value at the position of the opening 38 that was calculated in step S32 be the one aggregate shearing force Fx value calculated for the entire contacting surface 28. Due thereto, the one aggregate shearing force Fx value is calculated.

In step S34, the CPU 54 outputs the data of the aggregate shearing force Fx value that was calculated in step S33 to the controller 104. This data of the aggregate shearing force Fx value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

(Aggregate Shearing Force Fy Value Data Outputting Processing)

In the fourth embodiment, the output section 12 calculates one aggregate shearing force Fy value for the entire contacting surface 28, and outputs the data of the aggregate shearing force Fy value. This processing of outputting the data of the aggregate shearing force Fy value is executed at the CPU 54 of the output section 12 by the following procedures for example. Hereinafter, the flow of the processing of outputting the data of the aggregate shearing force Fy value in the fourth embodiment is described with reference to FIG. 22.

In step S41, the CPU 54 acquires the data outputted from the plural electrostatic capacitance detecting ICs 44. This data acquired in step S41 is data that is needed in order to calculate the displacement Δy in step S42 that is described hereinafter, and is data of the signals outputted from the sensor portion 18 in correspondence with the respective, four first electrodes 34 at the center.

In step S42, on the basis of the data acquired in step S41, the CPU 54 calculates the displacement Δy at the position of the opening 38. The calculating of the displacement Δy is carried out in accordance with the explanation of the case in which Δx, Δy, Δz≠0 in the first embodiment, by using all or some of the signals corresponding to the four first electrodes 34 that partially overlap with the one opening 38. In a case of using some of the signals, the signals corresponding to at least two electrodes whose positions in the y direction differ, among the four first electrodes 34 that overlap the one opening 38, are used. In this step S42, the displacement Δy for the position of the opening 38 is calculated on the basis of some of the plural signals outputted from the sensor portion 18.

The displacement Δy, which is calculated for the position of the opening 38 in this way, is proportional to the shearing force Fy value at the position of the opening 38. Accordingly, due to the displacement Δy being calculated for the position of the opening 38, the shearing force Fy value at the position of the opening 38 is calculated.

In step S43, the CPU 54 makes the shearing force Fy value at the position of the opening 38 that was calculated in step S42 be the one aggregate shearing force Fy value calculated for the entire contacting surface 28. Due thereto, the one aggregate shearing force Fy value is calculated.

In step S44, the CPU 54 outputs the data of the aggregate shearing force Fy value that was calculated in step S43 to the controller 104. This data of the aggregate shearing force Fy value is used in sensing a collision of the workpiece W, detecting the maintaining of contact of the workpiece W held at the robot hand 108 with another object, detecting the position of fitting the workpiece W into the destination of movement, detecting the completion of insertion of the workpiece W into the destination of movement, detecting the completion of pulling of the workpiece W out from the destination of movement, or the like.

Operation and effects of the fourth embodiment are described next.

(1) In the processing of outputting data of the aggregate shearing force Fx value (see FIG. 21), the output section 12 calculates the one aggregate shearing force Fx value for the entire contacting surface 28, and outputs the data of the aggregate shearing force Fx value. Accordingly, because there is no need to calculate the aggregate shearing force Fx value at the controller 104, the burden on the controller 104 can be reduced. Further, for example, as compared with a case of outputting data of a shearing force distribution that expresses the respective shearing force Fx values of plural pressure detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

Similarly, in the processing of outputting data of the aggregate shearing force Fy value (see FIG. 22), the output section 12 calculates the one aggregate shearing force Fy value for the entire contacting surface 28, and outputs the data of the aggregate shearing force Fy value. Accordingly, because there is no need to calculate the aggregate shearing force Fy value at the controller 104, the burden on the controller 104 can be reduced. Further, for example, as compared with a case of outputting data of a shearing force distribution that expresses the respective shearing force Fx values of plural pressure detecting positions within the contacting surface 28, the amount of data communicated between the output section 12 and the controller 104 can be reduced by an amount corresponding to the aggregating of the shearing force Fx values. Due thereto, the response speeds of the output section 12 and the controller 104 can be improved, and therefore, tactile information that is useful in controlling the robot 102 that has the pair of grasping portions 114 can be provided efficiently to the controller 104 that controls the robot 102.

(2) At the tactile sensor 10 (see FIG. 40 through FIG. 42), the second electrode layer 26 is configured by the one second electrode 36 that is a single layer. Accordingly, the structure and the manufacturing processes of the tactile sensor 10 can be simplified.

Further, the pressures at the respective positions of the plural first electrodes 34 can be detected by detecting the electrostatic capacitances that change in accordance with the distances between the first electrodes 34 and the second electrode 36. Moreover, the four, central first electrodes 34 among the plural first electrodes 34 partially overlap with the opening 38 that is formed at the center of the second electrode 36 as viewed in plan view. Therefore, by detecting the electrostatic capacitances that change in accordance with the surface areas over which the four first electrodes 34 and the second electrode 36 overlap one another, shearing forces also can be detected at the position of the opening 38.

Moreover, due to the number of the openings 38 formed in the second electrode 36 being one and being less than the number of the plural first electrodes 34, the plural first electrodes 34 correspond to the one opening 38. Therefore, the intervals between the plural first electrodes 34 can be narrowed as compared with a case in which, for example, the plural first electrodes 34 and the plural openings 38 are in a one-to-one correspondence. Due thereto, because the number of the plural first electrodes 34 can be ensured, the resolution of the pressure distribution can be ensured.

In this way, in accordance with the tactile sensor 10 relating to the fourth embodiment, shearing forces can be detected, and the resolution of the pressure distribution can be ensured, even by a simple structure and simple manufacturing processes.

(3) Because the second electrode 36 is a single structure, as compared with a case in which the second electrode 36 is configured by plural members for example, the manufacturing efficiency can be improved, and the number of parts can be reduced.

(4) In the fourth embodiment, structures that are similar to those of the first embodiment exhibit operation and effects that are similar to the first embodiment.

Modified examples of the fourth embodiment are described next.

(1) The tactile sensor 10 preferably has the above-described structure. However, the tactile sensor 10 may have a structure other than that described above, provided that it is a structure in which the first electrode layer 24 has the plural first electrodes 34, the second electrode layer 26 has the one second electrode 36, and two or more of the plural first electrodes 34 partially overlap with the second electrode 36 as viewed in plan view.

(2) The tactile sensor 10 has the 36 first electrodes 34, but the number of the plural first electrodes 34 may be any number.

(3) Although the one opening 38 is formed in the second electrode 36, the number of openings 38 may be any number provided that the number of openings 38 is less than the number of the plural first electrodes 34.

(4) The plural first electrodes 34 are preferably arrayed in the form of a matrix along the contacting surface 28. However, the first electrodes may be disposed in a form other than a matrix form, provided that the desired pressure distribution is obtained within the contacting surface 28.

(5) In the fourth embodiment, structures that are similar to those of the first embodiment may employ modified examples that are similar to those of the first embodiment.

Although first through fourth embodiments of the technique disclosed in the present application have been described above, the technique disclosed in the present application is not limited to the above, and can of course be implemented by being modified in various ways, other than the above, within a scope that does not depart from the gist thereof.

Note that the disclosure of Japanese Patent Application No. 2020-140394 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

Note that the following supplementary notes are additionally disclosed in relation to the above-described embodiments of the technique disclosed in the present application.

(Supplementary Note 1)

A tactile sensing system comprising:

a pair of tactile sensors respectively provided at mutually facing surfaces of a pair of grasping portions provided at a robot, and contacting a workpiece grasped by the pair of grasping portions; and an output section electrically connected to the pair of tactile sensors, wherein each tactile sensor has an electrostatic capacitance-type sensor portion having a contacting surface that contacts the workpiece, and a layered structure in which an elastic layer, and a first electrode layer and a second electrode layer positioned at respective sides of the elastic layer with the elastic layer sandwiched therebetween, are layered in a normal direction of the contacting surface, the first electrode layer has a plurality of first electrodes, the second electrode layer has one or a plurality of second electrodes, two or more of the plurality of first electrodes are partially-overlapping electrodes that partially overlap with the second electrode as viewed in the normal direction, the sensor portion outputs a plurality of signals that respectively correspond to the plurality of first electrodes, the output section has at least either one of an action content judging mode that judges content of an action of the robot and, in accordance with the content of the action, selectively outputs at least any of data of the pressure distribution, data of an aggregate pressure value, data of the aggregate shearing force value, data of a first moment value and data of a second moment value, and a request command handling mode that, in accordance with a command request from a controller that controls the robot, selectively outputs at least any of data of the pressure distribution, data of the aggregate pressure value, data of the aggregate shearing force value, data of the first moment value and data of the second moment value, the data of the aggregate pressure value is data calculated by the output section carrying out at least any of calculating a representative value, calculating a total value and calculating an average value for the respective pressure values of the plurality of pressure detecting positions, the data of the first moment value is data in which the output section calculates a first aggregate pressure value by carrying out at least any of calculating a representative value, calculating a total value and calculating an average value for respective pressure values of a plurality of first aggregate pressure detecting positions among the plurality of pressure detecting positions, and calculates a second aggregate pressure value by carrying out at least any of calculating a representative value, calculating a total value and calculating an average value for respective pressure values of a plurality of second aggregate pressure detecting positions among the plurality of pressure detecting positions, and, on the basis of the first aggregate pressure value and the second aggregate pressure value, calculates, as a first moment value, a value of a moment that is applied to the tactile sensor and is around a direction orthogonal to the normal direction and a direction in which the first aggregate pressure detecting positions and the second aggregate pressure detecting positions are lined-up, and the data of the second moment value is data in which, on the basis of all or some of the plurality of partially-overlapping electrode signals, the output section calculates one first aggregate shearing force value for a plurality of first shearing force detecting positions within the contacting surface, and calculates one second aggregate shearing force value for a plurality of second shearing force detecting positions within the contacting surface, and, on the basis of the first aggregate shearing force value and the second aggregate shearing force value, calculates, as a second moment value, a value of a moment that is applied to the tactile sensor and is around the normal direction.

(Supplementary Note 2)
The tactile sensing system of Supplementary Note 1, wherein at least a portion of the output section is provided at at least any of a robot hand provided at the robot, a robot arm provided at the robot, a wrist joint portion that connects the robot hand to the robot arm, an input section of a controller that controls the robot, and a program part that is provided at the controller and executes program processings.

(Supplementary Note 3)
A tactile sensing system comprising:
  a pair of tactile sensors respectively provided at mutually facing surfaces of a pair of grasping portions provided at a robot, and contacting a workpiece grasped by the pair of grasping portions; and
  an output section electrically connected to the pair of tactile sensors,
  wherein each tactile sensor has an electrostatic capacitance-type sensor portion having a contacting surface that contacts the workpiece, and a layered structure in which an elastic layer, and a first electrode layer and a second electrode layer positioned at respective sides of the elastic layer with the elastic layer sandwiched therebetween, are layered in a normal direction of the contacting surface,
  the first electrode layer has a plurality of first electrodes,
  the second electrode layer has one or a plurality of second electrodes,
  at least some of the plurality of first electrodes completely or partially overlap with the second electrode as viewed in the normal direction,
  the sensor portion outputs a plurality of signals respectively corresponding to the plurality of first electrodes,
  the output section outputs data relating to pressure that is based on all or some of the plurality of signals, and
  at least a portion of the output section is provided at at least any of a robot hand provided at the robot, a robot arm provided at the robot, a wrist joint portion that connects the robot hand to the robot arm, an input section of a controller that controls the robot, and a program part that is provided at the controller and executes program processings.

The invention claimed is:

1. A tactile sensing system, comprising:
  a pair of tactile sensors respectively provided at mutually facing surfaces of a pair of grasping portions provided at a robot, the pair of tactile sensors configured to contact a workpiece grasped by the pair of grasping portions; and
  an output section electrically connected to the pair of tactile sensors,
  wherein:
  each tactile sensor has an electrostatic capacitance-type sensor portion having a contact surface configured to contact the workpiece, and having a layered structure in which an elastic layer, and a first electrode layer and a second electrode layer positioned at respective sides of the elastic layer with the elastic layer sandwiched therebetween, are layered in a normal direction of the contact surface,
  the first electrode layer has a plurality of first electrodes,
  the second electrode layer has one or a plurality of second electrodes,
  two or more of the plurality of first electrodes are partially-overlapping electrodes that partially overlap with the second electrode as viewed in the normal direction,
  the sensor portion outputs a plurality of signals that respectively correspond to the plurality of first electrodes, and
  based on all or some of the plurality of signals, the output section calculates respective pressure values of a plurality of pressure detection positions within the contact surface, and, based on all or some of a plurality of partially-overlapping electrode signals, which respectively correspond to the plurality of partially-overlapping electrodes, among the plurality of signals, the output section calculates one aggregate shearing force value for the entire contact surface, and the output section outputs data for the aggregate shearing force value and data for a pressure distribution expressing the respective pressure values of the plurality of pressure detection positions.

2. The tactile sensing system of claim 1, wherein, based on the respective pressure values of the plurality of pressure detection positions, the output section specifies a grasped position of the workpiece within the contact surface, and outputs data for the grasped position.

3. The tactile sensing system of claim 1, wherein the output section calculates an aggregate pressure value by carrying out at least one of calculating a representative value, calculating a total value or calculating an average value for the respective pressure values of the plurality of pressure detection positions, and outputs data for the aggregate pressure value.

4. The tactile sensing system of claim 1, wherein the output section calculates, as a translational force value, a sum of the aggregate shearing force values respectively calculated for the pair of tactile sensors, and outputs data for the translational force value.

5. The tactile sensing system of claim 1, wherein, based on a difference between the aggregate shearing force values respectively calculated for the pair of tactile sensors, the output section calculates, as a rotational moment value, a value of a rotational moment that is applied to the pair of tactile sensors and is around a direction orthogonal to the normal direction and to a direction of the aggregate shearing force, and outputs data for the rotational moment value.

6. The tactile sensing system of claim 1, wherein the output section has a collision sensing mode that outputs collision sensing data in a case in which at least a predetermined number of pressure values among the respective pressure values of the plurality of pressure detection positions exceeds a threshold value, in a case in which an aggregate pressure value, which is calculated by carrying out at least one of calculating a representative value, calculating a total value or calculating an average value for the respective pressure values of the plurality of pressure detection positions, exceeds a threshold value, or a case in which the aggregate shearing force value exceeds a threshold value.

7. The tactile sensing system of claim 1, wherein the output section calculates respective shearing force values of a plurality of shearing force detection positions within the contact surface based on all or some of the plurality of partially-overlapping electrode signals, and calculates the aggregate shearing force value by carrying out at least one of calculating a representative value, calculating a total value or calculating an average value for the respective shearing force values of the plurality of shearing force detection positions.

8. The tactile sensing system of claim 7, wherein, based on a plurality of signals that respectively correspond to a plurality of the first electrodes that include at least one of the partially-overlapping electrodes, the output section calculates the respective shearing force values so as to eliminate effects of pressure on the plurality of signals.

9. The tactile sensing system of claim 1, wherein the output section calculates a first aggregate pressure value by carrying out at least one of calculating a representative value, calculating a total value or calculating an average value for respective pressure values of a plurality of pressure detection positions that are in a vicinity of a first aggregate pressure detection position among the plurality of pressure detection positions, and calculates a second aggregate pressure value by carrying out at least one of calculating a representative value, calculating a total value or calculating an average value for respective pressure values of a plurality of pressure detection positions that are in a vicinity of a second aggregate pressure detection position among the plurality of pressure detection positions, and, on the basis of the first aggregate pressure value and the second aggregate pressure value, calculates, as a first moment value, a value of a moment that is applied to the tactile sensor and is around a direction orthogonal to the normal direction and to a direction in which the first aggregate pressure detection position and the second aggregate pressure detection position are aligned, and outputs data for the first moment value.

10. The tactile sensing system of claim 1, wherein, based on all or some of the plurality of partially-overlapping electrode signals, the output section calculates a first shearing force value for a first shearing force detection position within the contact surface, and calculates a second shearing force value for a second shearing force detection position within the contact surface, and, based on the first shearing force value and the second shearing force value, the output section calculates, as a second moment value, a value of a moment that is applied to the tactile sensor and is around the normal direction, and the output section outputs data for the second moment value.

11. The tactile sensing system of claim 1, wherein:
the output section has at least either one of an action content determination mode that determines a content of an action of the robot and, in accordance with the content of the action, selectively outputs at least one of data for the pressure distribution, data for an aggregate pressure value, data for the aggregate shearing force value, data for a first moment value or data for a second moment value, or a request command handling mode that, in accordance with a command request from a controller that controls the robot, selectively outputs at least one of data for the pressure distribution, data for the aggregate pressure value, data for the aggregate shearing force value, data for the first moment value or data for the second moment value,
the data for the aggregate pressure value is data calculated by the output section carrying out at least one of calculating a representative value, calculating a total value or calculating an average value for the respective pressure values of the plurality of pressure detection positions,
the data for the first moment value is data in which the output section calculates a first aggregate pressure value by carrying out at least one of calculating a representative value, calculating a total value or calculating an average value for respective pressure values of a plurality of first aggregate pressure detection positions among the plurality of pressure detection positions, and the output section calculates a second aggregate pressure value by carrying out at least one of calculating a representative value, calculating a total value or calculating an average value for respective pressure values of a plurality of second aggregate pressure detection positions among the plurality of pressure detection positions, and, based on the first aggregate pressure value and the second aggregate pressure value, the output section calculates, as a first moment value, a value of a moment that is applied to the tactile sensor and is around a direction orthogonal to the normal direction and to a direction in which the first aggregate pressure detection positions and the second aggregate pressure detection positions are aligned, and
the data for the second moment value is data in which, based on all or some of the plurality of partially-overlapping electrode signals, the output section calculates one first aggregate shearing force value for a plurality of first shearing force detection positions within the contact surface, and calculates one second aggregate shearing force value for a plurality of second shearing force detection positions within the contact surface, and, based on the first aggregate shearing force value and the second aggregate shearing force value, the output section calculates, as a second moment value, a value of a moment that is applied to the tactile sensor and is around the normal direction.

12. The tactile sensing system of claim 1, wherein:
the second electrode layer is configured by one or a plurality of second electrodes in a single layer, and
a number of one or a plurality of openings formed in the one second electrode, or a number of one or a plurality of island portions formed by one or a plurality of the second electrodes, is less than a number of the plurality of first electrodes.

13. The tactile sensing system of claim 12, wherein:
the second electrode layer is configured by a plurality of the second electrodes that form a plurality of the island portions, and
each of the plurality of second electrodes partially overlaps respective, adjacent first electrodes among the plurality of first electrodes as viewed in the normal direction.

14. The tactile sensing system of claim 12, wherein:
the second electrode layer is configured by one of the second electrodes in which a plurality of the openings are formed, and
each of the plurality of the openings partially overlaps respective, adjacent first electrodes among the plurality of first electrodes as viewed in the normal direction.

15. The tactile sensing system of claim 12, wherein:
the second electrode layer is configured by one of the second electrodes that forms one of the island portions, and
each of the plurality of partially-overlapping electrodes partially overlaps the one second electrode as viewed in the normal direction.

16. The tactile sensing system of claim 12, wherein:
the second electrode layer is configured by one of the second electrodes in which one of the openings is formed, and
each the plurality of partially-overlapping electrodes partially overlaps the one opening as viewed in the normal direction.

17. The tactile sensing system of claim 1, wherein the tactile sensors and the output section are configured as a unit.

18. The tactile sensing system of claim 1, wherein at least a portion of the output section is provided at at least one of a robot hand provided at the robot, a robot arm provided at the robot, a wrist joint portion that connects the robot hand to the robot arm, an input section of a controller that controls the robot, or a program part that is provided at the controller and executes program processing.

* * * * *